United States Patent
Haruo et al.

(10) Patent No.: US 12,214,505 B2
(45) Date of Patent: Feb. 4, 2025

(54) ROBOT CONTROLLER, ROBOT CONTROL METHOD, AND STORAGE MEDIUM STORING ROBOT CONTROL PROGRAM

(71) Applicant: Mitsubishi Electric Corporation, Tokyo (JP)

(72) Inventors: Nanase Haruo, Tokyo (JP); Kiyoshi Maekawa, Tokyo (JP); Koji Shiratsuchi, Tokyo (JP); Takuya Okahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 227 days.

(21) Appl. No.: 18/009,988

(22) PCT Filed: Jul. 8, 2020

(86) PCT No.: PCT/JP2020/026686
§ 371 (c)(1),
(2) Date: Dec. 13, 2022

(87) PCT Pub. No.: WO2022/009333
PCT Pub. Date: Jan. 13, 2022

(65) Prior Publication Data
US 2023/0226691 A1    Jul. 20, 2023

(51) Int. Cl.
*B25J 9/16*    (2006.01)
(52) U.S. Cl.
CPC .............. *B25J 9/1666* (2013.01); *B25J 9/161* (2013.01); *B25J 9/163* (2013.01); *B25J 9/1633* (2013.01)
(58) Field of Classification Search
CPC . B25J 9/1666; B25J 9/161; B25J 9/163; B25J 9/1633; G05B 2219/40476
See application file for complete search history.

(56) References Cited

U.S. PATENT DOCUMENTS 9,981,381 B1 *  5/2018  Nagarajan ............... B25J 9/1664
11,458,626 B2 * 10/2022  Kimura .................. B25J 9/0081
(Continued)

FOREIGN PATENT DOCUMENTS

| JP | 2010-046751 A | | 3/2010 |
|---|---|---|---|
| JP | 2014037029 A | * | 2/2014 |
| JP | 2019-135076 A | | 8/2019 |

OTHER PUBLICATIONS

International Search Report and Written Opinion mailed on Oct. 6, 2020, received for PCT Application PCT/JP2020/026686, filed on Jul. 8, 2020, 8 pages including English Translation.

*Primary Examiner* — Rachid Bendidi
(74) *Attorney, Agent, or Firm* — XSENSUS LLP

(57) ABSTRACT

A robot controller includes: axis motor control units that control motors for driving axes of a robot; and an action command generation unit that generates a first action command having the shortest action time when the robot is moved from an action start point to an action goal point without considering an obstacle, and selects, from among the axes, a major axis having the longest action time when the action is performed in accordance with the first action command. The first action command includes another axis command, and a major axis command, and the action command generation unit adjusts the other axis command so as to reduce an action time according to the other axis command and outputs a second action command including the major axis command and the adjusted other axis command and corresponding to a first trajectory when determining that the first trajectory avoids a clash between the robot and the obstacle.

16 Claims, 30 Drawing Sheets

(56) References Cited

U.S. PATENT DOCUMENTS

2015/0100194 A1* 4/2015 Terada ................. G05D 1/0214
 701/25
2019/0240833 A1 8/2019 Kimura

* cited by examiner

FIG.21
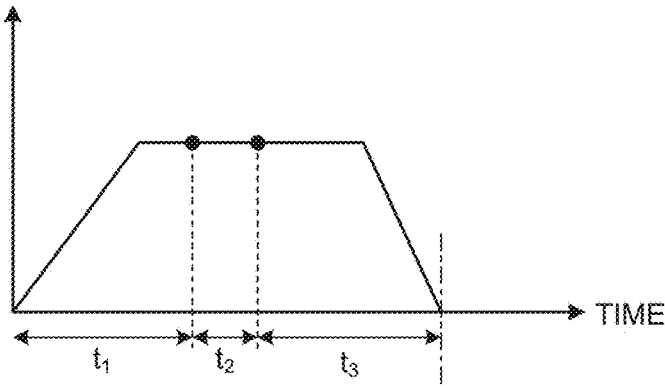
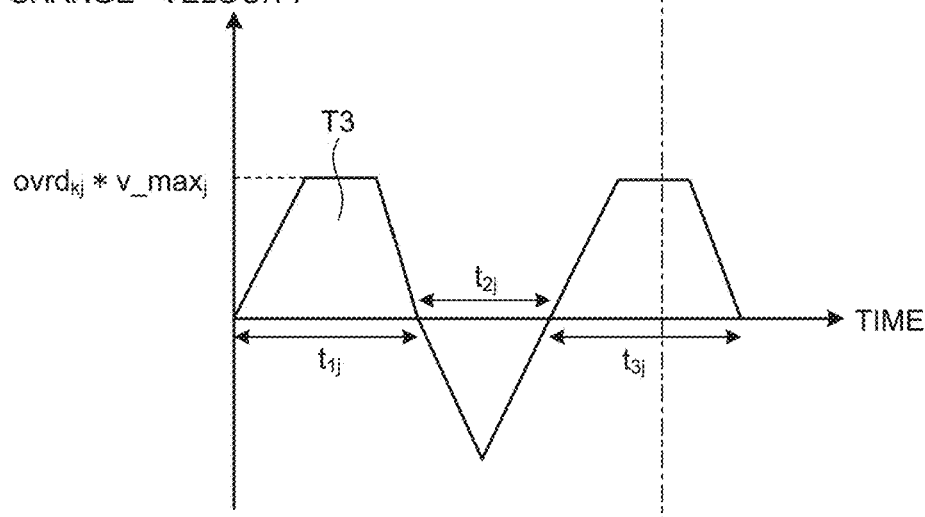
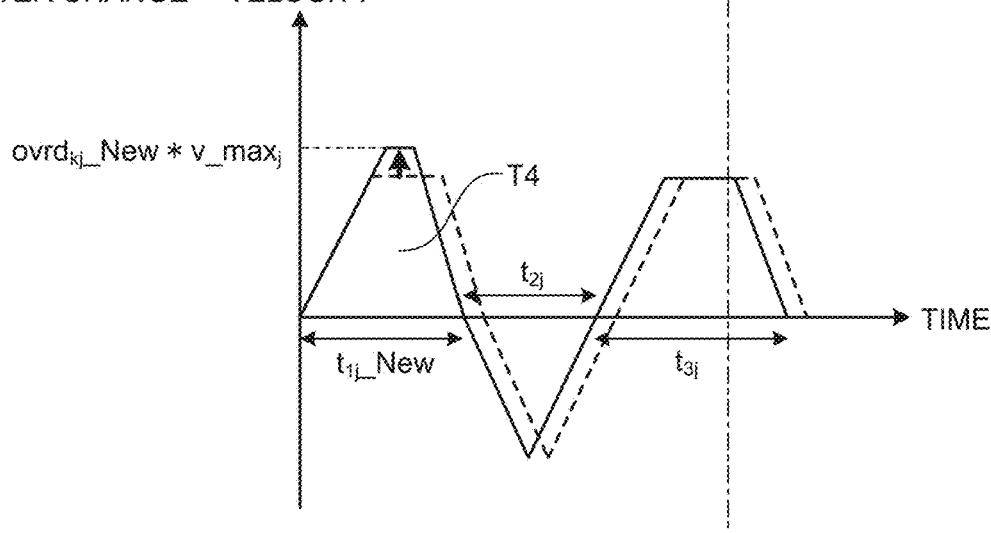

ROBOT CONTROLLER, ROBOT CONTROL METHOD, AND STORAGE MEDIUM STORING ROBOT CONTROL PROGRAM

CROSS-REFERENCE TO RELATED APPLICATION

The present application is based on PCT filing PCT/JP2020/026686, filed Jul. 8, 2020, the entire contents of which are incorporated herein by reference.

FIELD

The present disclosure relates to a robot controller that controls a robot, a robot control method, and a robot control program.

BACKGROUND

Robot controllers for controlling a robot include one that controls a robot that holds and conveys a workpiece with an end effector. The robot controller generates a trajectory that avoids a clash between an obstacle and a move object such as the workpiece or the robot including the end effector, and allows the workpiece to move along the trajectory generated.

A controller described in Patent Literature 1 generates, for each motor, a cam curve that minimizes the action time of the motor used for conveyance of a workpiece when the workpiece is moved from a start point to a goal point, and holds the cam curve of the motor that operates for the longest time among a plurality of the motors. The controller sets, as a passing point, a position at which the workpiece does not clash with an obstacle among positions between the start point and the goal point, and adjusts the cam curve of the rest of the motors such that the cam curve passes through the passing point, thereby reducing the action time for the movement.

CITATION LIST

Patent Literature

Patent Literature 1: Japanese Patent Application Laid-open No. 2014-37029

SUMMARY

Technical Problem

However, in the technique of Patent Literature 1, since the controller adjusts an action command for each axis such that the workpiece passes through the passing point designated by a user, there has been a problem that the action time for the movement increases if the passing point that is appropriate is not designated by the user.

The present disclosure has been made in view of the above, and an object thereof is to provide a robot controller capable of reducing the action time for movement while avoiding a clash between a robot and an obstacle even if an appropriate passing point is not designated by a user.

Solution to Problem

In order to solve the above problem and achieve the object, a robot controller comprising an axis motor control unit to control an axis motor that drives a corresponding one of a plurality of axes that moves joints of a robot, and a storage unit to store robot information, end point information, and obstacle information, the robot information being information on the robot, the end point information including information on an action start point at which a specific position of the robot starts an action and information on an action goal point at which the specific position of the robot ends the action, the obstacle information being information on an obstacle with respect to the robot. The robot controller further comprises an action command generation unit to: generate, on the basis of the robot information and the end point information, a first action command as an action command for the axis motor, the first action command minimizing a first action time, the first action time being an action time of movement when the specific position of the robot is moved from the action start point to the action goal point without considering the obstacle; and to select, from among the axes, an axis having the longest action time when the action is performed in accordance with the first action command, the selected axis being a major axis. The first action command includes another axis command and a major axis command, the other axis command being an action command for an axis other than the major axis, the major axis command being an action command for the major axis. The action command generation unit adjusts the other axis command on the basis of the robot information and the end point information so as to reduce a second action time, the second action time being an action time according to the other axis command, and outputs, to the axis motor control unit, a second action command that includes the major axis command and the other axis command after adjustment and corresponds to a first trajectory when determining, on the basis of the obstacle information, that the first trajectory corresponding to the second action command is a trajectory that avoids a clash between the robot and the obstacle.

Advantageous Effects of Invention

The robot controller according to the present disclosure can reduce the action time for movement while avoiding the clash between the robot and the obstacle even if the appropriate passing point is not designated by the user.

BRIEF DESCRIPTION OF DRAWINGS

FIG. 21 is a set of graphs for explaining processing in which the robot controller according to the second embodiment shifts an acceleration/deceleration timing of the action command for the other axis so as to reduce an action time.

DESCRIPTION OF EMBODIMENTS

Hereinafter, a robot controller, a robot control method, and a robot control program according to embodiments of the present disclosure will be described in detail with reference to the drawings.

First Embodiment

Figure 1:
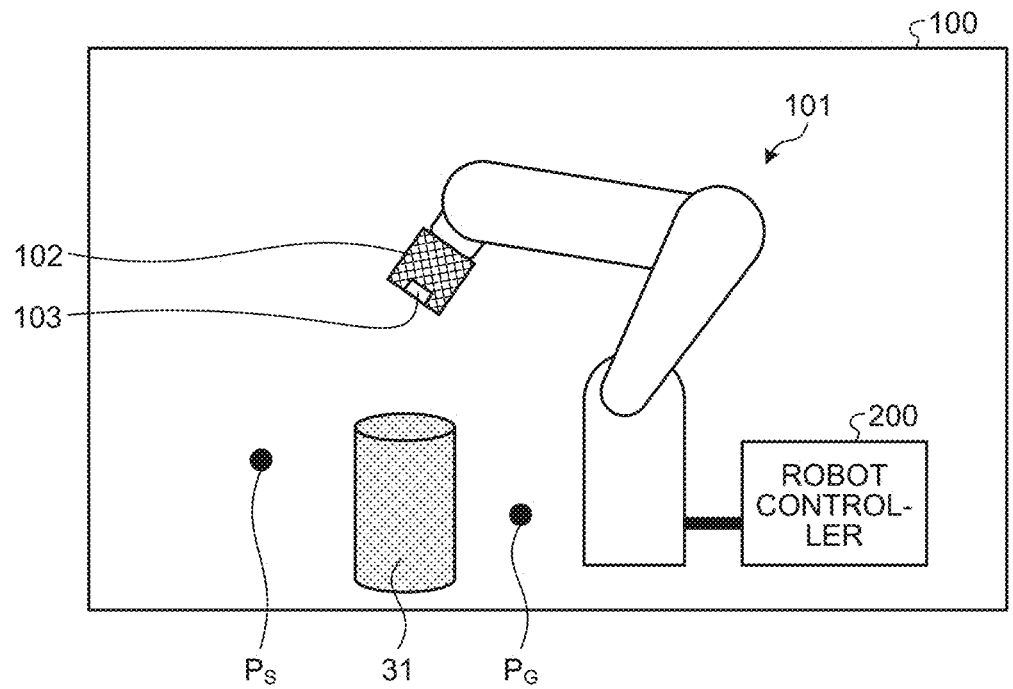
FIG. 1 is a diagram illustrating a schematic configuration of a robot system including a robot controller according to a first embodiment.

FIG. 1 is a diagram illustrating a schematic configuration of a robot system including a robot controller according to a first embodiment. A robot system 100 includes a robot 101 and a robot controller 200 that controls the robot 101. The robot 101 is a device that holds and conveys a workpiece 103, and includes an end effector 102 that holds the workpiece 103. The robot 101 is used for product production or the like.

The workpiece 103 is an object to be conveyed by the robot 101. The robot controller 200 is a computer that controls each motor included in the robot 101 to control an action of each shaft connected to the corresponding motor. The robot controller 200 controls the position of the end effector 102 by controlling the action of the shaft of the robot 101.

Note that in the following description, the end effector 102 holding the workpiece 103 is referred to as the end effector 102. Therefore, the robot controller 200 controls the robot 101 such that the robot 101 including the end effector 102 does not clash with an obstacle 31. In the following description, a clash between the end effector 102 and the obstacle 31 will be described as an example of a clash between the robot 101 and the obstacle 31. That is, the robot controller 200 of the first embodiment controls the robot 101 such that the end effector 102 does not clash with the obstacle 31. Specifically, the robot controller 200 controls the robot 101 such that the end effector 102 does not clash with the obstacle 31 when the end effector 102 moves from an action start point $P_S$ to an action goal point $P_G$.

Figure 2:
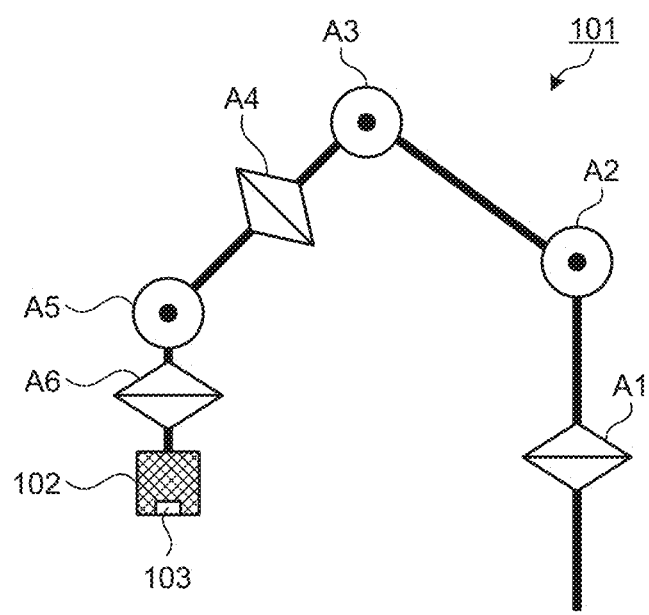
FIG. 2 is a diagram illustrating an example of a robot to be controlled by the robot controller according to the first embodiment.

FIG. 2 is a diagram illustrating an example of the robot to be controlled by the robot controller according to the first embodiment. FIG. 2 illustrates axes of the robot 101. Although FIG. 2 illustrates a case where the robot 101 includes six axes being a first axis A1 to a sixth axis A6, the number of axes of the robot 101 may be five or less, or seven or more. The robot 101 moves the end effector 102 by operating the first axis A1 to the sixth axis A6.

Figure 3:
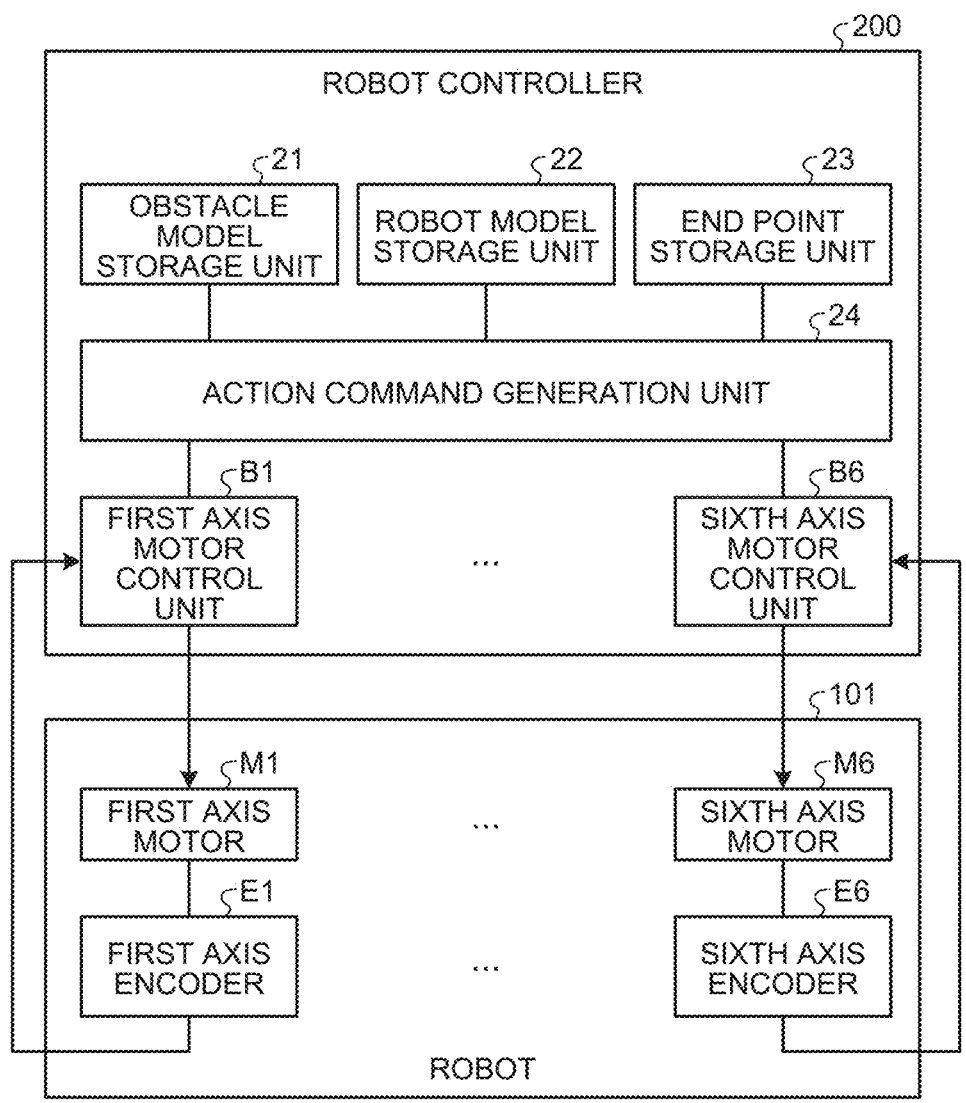
FIG. 3 is a diagram illustrating a configuration of the robot controller according to the first embodiment.

FIG. 3 is a diagram illustrating a configuration of the robot controller according to the first embodiment. The robot controller 200 includes an obstacle model storage unit 21, a robot model storage unit 22, an end point storage unit 23, an action command generation unit 24, and axis motor control units. The robot 101 includes axis motors and axis encoders.

The number of the axis motor control units disposed in the robot controller 200 corresponds to the number of axes of the robot 101. Therefore, the robot controller 200 includes six of the axis motor control units, that is, a first axis motor control unit 31 to a sixth axis motor control unit B6. Note that FIG. 3 omits the illustration of a second axis motor control unit B2 to a fifth axis motor control unit B5.

The number of the axis motors disposed in the robot 101 corresponds to the number of axes of the robot 101. Therefore, the robot 101 includes six of the axis motors, that is, a first axis motor M1 to a sixth axis motor M6. Note that FIG. 3 omits the illustration of a second axis motor M2 to a fifth axis motor M5.

The number of the axis encoders disposed in the robot 101 corresponds to the number of axes of the robot 101. Therefore, the robot 101 includes six of the axis encoders, that is, a first axis encoder E1 to a sixth axis encoder E6. Note that FIG. 3 omits the illustration of a second axis encoder E2 to a fifth axis encoder E5.

The obstacle model storage unit 21 stores obstacle information of all obstacles included in the robot system 100 such as the obstacle 31. The obstacle information as an obstacle model is information indicating a shape and a position of placement of the obstacle 31. An example of the obstacle information is three dimensional computer aided design (3D CAD) data of the obstacle 31. The obstacle information may also be shape and position information of a simple model that envelops the obstacle 31.

The robot model storage unit 22 stores robot information that is information regarding the robot 101. The robot information includes at least shape information indicating a shape of the robot 101, dimension information indicating dimensions of the robot 101, the maximum velocity of rotation that can be achieved by the axis motors, torque constraint information that is information on constraints of torque of the axis motors, and information on an angular range of an angle of rotation that can be achieved by the axis motors.

The end point storage unit 23 stores end point information that is information related to the action start point $P_S$ and the action goal point $P_G$. The end point information includes coordinates of the end effector 102, information on an attitude of the end effector 102, and information on a joint angle of each axis of the robot 101 at the action start point. $P_S$. The end point information further includes coordinates of the end effector 102, information on an attitude of the end effector 102, and information on a joint angle of each axis of the robot 101 at the action goal point $P_G$.

The action command generation unit 24 is connected to the obstacle model storage unit 21, the robot model storage unit 22, and the end point storage unit 23. The action command generation unit 24 reads the obstacle information from the obstacle model storage unit 21, reads the robot information from the robot model storage unit 22, and reads the end point information from the end point storage unit 23.

On the basis of the obstacle information, the robot information, and the end point information, the action command generation unit 24 generates a trajectory of the end effector 102 when it moves from the action start point $P_S$ to the action goal point $P_G$ designated while avoiding the obstacle 31 placed in the robot system 100. Specifically, the action command generation unit 24 generates a trajectory satisfying the constraints on the robot 101 on the basis of the robot information and the end point information, and determines whether or not the trajectory collides with the obstacle 31 on the basis of the generated trajectory and the obstacle information. Hereinafter, the obstacle information, the robot information, and the end point information may be referred to as action information. The action command generation unit 24 outputs an action command for the axis motors corresponding to the generated trajectory to the axis motor control units.

The axis motors in the robot 101 are connected to the axis encoders. The axis encoders acquire joint angle data that is data of the joint angle of the axis motors in real time, and feeds back the joint angle data to the axis motor control units.

The axis motor control units perform feedback control on the axis motors by using the joint angle data transmitted from the axis encoders.

Figure 4:
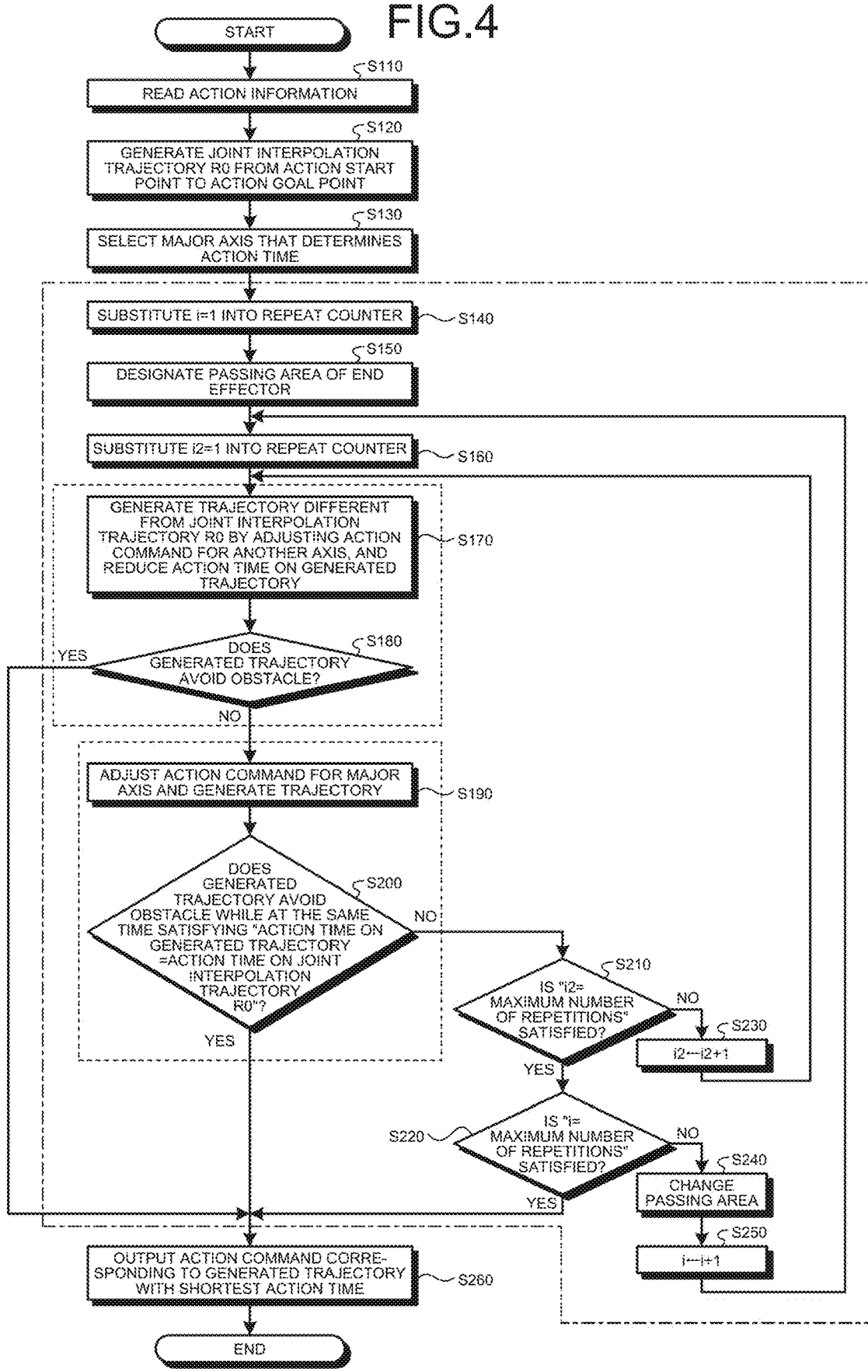
FIG. 4 is a flowchart illustrating a procedure of trajectory generation processing by the robot controller according to the first embodiment.

Next, a procedure in which the action command generation unit 24 generates the trajectory of the end effector 102 will be described. FIG. 4 is a flowchart illustrating the procedure of trajectory generation processing by the robot controller according to the first embodiment.

The action command generation unit 24 reads the action information (step S110). The action information includes the obstacle information, the robot information, and the end point information. Specifically, the action command generation unit 24 reads the obstacle information from the obstacle model storage unit 21, reads the robot information from the robot model storage unit 22, and reads the end point information from the end point storage unit 23. The end point information includes the joint angles of the axes of the robot 101 at the act on start point $P_S$ and the action goal point $P_G$.

Next, the action command generation unit 24 generates a joint interpolation trajectory R0 from the action start point $P_S$ to the action goal point $P_G$ (step S120). The joint interpolation trajectory R0 is a trajectory that minimises the action time of the robot 101 when the end effector 102 moves from the action start point $P_S$ to the action goal point $P_G$ without considering the obstacle 31.

The action command generation unit 24 generates an action command for each axis on the basis of the joint interpolation trajectory R0. The action command corresponding to the joint interpolation trajectory R0 is a first action command. The first action command includes an other axis command that is an action command for another axis, and a major axis command that is an action command for a major axis. The action time when the robot 101 operates in accordance with the first action command is a first action time.

The first embodiment will describe a case where the robot controller 200 uses, as the action command, a velocity command value for each axis included in the robot 101. The action command generation unit 24 sets the joint interpolation trajectory R0 generated as a temporary trajectory.

Next, the action command generation unit 24 selects, from among the axes, the major axis having the largest contribution to the action time on the temporary trajectory. That is, the action command generation unit 24 selects, from among the axes, the major axis that determines the action time on the temporary trajectory (step S130). The action command generation unit 24 further selects the action command for the major axis from among the action commands for the axes included in the temporary trajectory.

In the first embodiment, the major axis is defined as an axis having the largest change in the angle from the action start point $P_S$ to the action goal point $P_G$ with respect to the maximum velocity that can be output by the axis motors. The major axis can be regarded as an axis that contributes most to the action time, that is, an axis with the longest action time in a case where the action is performed in the shortest time from the action start point $P_S$ to the action goal point $P_G$ without considering the obstacle 31.

The major axis is an axis in which the angular velocity of the axis motor that drives the axis coincides with the maximum velocity that can be achieved by the axis motor in the action in which the change in the angle of at least one axis sufficiently large when the action is performed in the shortest time from the action start point $P_S$ to the action goal point $P_G$ without considering the obstacle 31. When the changes in the angle of all the axes are small, the major axis is an axis in which a ratio of the maximum velocity reached during the action with respect to the maximum velocity that can be achieved by the axis motor is less than one and is maximum. Note that in the following description, axes other than the major axis may be referred to as other axes.

Figure 5:
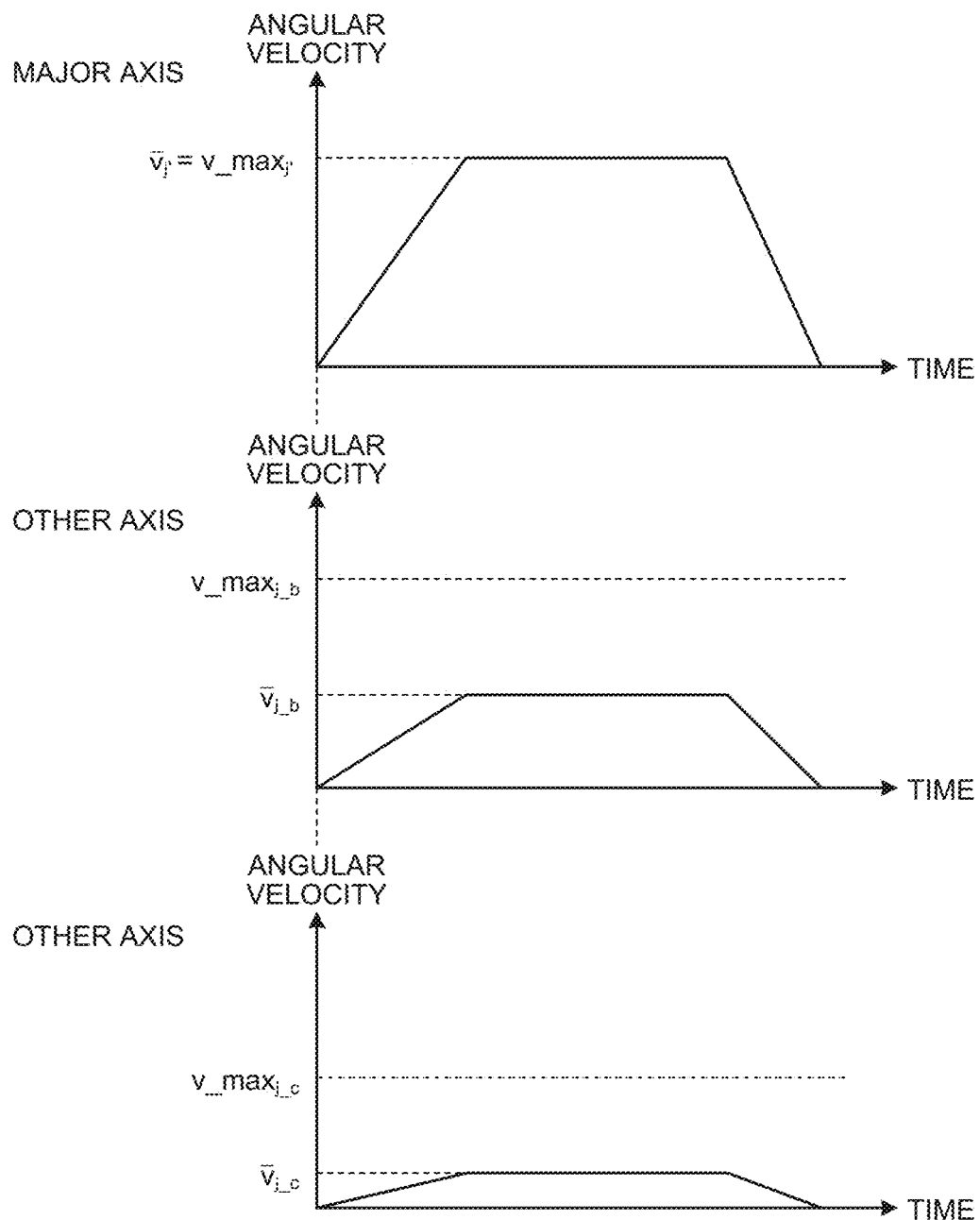
FIG. 5 is a set of graphs for explaining a major axis selected by the robot controller according to the first embodiment.

FIG. 5 is a set of graphs for explaining the major axis selected by the robot controller according to the first embodiment. Here, a description will be made of the major axis in a case where the robot 101 includes three axes. FIG. 5 illustrates a change in the angular velocity corresponding to the velocity command value for each of the major axis and the other axes in a case where the robot 101 is operated on the joint interpolation trajectory R0.

Hereinafter, the major axis or the other axes may be referred to as an axis "j". Also, the major axis may be referred to as a major axis "j'". FIG. 5 illustrates a graph of the angular velocity for the major axis "j'", a graph of the angular velocity for another axis j_b that is an axis other than the major axis, and a graph of the angular velocity for another axis j_c that is an axis other than the major axis "j'". In each graph, the horizontal axis represents time, and the vertical axis represents the angular velocity of the axis.

In FIG. 5, the top graph is the graph of the angular velocity corresponding to the velocity command value for the major axis "j'", the middle graph is the graph of the angular velocity corresponding to the velocity command value for the other axis j_b, and the bottom graph is the graph of the angular velocity corresponding to the velocity command value for the other axis j_c. The action command generation unit 24 selects, as the major axis "j'", the axis "j" satisfying the following expression (1).

[Expression 1]

$$j' = \max_j |(\theta_{Gj} - \theta_{sj})/v\_max_j| \quad (1)$$

Here, "$\theta_{sj}$" is the angle of the axis "j" at the action start point $P_S$, "$\theta_{Gj}$" is the angle of the axis "j" at the action goal point $P_G$, and "$v\_max_j$" is the maximum velocity that can be achieved by the axis motor of the axis "j". Expression (1) is an expression for selecting the major axis "j'" that determines the action time of a temporary action. The right side of expression (1) indicates how large a change in the angle of the axis "j" is with respect to the maximum velocity $v\_max_j$ that can be achieved by the axis motor of the axis "j". The axis "j" having the maximum value obtained when the change in the angle is divided by the maximum velocity $v\_max_j$ is the major axis "j". That is, the axis having the largest ratio of the change in the angle of the axis "j" with respect to the maximum velocity $v\_max_j$ that can be output by the axis motor is the major axis.

As illustrated in the graph of the angular velocity corresponding to the velocity command value for the major axis "j'", when the change in the angle of the major axis "j'" is sufficiently large, the maximum velocity $v_{-j}'$ of the axis motor of the major axis "j'" achieved during the action coincides with the maximum velocity $v\_max_{j'}$ that can be achieved by the axis motor of the major axis "j'". Here, "-" is an overbar and is attached to the top of "$v_j$". Likewise, every "-" in the following description is an overbar. The action command generation unit 24 calculates the maximum velocity $v_{-j}$ of the motor achieved by the other axis other than the major axis "j'" in the temporary trajectory on the basis of the following expression (2).

[Expression 2]

$$\overline{v}_j = \frac{(\theta_{Gj} - \theta_{sj})}{(\theta_{Gj'} - \theta_{sj'})} * v\_max_{j'} \quad (2)$$

In FIG. 5, the maximum velocity that can be achieved by the axis motor of the other axis j_b is indicated by "$v0\_max_{j\_b}$", and the maximum velocity that can be achieved by the axis motor of the other axis j_c is indicated by "$v\_max_{j\_c}$". Moreover, the maximum velocity of the other axis j_b achieved during the action of the other axis j_b on the temporary trajectory is indicated by the maximum velocity $v_{-j\_b}$, and the maximum velocity of the other axis j_c achieved during the action of the other axis j_c on the temporary trajectory is indicated by the maximum velocity $v_{-j\_c}$.

Upon selecting the action command for the major axis, the action command generation unit. 24 initializes a first repeat counter. That is, the action command generation unit 24 substitutes i=1 into the first repeat counter (step S140). The first repeat counter is a counter that counts the number of repetitions when processing of changing a passing area to be described later is repeated. The first repeat counter is used in processing of step S220.

Next, the action command generation unit 24 sets candidates for the passing area and designates, from among the candidates, the passing area through which a specific position of the end effector 102 passes (step S150).

Figure 6:
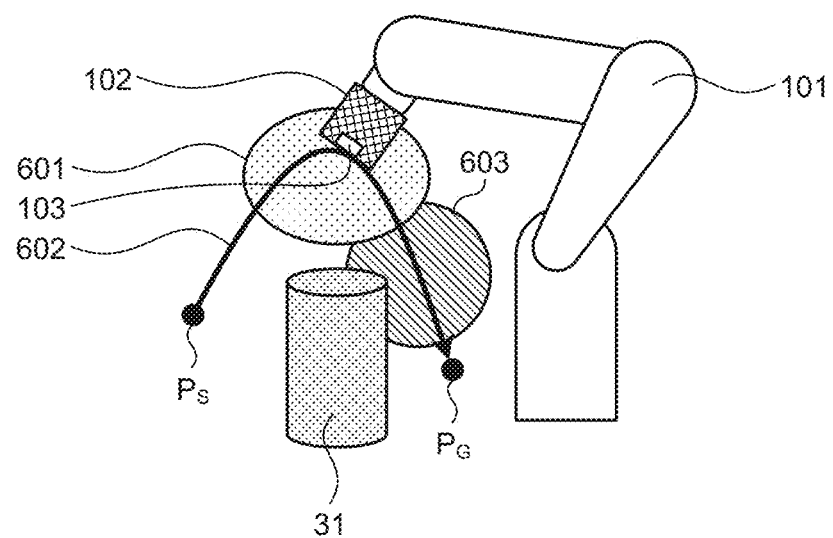
FIG. 6 is a diagram for explaining a passing area set by the robot controller according to the first embodiment.

FIG. 6 is a diagram for explaining the passing area set by the robot controller according to the first embodiment. FIG. 6 illustrates a passing area 601 and a passing area 603 as examples of the candidates for the passing area.

The candidates for the passing area are set in advance by a user on the basis of the placement of the obstacle 31. Note that the action command generation unit 24 may set the candidate for the passing area in an area where the obstacle 31 is absent on the basis of the obstacle information acquired from the obstacle model storage unit 21.

In designating the passing area, the action command generation unit 24 designates one passing area from among a plurality of the candidates for the passing area. Here, a case where the action command generation unit 24 designates the passing area 601 will be described. The action command generation unit 24 generates a trajectory 602 on which the specific position of the end effector 102 passes through an arbitrary position in the passing area 601 at an arbitrary time.

The action command generation unit 24 generates the passing areas 601 and 603 and the trajectory 602 for a robot action space with respect to the entire robot 101, that is, an XYZ space. Note that the action command generation unit 24 may generate the passing areas 601 and 603 and the trajectory 602 for a joint angle space with respect to the joint angle of the robot 101.

The action command generation unit 24 initializes a second repeat counter after designating the passing area. That is, the action command generation unit 24 substitutes i2=1 into the second repeat counter (step S160). The second repeat counter is a counter that counts the number of repetitions when processing of generating a trajectory for one passing area is repeated. The second repeat counter is used in processing of step S210.

After initializing the second repeat counter, the action command generation unit 24 generates a trajectory on the basis of the passing area selected in step S150. In this case, on the basis of the generated trajectory, the action command generation unit 24 generates an action command for the other axis other than the major axis and an action command for the major axis.

In a case where the action time of the action command for the other axis is longer than the first action time, the action command generation unit 24 adjusts the action command for the other axis to generate a trajectory different from the joint interpolation trajectory R0, thereby reducing the action time for the generated trajectory (step S170). The action time of the robot 101 corresponding to the action command for the other axis is a second action time. In step S170, the action command generation unit 24 adjusts the action command for the other axis so as to reduce the second action time.

The action command including the action command for the other axis that has been adjusted and the action command for the major axis that has not been adjusted is a second action command. A trajectory corresponding to the second action command is a first trajectory. After adjusting the action command for the other axis, the action command generation unit 24 generates a trajectory using the action command that has been adjusted. This trajectory may be a trajectory that avoids the obstacle 31.

In addition, the action command generation unit 24 determines whether or not the trajectory that has been generated satisfies a specific condition. Specifically, the action command generation unit 24 determines whether or not the generated trajectory, which is the trajectory that has been generated, avoids the obstacle 31 on the basis of the obstacle information (step S180). Note that since the joint interpolation trajectory R0 is the trajectory corresponding to the shortest action time, the action time on the generated trajectory is not shorter than that on the joint interpolation trajectory R0. Also, since only the adjustment of the action command for the other axis is made here, the action time on the generated trajectory is not longer than that on the joint interpolation trajectory R0. That is, at this point, the action time on the generated trajectory is the same as the action time on the joint interpolation trajectory R0, which is the shortest action time.

If the generated trajectory avoids the obstacle 31 (Yes in step S180), the action command generation unit 24 proceeds to processing of step S260. That is, the action command generation unit 24 outputs the action command corresponding to the generated trajectory with the shortest action time. The generated trajectory stored in the action command generation unit 24 here is the generated trajectory corresponding to the shortest action time. Therefore, the action command generation unit 24 outputs, from the second action command, the action command corresponding to the first trajectory that avoids the obstacle 31.

If the generated trajectory interferes with the obstacle 31 (No in step S180), the action command generation unit 24 adjusts the action command for the major axis and generates a trajectory using the action command that has been adjusted (step S190). The action command including the action command for the other axis that has been adjusted and the action command for the major axis that has been adjusted is a third action command. The action time of the robot 101 according to the third action command is a third action time, and a trajectory corresponding to the third action command is a second trajectory. Hereinafter, the action commands adjusted in steps S170 and S190 may be referred to as adjusted action commands.

The action command generation unit 24 determines whether or not the generated trajectory satisfies a specific condition. Specifically, the action command generation unit 24 generates a trajectory on the basis of the adjusted action commands for the other axis and the major axis. Then, the action command generation unit 24 determines whether or not the generated trajectory avoids the obstacle 31 and satisfies "the action time on the generated trajectory=the action time on the joint interpolation trajectory R0" (step S200). At this time, the action command generation unit 24 determines whether or not the generated trajectory avoids the obstacle 31 on the basis of the obstacle information.

If the condition in step S5200 is satisfied (Yes in step S200), the action command generation unit 24 outputs the action command corresponding to the generated trajectory with the shortest action time to the axis motor control units (step S260). The action command generation unit 24 calculates the action time on the basis of the generated trajectory stored. The action command generation unit 24 selects the shortest action time from among the action times and outputs the action command corresponding to the generated trajectory with the shortest action time. Here, the action command generation unit 24 outputs, from the third action command, the action command corresponding to the second trajectory that avoids the obstacle 31 and has the shortest action time.

If the condition in step S200 is not satisfied (No in step S200), the action command generation unit 24 determines whether or not a count on the second repeat counter indicates a set maximum value. That is, the action command generation unit 24 determines whether or not "i2=the maximum number of repetitions" is satisfied (step S210).

If "i2=the maximum number of repetitions" is not satisfied (No in step S210), the action command generation unit 24 adds one to "i2" (step S230) and returns to the processing of step S170.

In this case, the action command generation unit 24 changes an action command parameter indicating a condition of the action of the robot 101, and executes the processing of step S170. That is, the action command generation unit 24 searches for an action command that can avoid a clash while changing the action command parameter. Specifically, the action command generation unit 24 changes, as the action command parameter, at least one of the number of angle changes of each axis motor, the start timing of each angle change, the maximum velocity in each angle change, the output time that is the length of time during which each axis motor outputs the maximum velocity, the acceleration in each angle change, and the deceleration in each angle change to a new value, and then executes the processing of step S170.

As a result, the action command generation unit 24 executes the processing of step S170 a plurality of times, thereby being able to execute the processing of step S170 under a plurality of conditions. One angle change of each axis motor corresponds to an action from when the velocity of each axis motor is zero to when the velocity of each axis motor becomes zero again after acceleration or deceleration is performed.

If "i2=the maximum number of repetitions" is satisfied (Yes in step S210), the action command generation unit. 24 determines whether or not a count on the first repeat counter indicates a set maximum value. That is, the action command generation unit 24 determines whether or not "i=the maximum number of repetitions" is satisfied (step S220).

If "i=the maximum number of repetitions" is satisfied (Yes in step S220), the action command generation unit 24 outputs the action command corresponding to the generated trajectory with the shortest action time to the axis motor control units (step S260).

If "i=the maximum number of repetitions" is not satisfied. (No in step S220), the action command generation unit 24 changes the passing area (step S240). That is, the action command generation unit 24 designates another passing area from the passing areas being set. Then, the action command generation unit 24 adds one to "i" (step S250) and returns to the processing of step S160.

Figure 7:
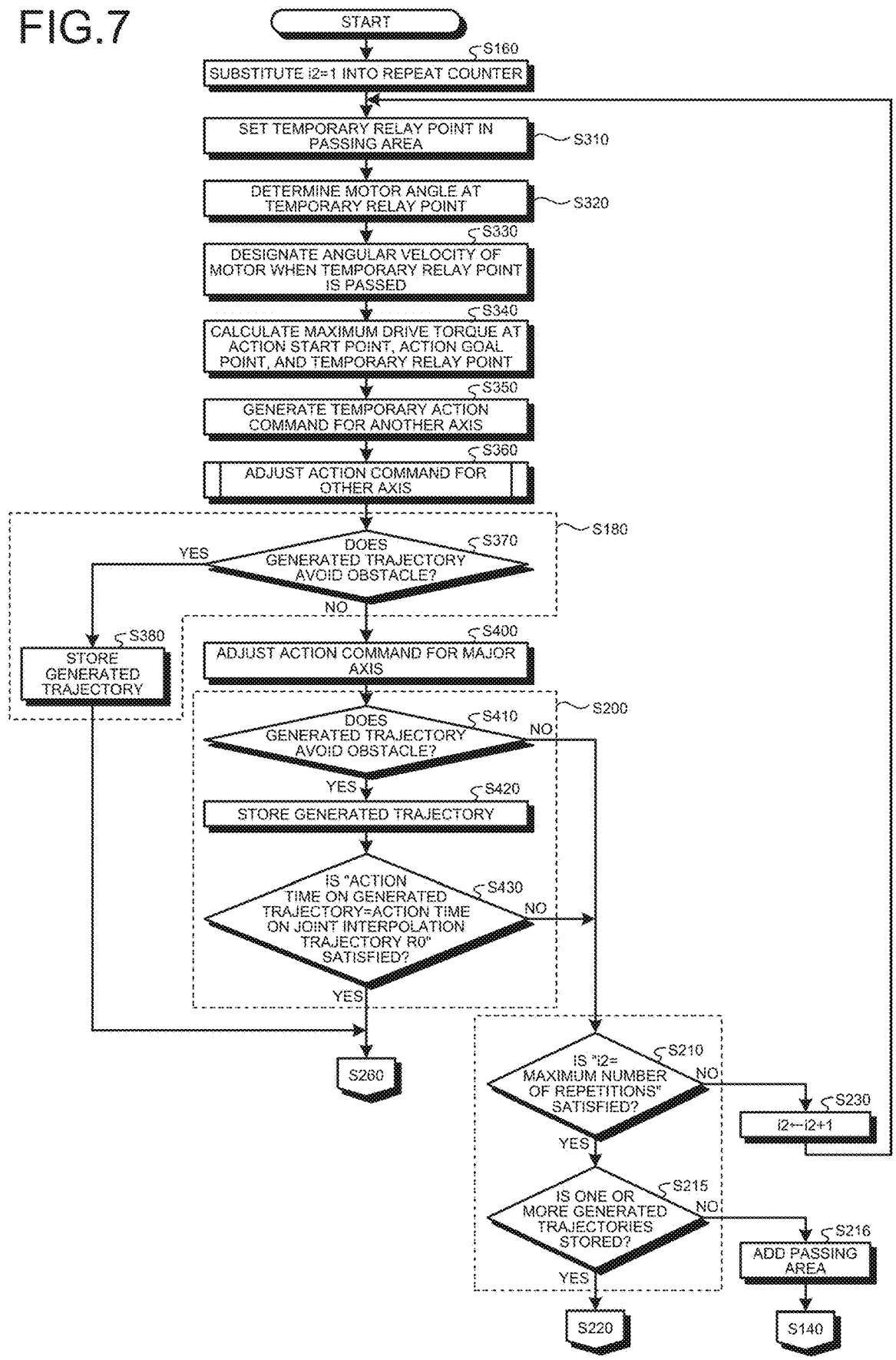
FIG. 7 is a flowchart illustrating a detailed procedure of processing in which the robot controller according to the first embodiment generates a trajectory on the basis of a passing area.

Here, a description will be made of processing in which the action command generation unit 24 generates the trajectory on the basis of the passing area. FIG. 7 is a flowchart illustrating a detailed procedure of the processing in which the robot controller according to the first embodiment generates the trajectory on the basis of the passing area. The processing of steps S310 to S430 described below corresponds to the processing of steps S170 to S200 described in FIG. 4.

The action command generation unit 24 initializes the second repeat counter, that is, substitutes i2=1 into the second repeat counter (step S160).

Upon substituting i2=1 into the second repeat counter, the action command generation unit 24 sets a temporary relay point (Hereinafter referred to as a temporary relay point $P_R$) through which a specific position of the end effector 102 passes at an arbitrary point in the passing area (step S310).

The action command generation unit 24 also determines a motor angle of each axis motor of the robot 101 such that the specific position of the end effector 102 reaches the temporary relay point $P_R$. In other words, the action command generation unit 24 determines the motor angle of each axis motor of the robot 101 at the temporary relay point $P_R$ (step S320). That is, the action command generation unit 24 sets a set of joint angles including the end effector 102 for the temporary relay point $P_R$ in the passing area.

Note that instead of the action command generation unit 24, a user may designate an arbitrary position in the passing area as the temporary relay point $P_R$ and the attitude of the robot 101 at that time. Also, the action command generation unit 24 may randomly select a point in the passing area as the temporary relay point $P_R$. The temporary relay point $P_R$ does not have to be passed on the trajectory and is temporarily designated to calculate an initial trajectory.

Next, the action command generation unit 24 designates the angular velocity of each axis motor at the motor angle of each axis motor determined in step S320. That is, the action command generation unit 24 designates a passing velocity when the temporary relay point $P_R$ is passed with the determined joint angle (step S330). The angular velocity designated here is an angular velocity temporarily set for calculating the initial trajectory.

Next, on the basis of the end point information, the position of the temporary relay point $P_R$ designated, and the angular velocity designated, the action command generation unit 24 calculates the maximum drive torque that can be used to drive each axis at the action start point the action goal point $P_G$, and the temporary relay point $P_R$ (step S340). Next, the action command generation unit 24 generates a temporary action command for another axis that is an axis other than the major axis (step S350).

Figure 8:
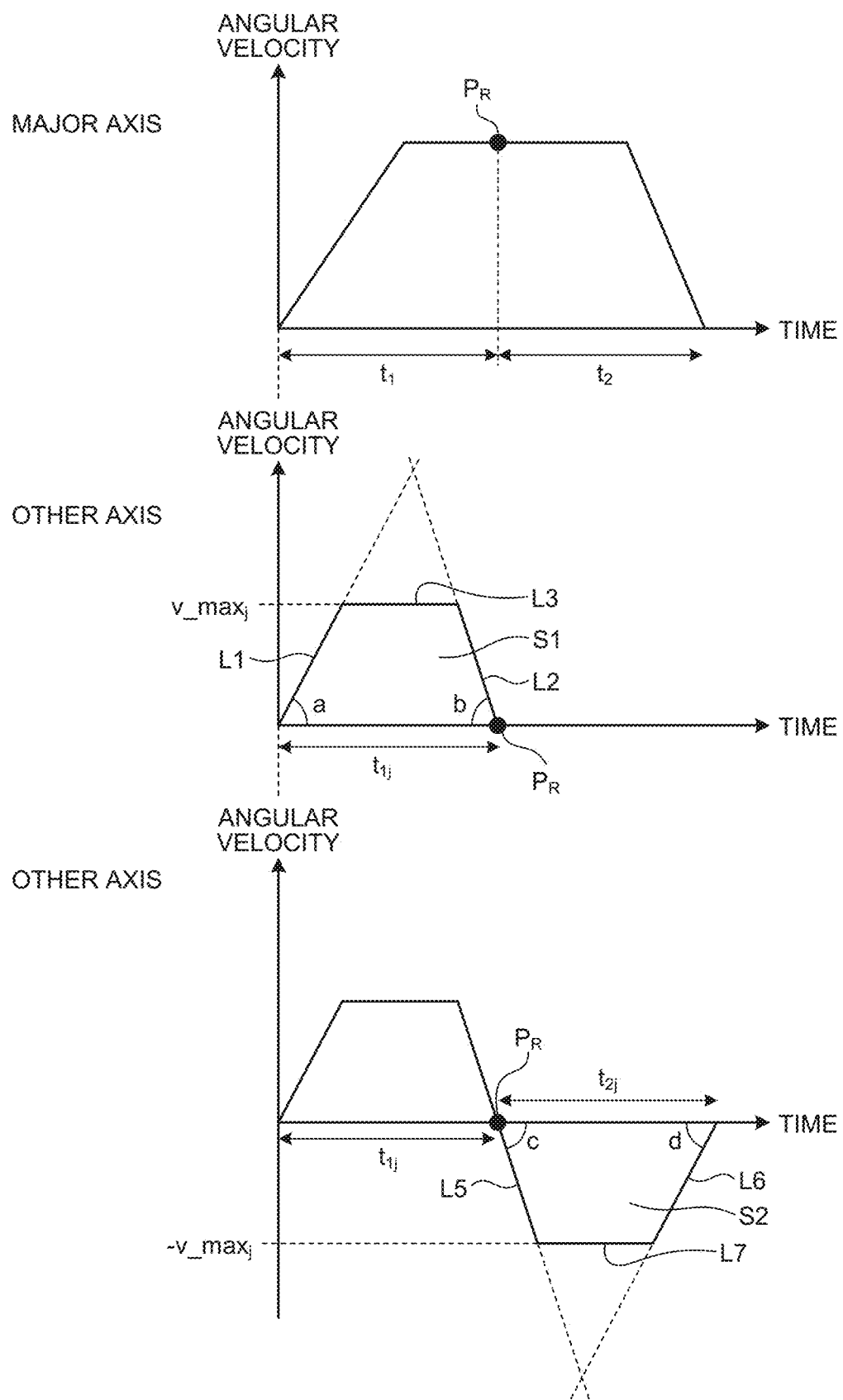
FIG. 8 is a set of graphs for explaining processing in which the robot controller according to the first embodiment generates a temporary action command for another axis.
Figure 9:
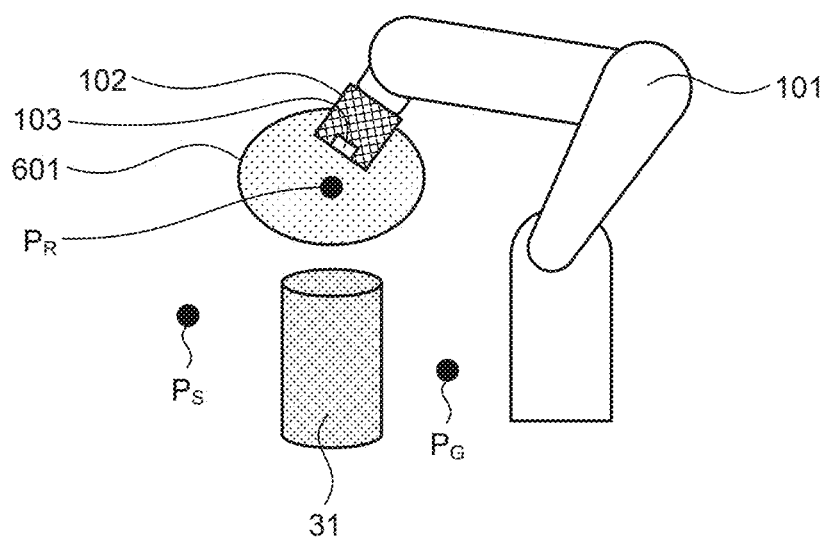
FIG. 9 is a diagram for explaining a temporary relay point used when the robot controller according to the first embodiment generates the temporary action command for the other axis.

FIG. 8 is a set of graphs for explaining processing in which the robot controller according to the first embodiment generates the temporary action command for the other axis. FIG. 9 is a diagram for explaining the temporary relay point used when the robot controller according to the first embodiment generates the temporary action command for the other axis. As illustrated in FIG. 9, the temporary relay point $P_R$ is set within the passing area 601.

The top graph of FIG. 8 is a graph of the angular velocity with respect to the major axis "j'". The middle graph is a graph of the angular velocity when the other axis j_b accelerates at the maximum drive torque at the action start point $P_S$, and the bottom graph is a graph of the angular velocity when the other axis j_b accelerates at the maximum drive torque at the temporary relay point $P_R$. In each graph, the horizontal axis represents time, and the vertical axis represents the angular velocity.

First, the top graph of FIG. 8 will be described. The action command generation unit 24 uses the action command for the major axis "j'" on the joint interpolation trajectory R0 to obtain an action time $t_1$ from the action start point $P_S$ to the temporary relay point $P_R$ and an action time $t_2$ from the temporary relay point $P_R$ to the action goal point $P_G$. The action time $t_1$ is the time at which a change in the angle from an angle $\theta_{Sj'}$ of the major axis "j'" at the action start point $P_S$ to an angle $\theta_{Rj'}$ of the major axis "j'" at the temporary relay point $P_R$ coincides with an integral value of the action command for the major axis "j'" from time t=0 to $t_1$.

Next, a method of generating the temporary action command for the axis j_b other than the major axis "j'" will be described using the middle graph of FIG. 8. The action command generation unit 24 calculates a slope of a command line L1 when acceleration is performed at the maximum drive torque at the action start point $P_S$. The action command generation unit 24 also calculates a slope of a command line L2 when deceleration is performed at the maximum drive torque to the temporary relay point $P_R$. The action command generation unit 24 further generates a command line L3 indicating the maximum velocity that can be achieved by each axis motor of the robot 101.

The action command generation unit 24 calculates an area S1 of a trapezoid bounded by four straight lines being the command lines L1, L2, and L3 and a line of zero angular velocity. Here, the command line L1 and the line of zero angular velocity intersect at time t=0. The action command generation unit 24 determines the time at which the command line L2 and the line of zero angular velocity intersect such that the value of the area S1 equals an absolute value $|\theta_{Rj}-\theta_{Sj}|$ of the change in the angle from the action start point $P_S$ to the temporary relay point $P_R$ of the axis j_b. The action time from time t=0 to the time at which the command line L2 intersects the line of zero angular velocity is an action time $t_{1j'}$. Therefore, the command line L2 and the line of zero angular velocity intersect at time $t_{1j'}$. The angle $\theta_{Sj}$ is the angle of the axis j_b at the action start point $P_S$, and the angle $\theta_{Rj}$ is the angle of the axis j_b at the temporary relay point $P_R$.

When "a" (>0) is the slope of the command line L1 and "b" (<0) is the slope of the command line L2, the action command generation unit 24 can calculate the time $t_{1j}$, at which the command line L2 intersects the line of zero angular velocity, on the basis of the following expression (3).

[Expression 3]

$$t_{1j} = \frac{|\theta_{Rj} - \theta_{Sj}|}{v\_max_j} + \frac{v\_max_j}{2}\left(\frac{1}{a} - \frac{1}{b}\right) \tag{3}$$

Here, when $t_{1j} > t_1$, a waveform of the trapezoid bounded by the four straight lines described above is the action command for the axis j_b from the action start point $P_S$ to the temporary relay point $P_R$.

On the other hand, when $t_{1j} \leq t_1$, the action command generation unit 24 changes the maximum velocity during the action from, "v_max$_j$" to "ovrd$_{1j}$*v_max$_j$" such that the action time from the action start point $P_S$ to the temporary relay point $P_R$ equals $t_1$. The action command generation unit 24 calculates "ovrd$_{1j}$*v_max$_j$" by solving the following expression (4) for "ovrd$_{1j}$".

[Expression 4]

$$|\theta_{Rj} - \theta_{Sj}| = \frac{ovrd_{1j} * v\_max_j}{2} * \left(2t_1 - ovrd_{1j} * v\_max_j * \left(\frac{1}{a} - \frac{1}{b}\right)\right), \tag{4}$$
$$0 < ovrd_{1j} \leq 1$$

Next, the bottom graph of FIG. 8 will be described. The action command generation unit 24 calculates a slope of a command line L5 when acceleration is performed at the maximum drive torque from the temporary relay point $P_R$. The action command generation unit 24 also calculates a slope of a command line L6 when deceleration is performed at the maximum drive torque to the action goal point $P_G$. The action command generation unit 24 further generates a command line L7 indicating the maximum velocity that can be achieved by each axis motor of the robot 101.

The action command generation unit 24 calculates an area S2 of a trapezoid bounded by four straight lines being the command lines L5, L6, and L7 and the line of zero angular velocity.

The action command generation unit 24 determines time $t_{1j}+t_{2j}$ at which the command line L6 and the line of zero angular velocity intersect such that the value of the area S2 equals an absolute value $|\theta_{Gj}-\theta_{Rj}|$ of the change in the angle from the temporary relay point $P_R$ to the action goal point $P_G$ of the axis j_b. The angle $\theta_{Gj}$ is the angle of the axis j_b at the action goal point $P_G$, and the angle $\theta_{Pj}$ is the angle of the axis j_b at the temporary relay point $P_R$. Here, the line of zero angular velocity and the command line L5 intersect at a point of time $t_{1j}$. Therefore, the action time from time $t_{1j}$ to the time $t_{1j}+t_{2j}$ at which the command line L6 intersects the line of zero angular velocity is an action time $t_{2j}$.

When "c" (>0) is the slope of the command line L5 and "d" (<0) is the slope of the command line L6, the action command generation unit. 24 can calculate the time $t_{1j}+t_{2j}$ at which the command line L6 intersects the line of zero angular velocity, on the basis of the following expression (5).

[Expression 5]

$$t_{1j} + t_{2j} = t_{1j} + \frac{|\theta_{Rj} - \theta_{Gj}|}{v\_max_j} + \frac{v\_max_j}{2}\left(\frac{1}{c} - \frac{1}{d}\right) \tag{5}$$

Here, when $t_{2j} > t_2$, a waveform of the trapezoid bounded by the four straight lines being the command lines L5, L6, and L7 and the line of zero angular velocity is the action command for the axis j_b from the temporary relay point $P_R$ to the action goal point $P_G$.

On the other hand, when $t_{2j} \leq t_2$, the action command generation unit 24 changes the maximum velocity during the action from, "v_max$_j$" to "ovrd$_{2j}$*v_max$_j$" such that the action time from, the temporary relay point $P_R$ to the action goal point $P_G$ equals $t_2$. The action command generation unit 24 calculates "ovrd$_{2j}$*v_max$_j$" by solving the following expression (6) for "ovrd$_{2j}$".

[Expression 6]

$$|\theta_{Rj} - \theta_{Gj}| = \frac{ovrd_{2j} * v\_max_j}{2} \tag{6}$$
$$* \left(2t_1 - ovrd_{2j} * v\_max_j * \left(\frac{1}{c} - \frac{1}{d}\right)\right),$$
$$0 < ovrd_{2j} \leq 1$$

Processing of step S360 described below corresponds to the processing of step S170 described in FIG. 4, and processing of steps S370 and S380 corresponds to the processing of step S180 described in FIG. 4.

After generating the temporary action command for the other axis, the action command generation unit 24 adjusts the action command for the other axis (step S360). The action command generation unit 24 generates a trajectory using the action command for the other axis that has been adjusted. Details of the processing of step S360 for adjusting the action command for the other axis will be described later. In the first embodiment, the action command for the major axis is adjusted after the action command for the other axis is adjusted.

Next, the action command generation unit 24 calculates the action time on the trajectory on the basis of the action command for the other axis and the action command for the major axis that have been adjusted, and determines whether or not the action time on the trajectory satisfies a specific condition.

Specifically, the action command generation unit 24 determines whether or not the generated trajectory for the robot 101 avoids the obstacle 31 when the robot 101 is operated on the basis of the action command for the other axis and the action command for the major axis that have been adjusted (step S370). That is, the action command generation unit 24 determines whether or not a main body of the robot 101, the end effector 102, and the workpiece 103, which are the entire robot 101, clash with the obstacle 31 when the robot 101 as operated on the trajectory corresponding to the action command.

If the generated trajectory interferes with the obstacle 31 (No in step S370), the action command generation unit 24 adjusts the action command for the major axis without storing the generated trajectory as a candidate for an output trajectory (step S400). The action command generation unit 24 may adjust the action command for the major axis by shifting the start timing of the action command, or may adjust the action command for the major axis by changing the maximum velocity during the action.

On the other hand, if the generated trajectory avoids the obstacle 31 (Yes in stein S370), the action command generation unit 24 stores the generated trajectory as a candidate for the output trajectory (step S380). Note that the action command generation unit 24 may store the action command corresponding to the candidate for the output trajectory together with the candidate for the output trajectory. The action command generation unit 24 then proceeds to the processing of step S260.

Figure 10:
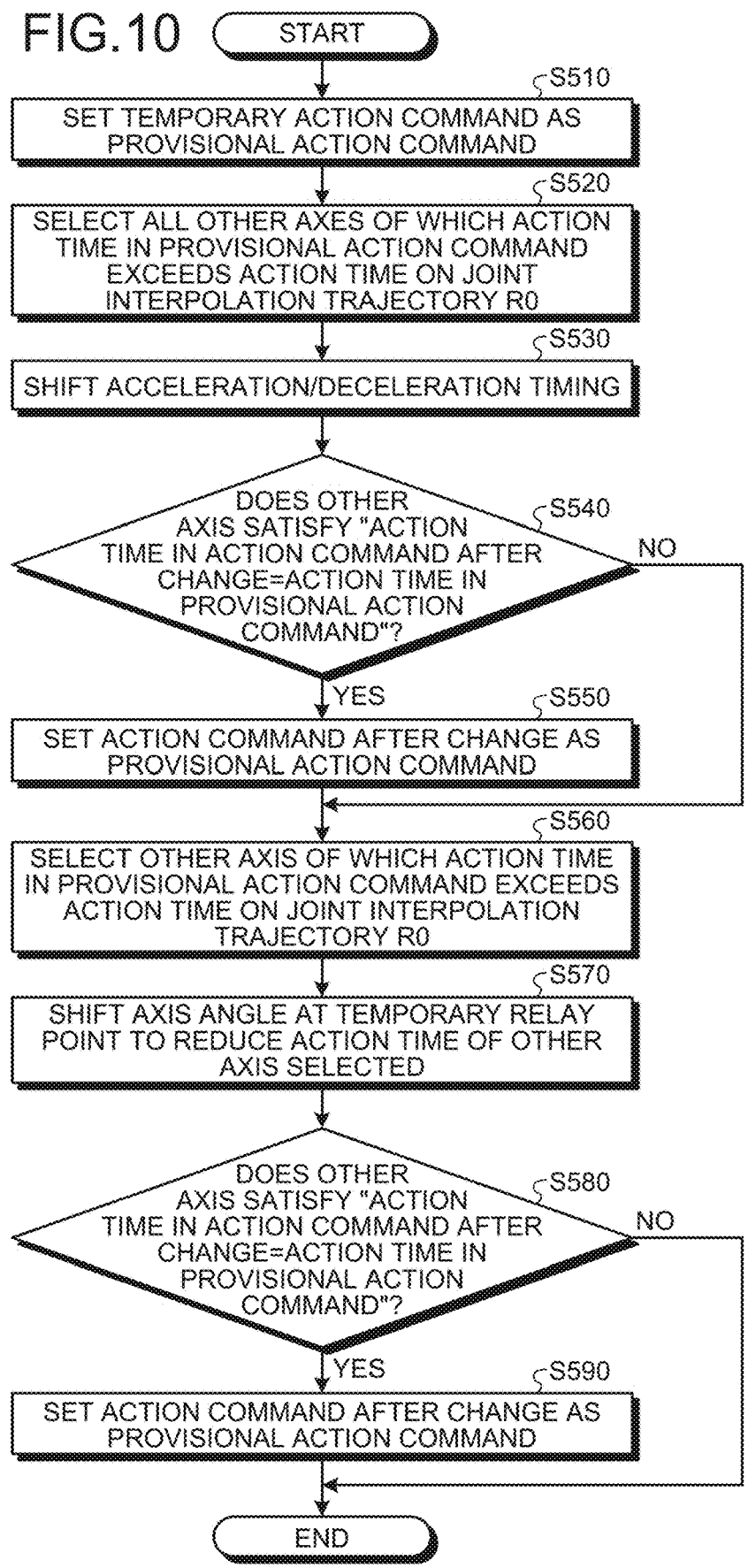
FIG. 10 is a flowchart illustrating a procedure of processing in which the robot controller according to the first embodiment adjusts an action command for the other axis.

Here, the detailed processing of step S360, that is, the processing of adjusting the action command for the other axis will be described, FIG. 10 is a flowchart illustrating a procedure of the processing in which the robot controller according to the first embodiment adjusts the action command for the other axis.

The action command generation unit 24 sets the temporary action command generated in step S350 of FIG. 7 as a provisional action command (step S510).

Next, the action command generation unit 24 selects all of the other axes of which the action time in the provisional action command exceeds the action time on the joint interpolation trajectory R0) (step S520).

Next, the action command generation unit 24 shifts the acceleration/deceleration timing of the action command so as to reduce the action time of the other axes selected (step S530). Specifically, the action command generation unit 24 determines an amount of shift of the acceleration/deceleration timing so as to reduce the action time of the other axes selected, and generates the action command on the basis of the determined amount of shift of the acceleration/deceleration timing. The action command generation unit 24 thus changes the action command so as to reduce the action time of the other axes selected.

Figure 11:
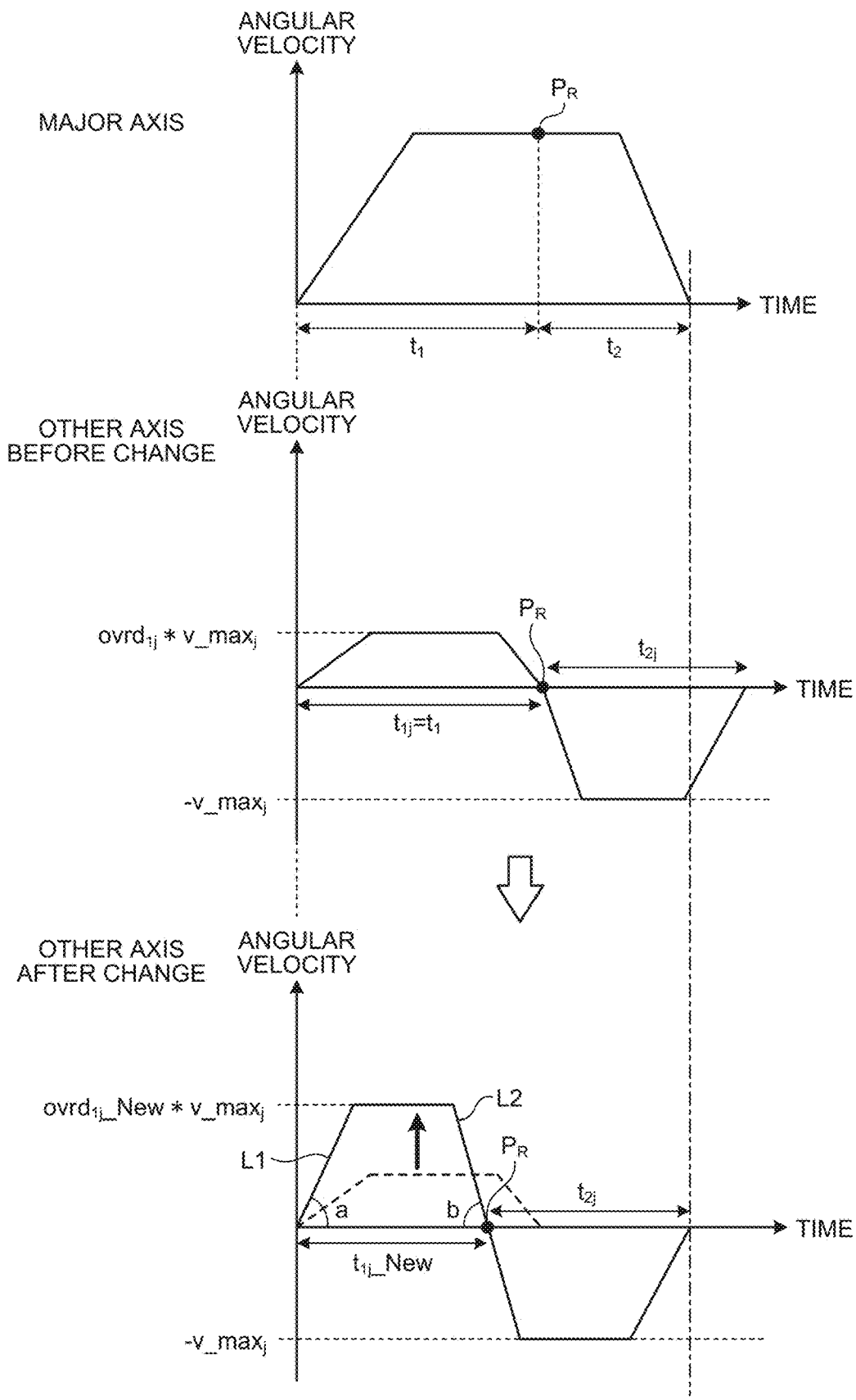
FIG. 11 is a set of graphs for explaining processing in which the robot controller according to the first embodiment shifts an acceleration/deceleration timing of the action command for the other axis.

FIG. 11 is a set of graphs for explaining the processing in which the robot controller according to the first embodiment shifts the acceleration/deceleration timing of the action command for the other axes. In FIG. 11, a case where the axis "j" is selected as the other axis will be described.

In FIG. 11, the top graph is a graph of the angular velocity corresponding to the velocity command value for the major axis, the middle graph is a graph of the angular velocity corresponding to the velocity command value before change for the other axis, and the bottom graph is a graph of the angular velocity corresponding to the velocity command value after change for the other axis. In each graph, the horizontal axis represents time, and the vertical axis represents the angular velocity of the axis. In the bottom graph of FIG. 11, the waveform of the angular velocity before change is indicated by a dotted line, and the waveform of the angular velocity after change is indicated by a solid line. Similarly, in a graph illustrating both a dotted waveform and a solid waveform in FIG. 11 and subsequent drawings, the dotted waveform indicates the angular velocity before charge, and the solid waveform indicates the angular velocity after change.

The action command generation unit 24 uses the temporary action command generated in step S350 to calculate the act on time $t_{1j}$ from the action start point $P_S$ to the temporary relay point $P_R$ for the axis "j" and the action time $t_1$ from the action start point $P_S$ to the temporary relay point $P_R$ for the major axis. The action command generation unit 24 checks whether $t_{1j}=t_1$ is satisfied.

Next, the action command generation unit 24 uses the temporary action command generated in step S350 to calculate the action time $t_{2j}$ from the temporary relay point $P_R$ to the action goal point $P_G$ for the axis "j" and the action time $t_2$ from the temporary relay point $P_R$ to the action goal point $P_G$ for the major axis. The action command generation unit 24 checks whether $t_{2j}=t_2$ is satisfied.

In a case where both $t_{1j}=t_1$ and $t_{2j}=t_2$ are not satisfied, the action command generation unit 24 does not change the acceleration/deceleration timing of the action command for the axis "j".

FIG. 11 illustrates a case where only $t_{1j}=t_1$ is satisfied, and $t_{2j}=t_2$ is not satisfied. In this case, the maximum velocity $ovrd_{1j}*v\_max_j$ of the axis motor for the axis "j" during the action from the action start point $P_S$ to the temporary relay point $P_R$ does not reach the maximum velocity $v\_max_j$ that can be achieved by the axis motor for the axis "j". Therefore, the action command generation unit 24 uses "$ovrd_{1j}\_New$" satisfying $ovrd_{1j}<ovrd_{1j}\_New<1$ as the maximum velocity of the axis motor for the axis "j" during the action from the action start point $P_S$ to the temporary relay point $P_R$. That is, the action command generation unit 24 changes the maximum velocity of the axis motor for the axis "j" during the action from the action start point $P_S$ to the temporary relay point $P_R$ to "$ovrd_{1j}\_New*v\_max_j$".

Also, the action command generation unit 24 uses, as the acceleration at the action start point $P_S$, the slope of the command line L1 calculated in step S350, that is, the slope of the command line L1 illustrated in FIG. 8. Likewise, the action command generation unit 24 uses, as the deceleration at the temporary relay point $P_R$, the slope of the command line L2 calculated in step S350, that is, the slope of the command line L2 illustrated in FIG. 8.

Note that the action command generation unit 24 may change the value of "$ovrd_{1j}\_New$" every time the trajectory generation is repeated in the passing area. In other words, the action command generation unit 24 may change the value of "$ovrd_{1j}\_New$" every time it is determined in step S210 whether or not "i2=the maxim=number of repetitions" is satisfied. For example, the action command generation unit 24 sets $ovrd_{1j}\_New=1$ at the beginning of repetition, and decreases "$ovrd_{1j}\_New$" by a certain amount each time the number of repetitions increases.

The action command generation unit 24 calculates an action time $t_{1j}\_New$, to which the action time $t_{1j}$ from the action start point $P_S$ to the temporary relay point $P_R$ for the axis "j" is changed, by using the following expression (7).

[Expression 7]

$$t_{1j}\_New = \frac{|\theta_{Rj} - \theta_{Sj}|}{ovrd_{1j}\_New * v\_max_j} + \frac{ovrd_{1j}\_New * v\_max_j}{2}\left(\frac{1}{a} - \frac{1}{b}\right) \quad (7)$$

Next, a case where only $t_{2j}=t_2$ is satisfied and $t_{1j}=t_1$ is not satisfied will be described. In this case, the maximum velocity $ovrd_{2j}*v\_max_j$ of the motor for the axis "j" during the action from the temporary relay point $P_R$ to the action goal point $P_G$ does not reach the maximum velocity $v\_max_j$ that can be achieved by the motor for the axis "j". Therefore, the action command generation unit 24 uses "$ovrd_{2j}\_New$" satisfying $ovrd_{2j}<ovrd_{2j}\_New<1$ as the maximum velocity of the motor for the axis "j" during the action from the temporary relay point $P_R$ to the action goal point $P_G$. That is, the action command generation unit 24 changes the maximum velocity of the motor for the axis "j" during the action from the temporary relay point $P_R$ to the action goal point $P_G$ to "ovrd$_{2j}$_New*v_max$_j$".

Also, the action command generation unit 24 uses, as the acceleration at the temporary relay point $P_R$, the slope of the command line L5 calculated in step S350, that is, the slope of the command line L5 illustrated in FIG. 8. Likewise, the action command generation unit 24 uses, as the deceleration at the action goal point $P_G$, the slope of the command line L6 calculated in step S350, that is, the slope of the command line L6 illustrated in FIG. 8.

Note that the action command generation unit 24 may change the value of "ovrd$_{2j}$_New" every time the trajectory generation is repeated in the passing area. In other words, the action command generation unit 24 may change the value of "ovrd$_{2j}$_New" every time it is determined in step S210 whether or not "i2=the maximum number of repetitions" is satisfied. For example, the action command generation unit 24 sets ovrd$_{2j}$_New=1 at the beginning of repetition, and decreases "ovrd$_{2j}$_New" by a certain amount each time the number of repetitions increases.

The action command generation unit 24 calculates an action time $t_{2j}$_New, to which the action time $t_{2j}$ from the temporary relay point $P_R$ to the action goal point $P_G$ for the axis "j" is changed, by using the following expression (8).

[Expression 8]

$$t_{2j_{New}} = \frac{|\theta_{Rj} - \theta_{Gj}|}{ovrd_{2j}\_New * v\_max_j} + \frac{ovrd_{2j}\_New * v\_max_j}{2}\left(\frac{1}{c} - \frac{1}{d}\right) \quad (8)$$

As described above, the action command generation unit 24 calculates an execution time of the action command after change, that is, the action time corresponding to the action command after change for each other axis for which the action command has been changed in step S530. The action command generation unit 24 further calculates an execution time of the provisional action command, that is, the action time corresponding to the provisional action command for each other axis.

Next, the action command generation unit 24 determines, for each other axis, whether or not the action time in the action command after change is shorter than or equal to the action time in the provisional action command. That is, the action command generation unit 24 determines, for all the other axes, whether or not the other axis satisfies "the action time in the action command after change=the action time in the provisional action command" (step S540).

If the other axis satisfies "the action time in the action command after change=the action time in the provisional action command" (Yes in step S540), the action command generation unit 24 stores the action command after change as a candidate for the output trajectory. That is, the action command generation unit 24 sets, for the other axis satisfying "the action time in the action command after change=the action time in the provisional action command", the action command after change as the provisional action command (step S550).

For the other axis satisfying "the action time in the action command after change>the action time in the provisional action command." (No in step S540), the action command generation unit 24 does not change the provisional action command and proceeds to processing of step S560.

The action command generation unit 24 selects, from among the other axes for which the action command has been changed in step S530, the other axis of which the action time in the provisional action command exceeds the action time on the joint interpolation trajectory R0 (step S560).

Next, the action command generation unit 24 shifts the axis angle, which is the angle of the other axis at the temporary relay point $P_R$ of the action command, so as to reduce the action time of the other axis selected in step S520 (step S570). The action command generation unit 24 generates an action command in which the axis angle at the temporary relay point $P_R$ is shifted.

Figure 12:
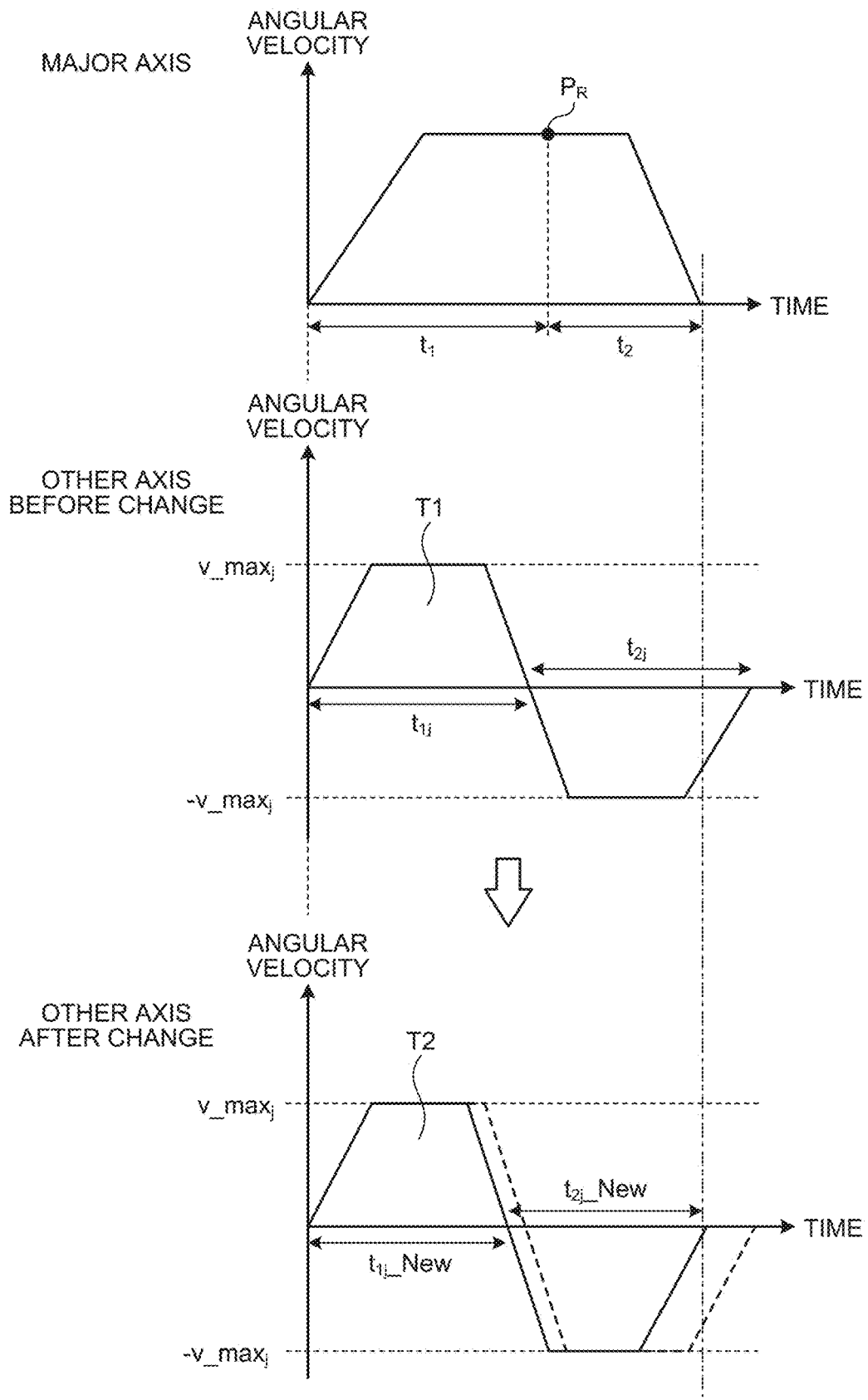
FIG. 12 is a set of graphs for explaining processing in which the robot controller according to the first embodiment shifts an axis angle of the action command for the other axis at the temporary relay point so as to reduce an action time.

FIG. 12 is a set of graphs for explaining processing in which the robot controller according to the first embodiment shifts the axis angle of the action command for the other axis at the temporary relay point so as to reduce the action time. In FIG. 12, a case where the axis "j" is selected will be described.

In FIG. 12, the top graph is a graph of the angular velocity corresponding to the velocity command value for the major axis, the middle graph is a graph of the angular velocity corresponding to the velocity command value before change for the other axis, and the bottom graph is a graph of the angular velocity corresponding to the velocity command value after change for the other axis. In each graph, the horizontal axis represents time, and the vertical axis represents the angular velocity of the axis.

The action command generation unit 24 changes the angle of the axis "j" at the temporary relay point $P_R$ from "$\theta_{Rj}$" to "$\theta_{Rj\_New}$". Also, the action command generation unit 24 uses, as the acceleration at the action start point $P_S$, the slope of the command line L1 calculated in step S350, that is, the slope of the command line L1 illustrated in FIG. 8. Also, the action command generation unit 24 uses, as the deceleration at the temporary relay point $P_R$, the slope of the command line L2 calculated in step S350, that is, the slope of the command line L2 illustrated in FIG. 6.

Also, the action command generation unit 24 uses, as the acceleration at the temporary relay point $P_R$, the slope of the command line L5 calculated in step S350, that is, the slope of the command line L5 illustrated in FIG. 8. Likewise, the action command generation unit 24 uses, as the deceleration at the action goal point $P_G$, the slope of the command line L6 calculated in step S350, that is, the slope of the command line L6 illustrated in FIG. 8.

The action command generation unit 24 designates "$\theta_{Rj\_New}$" from a range satisfying the following expression (9).

[Expression 9]

$$|\theta_{Rj} - \theta_{Sj}| > |\theta_{Rj}\_New - \theta_{Sj}| \quad (9)$$

The action command generation unit 24 calculates the value of the action time $t_{1j\_New}$, to which the action time $t_{1j}$ from the action start point $P_S$ to the temporary relay point $P_R$ for the axis "j" is changed, by using the following expression (10). FIG. 12 illustrates a case where ovrd$_{1j}$_New=1.

[Expression 10]

$$t_{1j}\_New = \frac{|\theta_{Rj}\_New - \theta_{Sj}|}{ovrd_{1j}\_New * v\_max_j} + \frac{ovrd_{1j}\_New * v\_max_j}{2}\left(\frac{1}{a} - \frac{1}{b}\right) \quad (10)$$

The action command generation unit 24 calculates the value of the action time $t_{2j}$_New, to which the action time $t_{2j}$ from the temporary relay point $P_R$ to the action goal point $P_G$ for the axis "j" is changed, by using the following expression (11). FIG. 12 illustrates a case where ovrd$_{2j}$_New=1.

[Expression 11]

$$t_{2j}\_\text{New} = \frac{|\theta_{Gj} - \theta_{Rj}\_\text{New}|}{ovrd_{2j}\_\text{New} * v\_\text{max}_j} + \frac{ovrd_{2j}\_\text{New} * v\_\text{max}_j}{2}\left(\frac{1}{c} - \frac{1}{d}\right) \quad (11)$$

As illustrated in FIG. 12, the action command generation unit 24 can reduce the change in the angle by shifting the axis angle of the action command for the axis "j" at the temporary relay point $P_R$ so as to reduce the action time. A difference between an area T1 of a trapezoid before the change in the axis angle and an area T2 of a trapezoid after the change in the axis angle corresponds to an amount of reduction of the change in the angle.

Next, the action command generation unit 24 determines, for each other axis, whether or not the action time in the action command after change is shorter than or equal to the action time in the provisional action command. That is, the action command generation unit 24 determines, for all the other axes, whether or not the other axis satisfies "the action time in the action command after chance=the action time in the provisional action command" (step S580).

If the other axis satisfies "the action time in the action command after change=the action time in the provisional action command" (Yes in step S580), the action command generation unit 24 stores the action command after change as a candidate for the output trajectory. That is, the action command generation unit 24 sets, for the other axis satisfying "the action time in the action command after change=the action time in the provisional action command", the action command after change as the provisional action command (step S590). The action command generation unit 24 generates a trajectory corresponding to the provisional action command set in step S550 or step S590.

If the other axis does not satisfy "the action time in the action command after change=the action time in the provisional action command" (No in step S580), the action command generation unit 24 does not change the provisional action command. That is, for the axis satisfying "the action time in the action command after change>the action time in the provisional action command", the action command generation unit 24 does not change the provisional action command and ends the processing of adjusting the action command for the other axis.

The processing of step S400 described below corresponds to the processing of step S190 described in FIG. 4, and the processing of steps S410 to S430 corresponds to the processing of step S200 described in FIG. 4.

Figure 13:
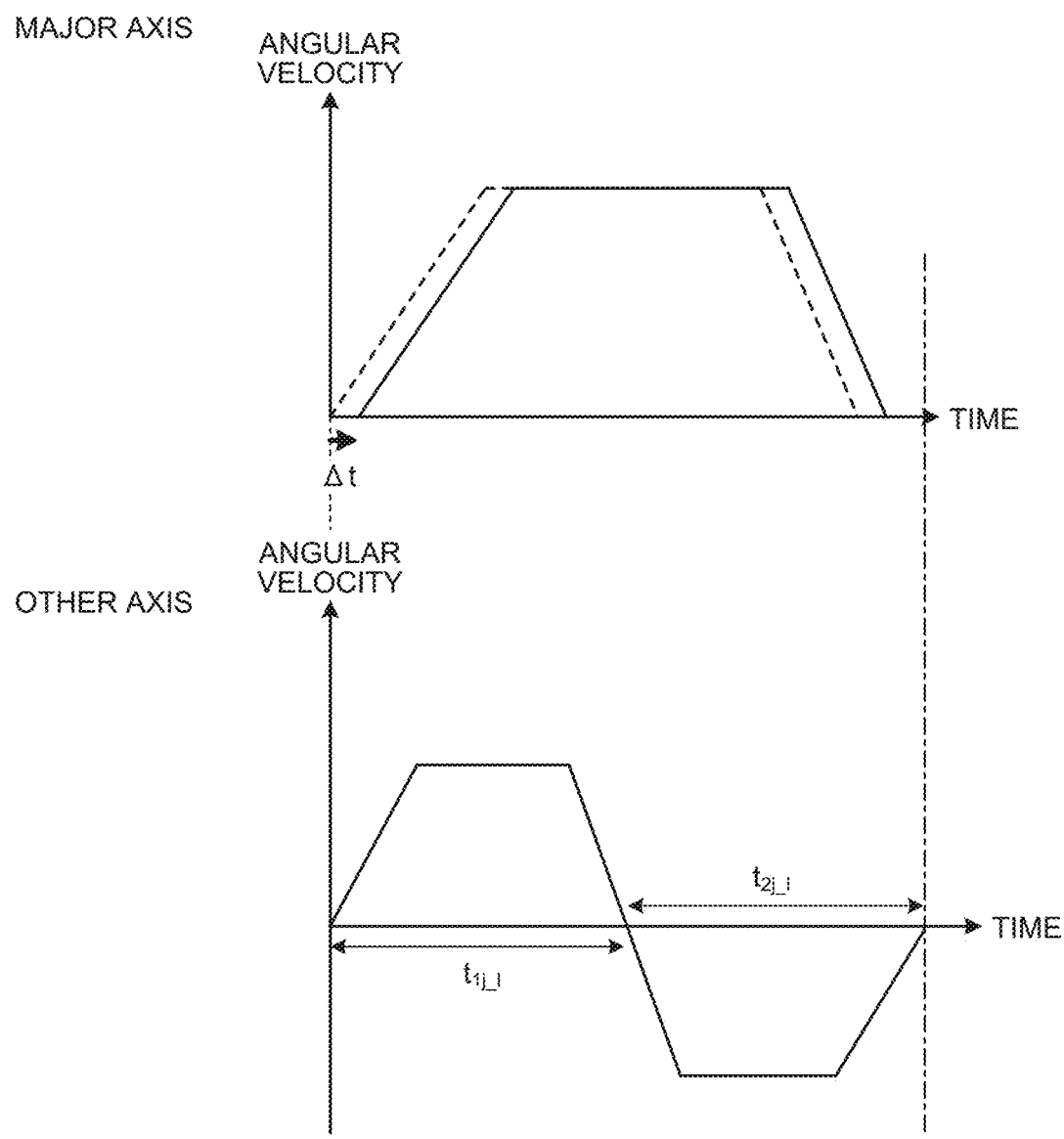
FIG. 13 is a set of graphs for explaining processing in which the robot controller according to the first embodiment adjusts an action command for the major axis by shifting a start timing of the action command for the major axis.
Figure 14:
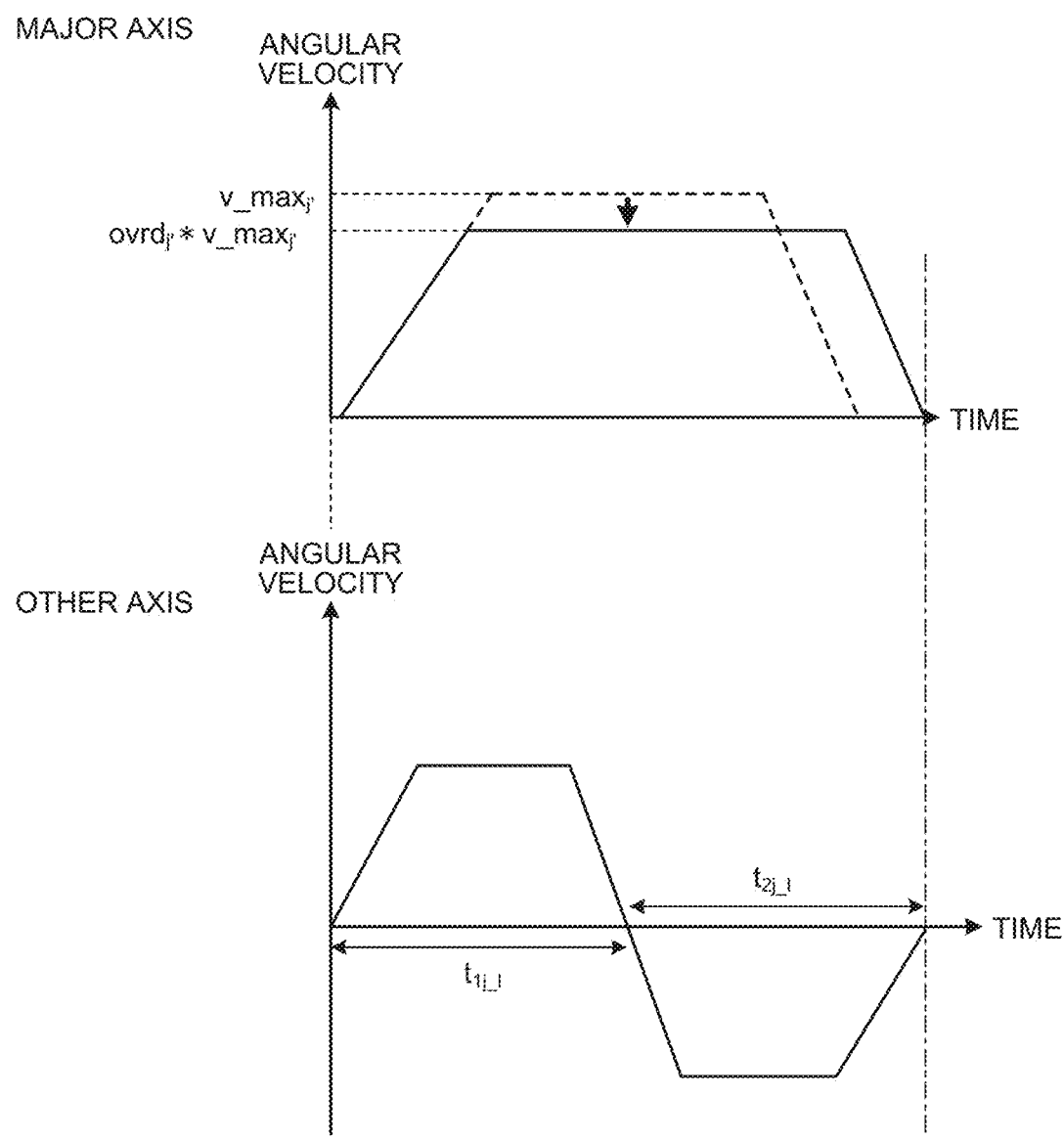
FIG. 14 is a set of graphs for explaining processing in which the robot controller according to the first embodiment adjusts the action command for the major axis by chancing the maximum velocity of the major axis in action.

FIG. 13 is a set of graphs for explaining processing in which the robot controller according to the first embodiment adjusts the action command for the major axis by shifting the start timing of the action command for the major axis. FIG. 14 is a set of graphs for explaining processing in which the robot controller according to the first embodiment adjusts the action command for the major axis by changing the maximum velocity of the major axis in action.

In FIG. 13, the top graph is a graph of the angular velocity for the major axis, and the bottom graph is a graph of the angular velocity for the other axis. In FIG. 14, the top graph is a graph of the angular velocity for the major axis, and the bottom graph is a graph of the angular velocity for the other axis. In each graph illustrated in FIG. 13 and FIG. 14, the horizontal axis represents time, and the vertical axis represents the angular velocity of the axis.

The action command generation unit 24 adjusts the action command for the major axis so as to match an action time $t_{1j1} + t_{2j1}$ of another axis j_1 having the longest action time among the action commands for the other axes adjusted in step S360 (step S400).

The action command generation unit 24 adjusts the action command for the major axis on the basis of either the method illustrated in FIG. 13 or the method illustrated in FIG. 14. Between the method illustrated in FIG. 13 and the method illustrated in FIG. 14, the end effector 102 passes through different positions. Therefore, for example, the action command generation unit 24 generates the action command for the major axis using one of the methods, and generates the action command for the major axis using the other method only when the generated trajectory collides with the obstacle 31.

First, FIG. 13 will be used to describe the method in which the action command generation unit 24 adjusts the action command for the major axis by shifting the start timing of the action command for the major axis. The action command generation unit 24 selects a time Δt, which is an amount of shift of the start timing of the action command, within a range in which an action time $(\Delta t + \Delta t 1_j + \Delta t 2_j)$ of the major axis after adjustment does not exceed an action time $(\Delta t_{1j\_1} + \Delta t_{2j\_1})$ of the other axis j_1 having the longest action time among the other axes.

Next, FIG. 14 will be used to describe the method in which the action command generation unit 24 adjusts the action command for the major axis by changing the maximum velocity of the major axis in action. The action command generation unit 24 changes the maximum velocity from "v_max$_j$" to "ovrd$_j$*v_max$_j$". The action command generation unit 24 uses, as "ovrd$_j$" a value obtained by solving the following expression (12) for "ovrd$_j$". The action command generation unit 24 uses, as the acceleration and the deceleration, the same values as those of the action command for the major axis before adjustment. In expression (12), "a_j'" and "b_j'" represent the acceleration and the deceleration in the action command for the major axis, respectively.

[Expression 12]

$$|\theta_{Gj'} - \theta_{Sj'}| = \frac{ovrd_{2j} * v\_\text{max}_{j'}}{2} \\ * \left(2(t_{1j\_1} + t_{2j\_1}) - ovrd_{j'} * v\_\text{max}_{j'} * \left(\frac{1}{a\_j'} - \frac{1}{b\_j'}\right)\right), 0 \\ < ovrd_{j'} \leq 1 \quad (12)$$

Next, the action command generation unit 24 generates a trajectory on the basis of the adjusted action command for the other axis and the adjusted action command for the major axis, and determines whether or not the generated trajectory satisfies a specific condition. Specifically, the action command generation unit 24 determines whether or not the end effector 102 interferes with the obstacle 31 when the robot 101 is operated on the generated trajectory based on the adjusted action command for the other axis and the adjusted action command for the major axis. That is, the action command generation unit 24 determines whether or not the generated trajectory avoids the obstacle 31 (step S410).

If the generated trajectory avoids the obstacle 31 (Yes in step S410), the action command generation unit 24 stores the generated trajectory as a candidate for the output trajectory (step S420). Note that the action command generation unit 24 may store the action command corresponding to the candidate for the output trajectory together with the candidate for the output trajectory.

On the other hand, if the generated trajectory interferes with the obstacle 31 (No in step S410), the action command generation unit 24 does not store the generated trajectory as the candidate for the output trajectory, and proceeds to repetition of the processing of generating another trajectory passing through the designated passing area. That is, the action command generation unit 24 determines whether or not "i2" as a count on the second repeat counter satisfies "i2=the maximum number of repetitions" (step S210).

Next, the action command generation unit 24 determines whether or not the action time when the robot 101 is operated is shorter than or equal to the action time on the joint interpolation trajectory R0 on the basis of the action command for the other axis and the action command for the other axis that have been adjusted. That is, the action command generation unit 24 determines whether or not "the action time on the generated trajectory=the action time on the joint interpolation trajectory R0" is satisfied (step S430).

If "the action time on the generated trajectory=the action time on the joint interpolation trajectory R0" is satisfied (Yes in step S430), the action command generation unit 24 proceeds to the processing of step S260. If "the action time on the generated trajectory>the action time on the joint interpolation trajectory R0" is satisfied (No in step S430), the action command generation unit 24 proceeds to repetition of the processing of generating another trajectory passing through the designated passing area. That is, the action command generation unit 24 determines whether or not "i2" as the count on the second repeat counter satisfies "i2=the maximum number of repetitions" (step S210).

If "i2=the maximum number of repetitions" is not satisfied (No in step S210), the action command generation unit 24 adds one to "i2" (step S230) and returns to the processing of step S310.

If "i2=the maximum number of repetitions" is satisfied (Yes in step S210), the action command generation unit 24 determines whether or not one or more of the generated trajectories for avoiding the obstacle 31 are stored in the processing of step S380 or step S420 (step S215).

If one or more of the generated trajectories for avoiding the obstacle 31 are stored (Yes in step S215), the action command generation unit 24 proceeds to repetition of the processing of changing the passing area. That is, if one or more of the trajectories for avoiding the obstacle 31 are stored, the action command generation unit 24 proceeds to the processing of step 3220 described with reference to FIG. 4.

On the other hand, if no generated trajectory for avoiding the obstacle 31 is stored (No in step S215), the action command generation unit 24 adds a new passing area (step S216). The action command generation unit 24 thereafter returns to the processing of step S140.

As described with reference to FIG. 4, if "i=the maximum number of repetitions" is satisfied (Yes in step S220), the action command generation unit 24 outputs the action command corresponding to the generated trajectory with the shortest action time to the axis motor control units (step S260).

On the other hand, if "i=the maximum number of repetitions" is not satisfied (No in step S220), the action command generation unit 24 changes the passing area (step S240). Then, the action command generation unit 24 executes the processing of step 3250 described with reference to FIG. 4, and then returns to the processing of step S160.

In the first embodiment, since the action command generation unit 24 stores the generated trajectory on which the robot 101 does not clash with the obstacle 31 and outputs the action command corresponding to the generated trajectory, a clash between the robot 101 and the obstacle 31 can be avoided. As a result, the robot controller 200 can improve the production efficiency.

Moreover, the action command generation unit 24 can search for the action command even when the passing area is not designated by a user, thereby being able to easily generate the trajectory with reduced action time as compared to a case of generating the trajectory by designating the passing area.

Moreover, in a case where the trajectory is generated without changing the action command for the major axis first, the action command generation unit 24 can generate the trajectory that avoids a clash without increasing the action time. In a case where the trajectory that can avoid interference cannot be generated without changing the action command for the major axis, the action command generation unit 24 generates the trajectory by changing the action command for the major axis, thereby being able to generate the trajectory that can avoid interference even when the trajectory for avoiding a clash is complicated.

Moreover, the action command generation unit 24 searches for the action command on the basis of the passing area, and thus can reduce the time required for searching for the action command that can avoid a clash.

Moreover, the action command generation unit 24 adds a candidate for the passing area other than the passing area initially designated, and thus easily derives the trajectory having the shortest action time.

As described above, according to the first embodiment, the action command generation unit 24 adjusts the action command for the other axes and then changes the action command for the major axis from the action command for the major axis on the joint interpolation trajectory R0. Then, the action command generation unit 24 generates the trajectory for the changed action command, and stores the generated trajectory as a candidate for the output trajectory when there is no interference with the obstacle 31. Therefore, the action command generation unit 24 can generate only the trajectory that avoids a clash with the obstacle 31 and can be implemented by the robot 101 as the candidate for the output trajectory.

Moreover, in a case where the action time on the generated trajectory is longer than the action time on the joint interpolation trajectory R0, the action command generation unit 24 generates a new trajectory by changing the passing area. The action command generation unit 24 can thus generate the trajectory having the action time shorter than or equal to that in the case of limiting the passing point.

When an action is performed according to the generated trajectory, the action command generation unit 24 preferentially outputs the trajectory with the action time shorter than or equal to the action time on the joint interpolation trajectory R0. Moreover, in a case where the action time on all the generated trajectories is longer than the action time on the joint interpolation trajectory R0, the action command generation unit 24 selects the trajectory having the shortest action time among the generated trajectories. Therefore, the action command generation unit 24 can select the trajectory having the shortest action time among the trajectories that avoid interference with the obstacle 31.

Moreover, the action command generation unit 24 sets, as the major axis, the axis having the maximum change in the angle during an action with respect to the maximum velocity that can be output by each axis motor, and selects the action command for the major axis. The action command generation unit 24 searches for the action command for each axis motor so as to avoid the obstacle 31 by using the action command for the selected major axis as an initial value, thereby being able to efficiently search for a trajectory with a short action time. Furthermore, the action command generation unit 24 searches for the action command of each axis motor without explicitly designating the passing point, and thus can reduce the action time as compared to the case of explicitly designating the passing point.

Second Embodiment

Next, a second embodiment will be described with reference to FIGS. 4, 14, and 15 to 27. In the second embodiment, the robot controller 200 generates a trajectory in a case where there is a plurality of passing areas.

Figure 15:
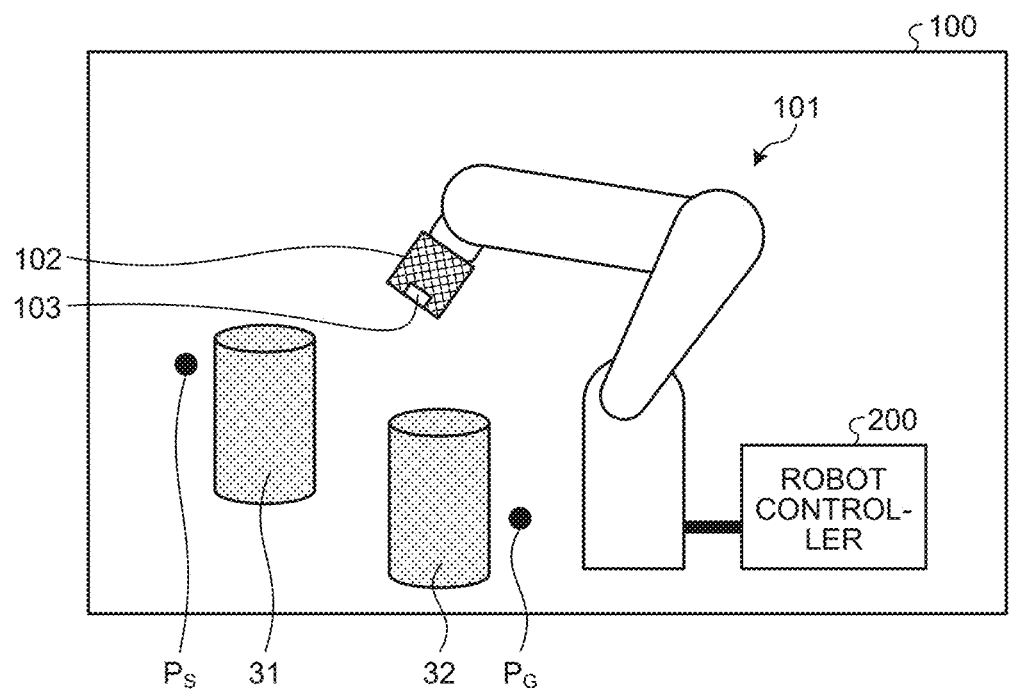
FIG. 15 is a diagram illustrating a schematic configuration of a robot system including a robot controller according to a second embodiment.
Figure 16:
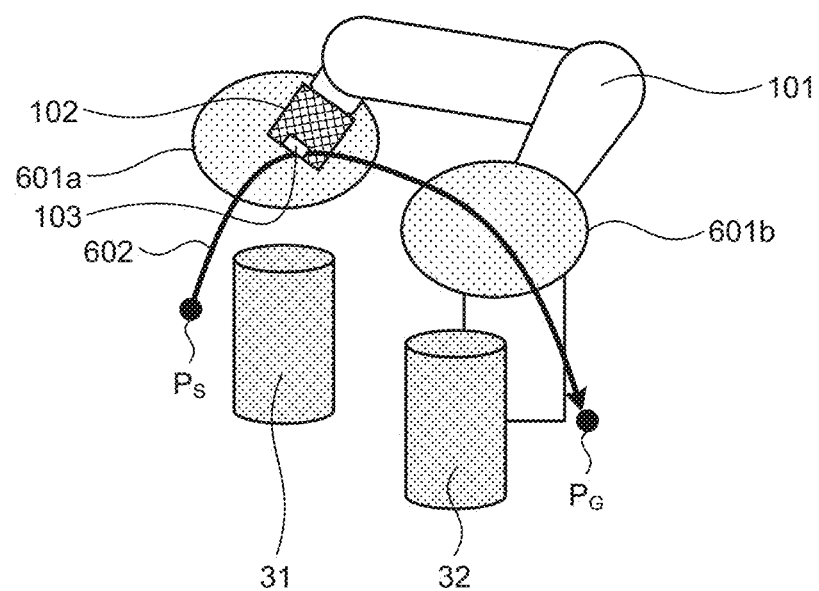
FIG. 16 is a diagram for explaining a passing area set by the robot controller according to the second embodiment.

FIG. 15 is a diagram illustrating a schematic configuration of the robot system including the robot controller according to the second embodiment. FIG. 16 is a diagram for explaining the passing areas set by the robot controller according to the second embodiment. Components in FIG. 15 that achieve the same functions as those of the robot system 100 of the first embodiment illustrated in FIG. 1 are assigned the same reference numerals as those in FIG. 1, and thus redundant description will be omitted.

The robot system 100 of the second embodiment is different from the robot system 100 of the first embodiment in terms of using two passing areas 601a and 601b. Note that the number of the passing areas may be three or more. An example of the case where there is the plurality of the passing areas 601a and 601b is a case where a plurality of obstacles 31 and 32 is placed in the robot system 100.

The action command generation unit 24 of the robot system 100 controls the robot 101 such that the end effector 102 does not clash with the obstacles 31 and 32 when a specific position of the end effector 102 is moved from the action start point $P_S$ to the action goal point $P_G$.

Next, a procedure in which the action command generation unit 24 generates the trajectory of the end effector 102 will be described. In the second embodiment as well, the action command generation unit 29 generates the trajectory by executing main steps in the procedure of the processing described in FIG. 4 of the first embodiment. Therefore, among the processing of the main steps described in FIG. 4, processing different from that of the first embodiment will be described.

In step S150 of the second embodiment, the action command generation unit 24 sets a plurality of candidates for the passing area through which the specific position of the end effector 102 passes. The action command generation unit 24 then sets an arbitrary number (a plurality) of the passing areas from among the plurality of the candidates for the passing area. That is, the action command generation unit 24 designates a plurality of the passing areas from among the plurality of the candidates for the passing area that has been set. For example, as illustrated in FIG. 16, the action command generation unit 24 designates the two passing areas 601a and 601b.

The candidates for the passing area are set in advance by a user on the basis of the placement of the obstacles 31 and 32. Note that the action command generation unit 24 may set the candidate for the passing area in an area where the obstacle 31 absent on the basis of the obstacle information acquired from the obstacle model storage unit 21.

Upon setting the plurality of the passing areas, the action command generation unit 24 generates the trajectory on the basis of the plurality of the passing areas set. Specifically, the action command generation unit 24 generates the trajectory on which the specific position of the end effector 102 passes through an arbitrary position in each passing area at an arbitrary time.

Figure 17:
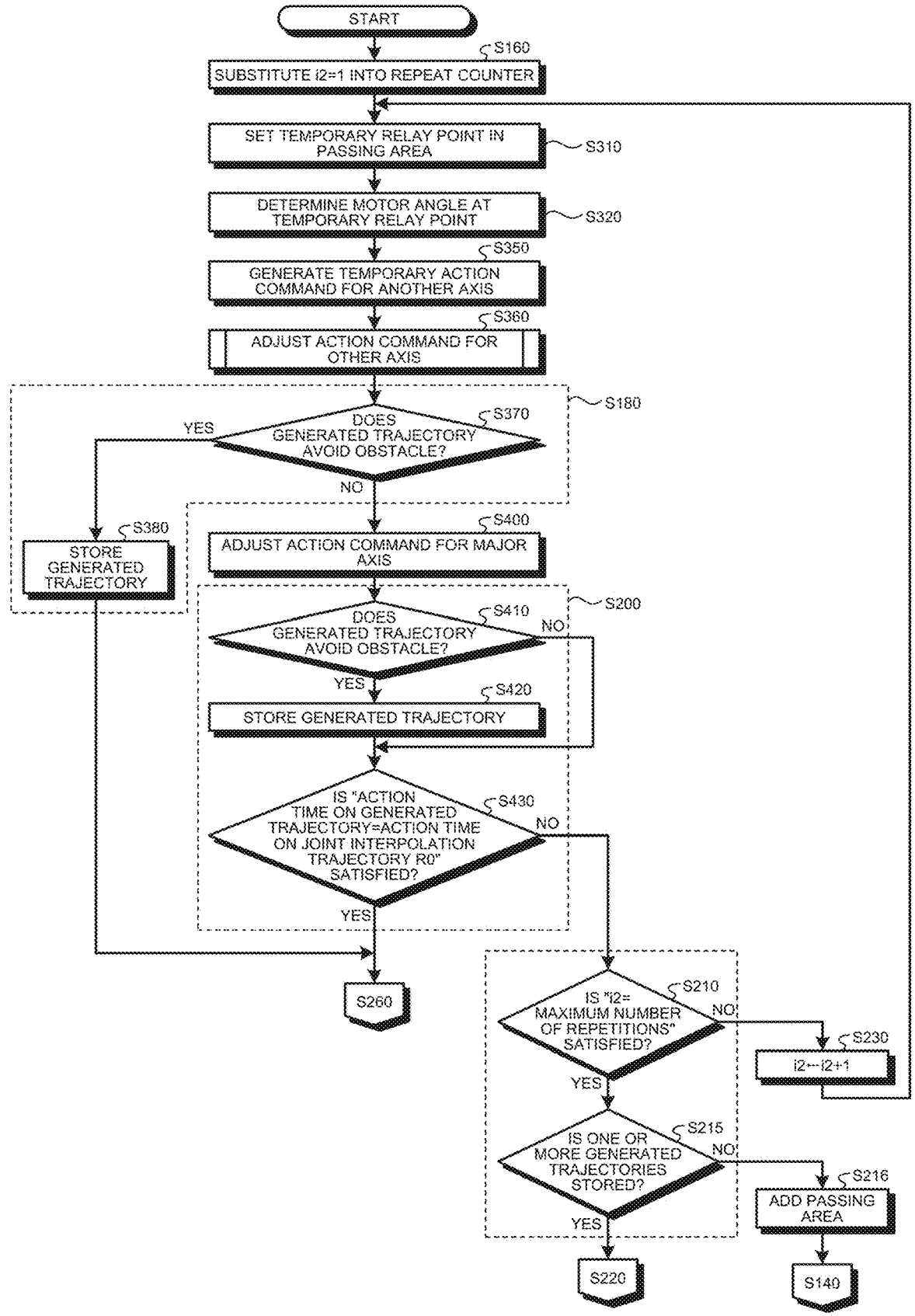
FIG. 17 is a flowchart illustrating a detailed procedure of processing in which the robot controller according to the second embodiment generates a trajectory on the basis of a passing area.

In the second embodiment, the processing in which the action command generation unit 24 generates the trajectory on the basis of the passing area is different from that of the first embodiment. FIG. 17 is a flowchart illustrating a detailed procedure of the processing in which the robot controller according to the second embodiment generates the trajectory on the basis of the passing area. Among the processings illustrated in FIG. 17, the description of the processing similar to the processing described in FIG. 7 will be omitted where redundant.

In the following description, each passing area included in the set of the passing areas selected in step S150 of the second embodiment will be referred to as a passing area "m". Here, "m" is a natural number from one to a total number of the passing areas included in the set of the passing areas. Each numerical value indicated by "m" corresponds to the order of passage of the end effector 102.

The action command generation unit 24 initializes the second repeat counter, that is, substitutes i2=1 into the second repeat counter (step S160). The action command generation unit 24 sets the temporary relay point $P_R$ through which the specific position of the end effector 102 passes at the temporary relay point $P_R$ that is the arbitrary point in the passing area "m" (step S310). These processings in steps S160 and S310 are similar to the processings in steps S160 and S310 described in the first embodiment. Note that, in the following description, an X-th ("X" is a natural number from one to "m") temporary relay point $P_R$ among the temporary relay points $P_R$ may be denoted as "$P_X$".

Next, the action command generation unit 24 determines the motor angle of each axis motor of the robot 101 at the temporary relay point $P_R$ (step S320). That is, the action command generation unit 24 sets a set of joint angles including the end effector 102 for the temporary relay point $P_R$ in the passing area "m".

Note that instead of the action command generation unit 24, a user may designate an arbitrary position in the passing area as the temporary relay point $P_R$ and the attitude of the robot 101 at that time. Also, the action command generation unit 24 may randomly select a point in the passing area as the temporary relay point $P_R$. The action command generation unit 24 designates the temporary relay point $P_R$ for all the "m" passing areas.

Upon determining the motor angle, the action command generation unit 24 generates a temporary action command for another axis that is an axis other than the major axis (step S350). Specifically, the action command generation unit 24 generates the temporary action command for the other axis on the basis of the positions of the action start point $P_S$, the action goal point $P_G$, and the temporary relay point $P_R$.

After generating the temporary action command for the other axis, the action command generation unit 24 adjusts the action command for the other axis (step S360). Details of the processing of step 3350 that generates the temporary action command for the other axis and the processing of step S360 that adjusts the action command for the other axis will be described later. The processings in step S370 and subsequent steps are similar to the processings described in the first embodiment.

Figure 18:
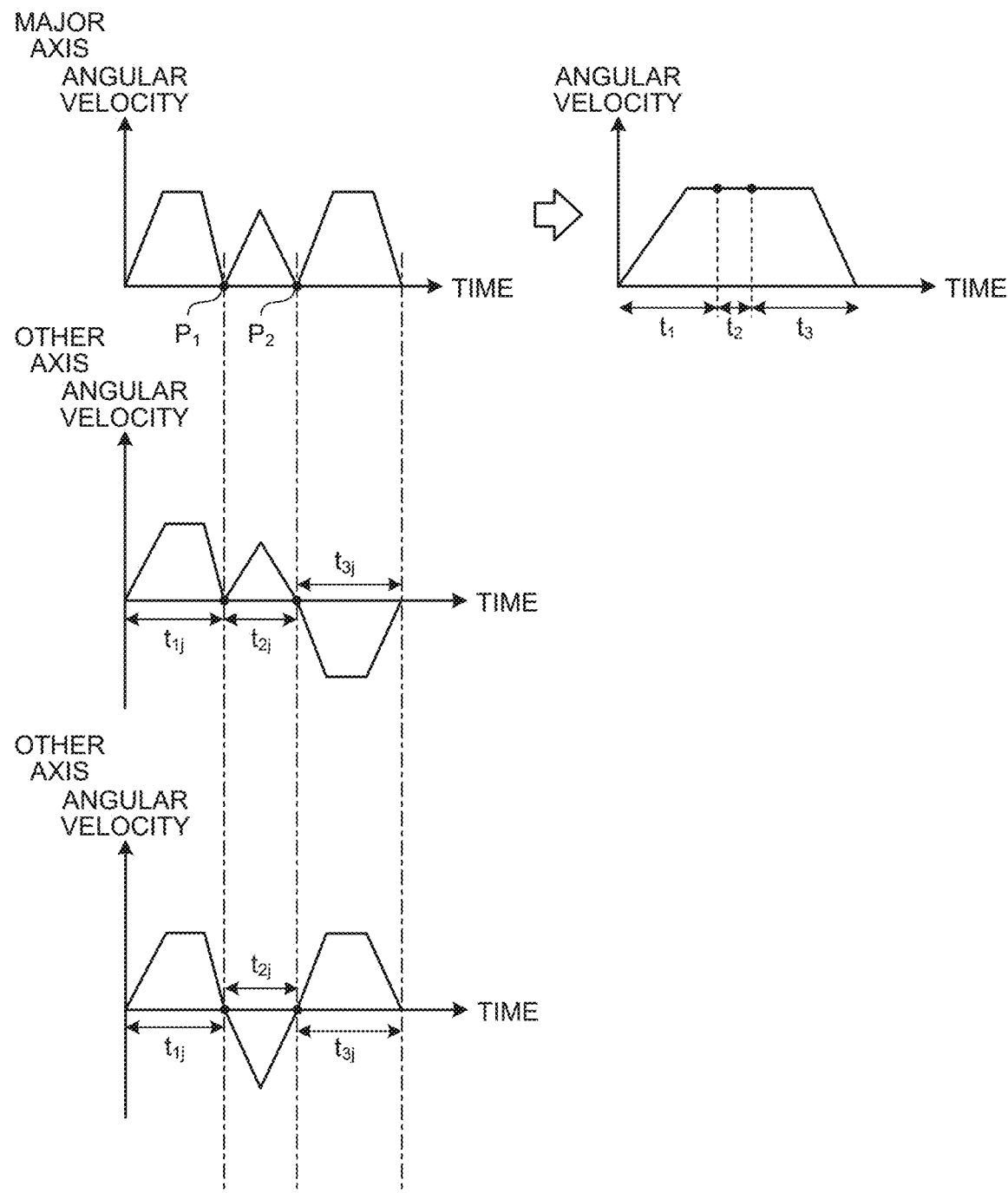
FIG. 18 is a set of graphs for explaining processing in which the robot controller according to the second embodiment generates a temporary action command for another axis.

FIG. 18 is a set of graphs for explaining the processing in which the robot controller according to the second embodiment generates the temporary action command for the other axis. The graphs of FIG. 18 illustrate angular velocities of the axis motors on the joint interpolation trajectory in the case of the two passing areas. That is, m=2 in FIG. 18.

The two graphs at the top of FIG. 18 are graphs of the angular velocity with respect to the major axis. The middle graph and the bottom graph are graphs of the annular velocities with respect to the other axes. In each graph, the horizontal axis represents time, and the vertical axis represents the angular velocity.

The action command generation unit 24 generates a joint interpolation trajectory for causing the end effector 102 to move from the action start point $P_S$ to the action goal point $P_G$ while stopping at each of the "m" temporary relay points $P_R$. Hereinafter, the joint interpolation trajectory in the second embodiment will be referred to as a joint interpolation trajectory R1. Between the top graphs illustrated in FIG. 18, the left graph corresponds to the joint interpolation trajectory R1, and the right graph corresponds to the joint interpolation trajectory R0.

All the axes included in the robot 101 have the same action time. Here, "$t_{1j}$" is the action time from the action start point $P_S$ to a temporary relay point $P_1$, "$t_{kj}$" ("k" is a natural number from two to "m") is the action time from a temporary relay point $P_{k-1}$ to a temporary relay point $P_k$, and "$t_{m+1j}$" is the action time from the temporary relay point $P_R$ to the action goal point $P_G$.

The action command generation unit 24 uses, for the major axis, the action command on the joint interpolation trajectory R0 rather than the action command on the joint interpolation trajectory R1. The action command generation unit 24 calculates, for the major axis, the action time $t_{1j}$ when an action is performed from the action start point $P_S$ to the temporary relay point $P_1$ using the action command on the joint interpolation trajectory R0.

The action command generation unit 24 further calculates, for the major axis, the action time $t_{kj}$ when an action is performed from the temporary relay point $P_{k-1}$ to the temporary relay point $P_k$ using the action command on the joint interpolation trajectory R0. FIG. 18 illustrates a case of the temporary relay point $P_{k-1}=P_1$, the temporary relay point $P_k=P_2$, and the action time $t_{kj}=t_2$.

The action command generation unit 24 further calculates, for the major axis, the action time $t_{m+1j}$ when an action is performed from the temporary relay point $P_R$ to the action goal point $P_G$ using the action command on the joint interpolation trajectory R0. FIG. 18 illustrates a case of the temporary relay point $P_R=P_2$ and the action time $t_{m+1j}=t_3$.

For example, the action time $t_{1j}$ is the time at which a change in the angle from an angle $\theta_{sj}$, of the major axis "j" at the action start point $P_S$ to an angle $\theta_{R1}$, of the major axis "j" at the temporary relay point $P_1$ coincides with an integral value of the action command for the major axis "j" from time t=0 to $t_{1j}$.

The action command generation unit 24 calculates the action times $t_{1j}$, $t_{kh}$, and $t_{m+1j}$ of the other axes by processing similar to that in the first embodiment. Here, the action time for the action from the action start point $P_S$ to the temporary relay point $P_1$ is the action time $t_{1j}$, the action time for the action from the temporary relay point $P_{k-1}$ to the temporary relay point. $P_k$ is the action time $t_{2j}$, and the action time for the action from the temporary relay point $P_R$ to the action goal point $P_G$ is an action time $t_{3j}$.

Figure 19:
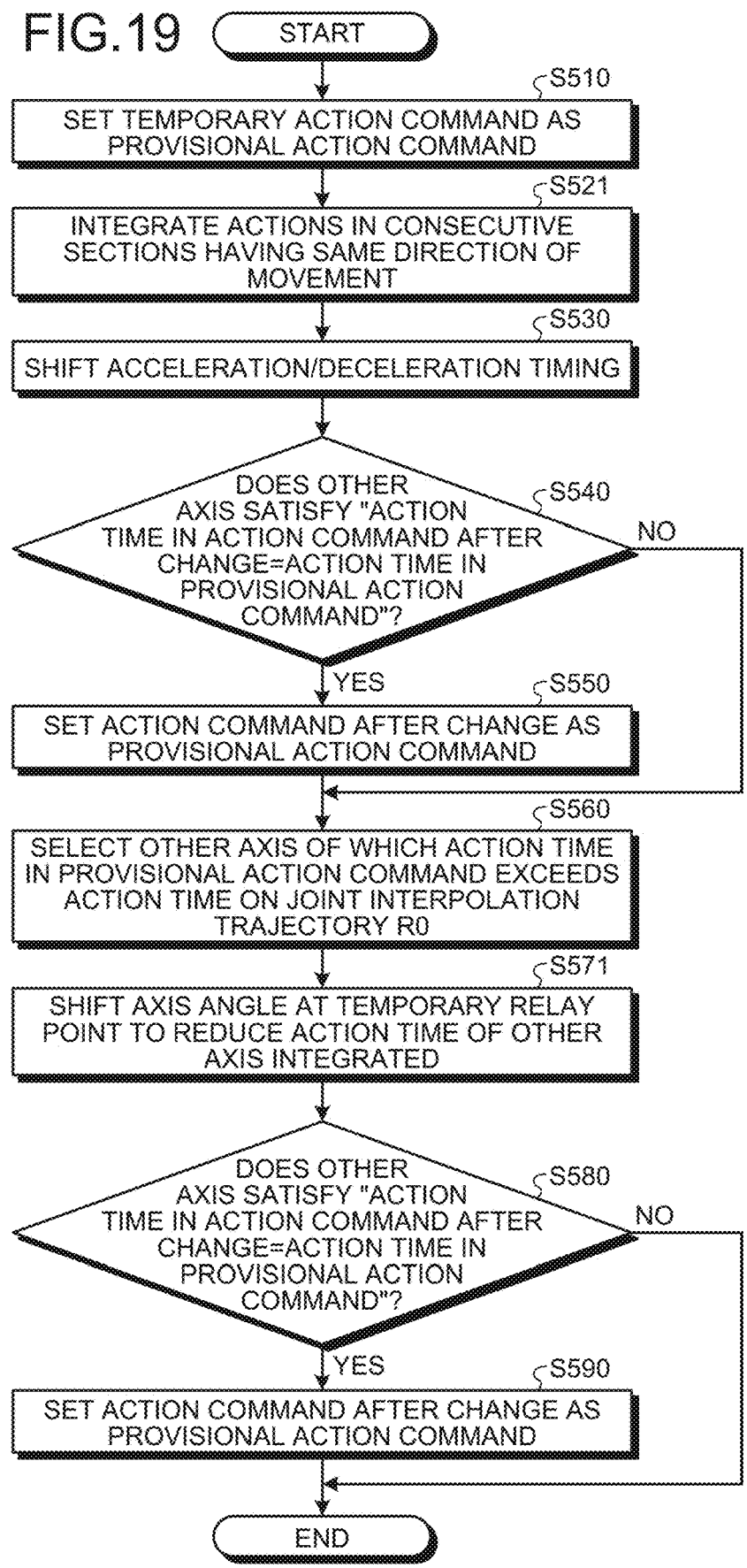
FIG. 19 is a flowchart illustrating a procedure of processing in which the robot controller according to the second embodiment adjusts an action command for the other axis.

Now, the detailed processing of step S360 in FIG. 17, that is, the processing of adjusting the action command for the other axis will be described. FIG. 19 is a flowchart illustrating a procedure of the processing in which the robot controller according to the second embodiment adjusts the action command for the other axis.

Among the processings illustrated in FIG. 19, the description of the processing similar to the processing described in FIG. 10 will be omitted where redundant.

The action command generation unit 24 sets the temporary action command generated in step S350 of FIG. 17 as a provisional action command (step S10).

Next, the action command generation unit 24 integrates actions in consecutive sections having the same direction of movement (step S521). In other words, the action command generation unit 24 integrates the sections in which an angle change in a continuous direction is performed in the provisional action command of each axis. A set of the consecutive sections having the same direction of movement is a set of sections in which the following expression (13) holds in a case where there are a section from the temporary relay point $P_{k-1}$ to the temporary relay point $P_k$ and a section from the temporary relay point $P_k$ to a temporary relay point $P_{k+1}$ for the axis "j".

[Expression 13]

$$\text{sgn}(|\theta_{kj}-\theta_{k-1j}|)=\text{sgn}(|\theta_{k+1j}-\theta_{kj}|) \quad (13)$$

Figure 20:
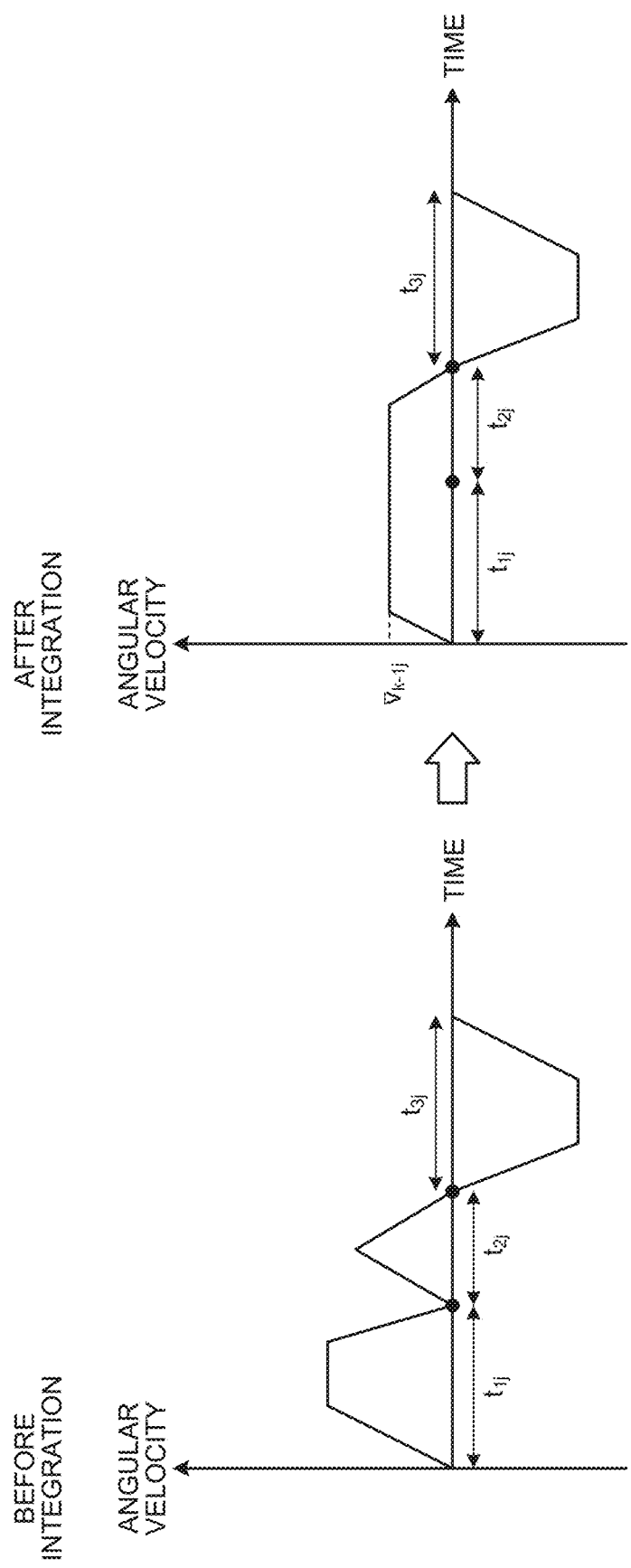
FIG. 20 is a set of graphs for explaining action commands in a continuous direction that are integrated by the robot controller according to the second embodiment.

FIG. 20 is a set of graphs for explaining the action commands in the continuous direction that are integrated by the robot controller according to the second embodiment. The graphs of FIG. 20 illustrate the angular velocity in the consecutive sections having the same direction of rotation that is the direct ion of movement. In FIG. 20, the left graph is a graph of the angular velocity before integration, and the right graph is a graph of the angular velocity after integration. In each graph, the horizontal axis represents time, and the vertical axis represents the angular velocity.

In FIG. 20, "$t_{1j}$" indicates the action time in the section from the temporary relay point $P_{k-1}$ to the temporary relay point $P_k$, "$t_{2j}$" indicates the action time in the section from the temporary relay point $P_k$ to the temporary relay point $P_{k+1}$ and "$t_{3j}$" indicates the action time in the section from the temporary relay point to a temporary relay point $P_{k+2}$.

The actions are performed in the same direction of rotation in the section from the temporary relay point $P_{k-1}$ to the temporary relay point $P_k$ and the section from the temporary relay point $P_k$ to the temporary relay point $P_{k+1}$. Therefore, the action command generation unit 24 integrates the section from the temporary relay point $P_{k+1}$ to the temporary relay point $P_k$ and the section from the temporary relay point $P_k$ to the temporary relay point $P_{k+1}$. As a result, the action command generation unit 24 integrates the sections in which the angle change is performed continuously in the same direction.

In this case, for the acceleration in the integrated section, the action command generation unit 24 uses the same acceleration as the acceleration in the section from the temporary relay point $P_{k-1}$ to the temporary relay point $P_k$. For the deceleration after the integration, the action command generation unit 24 uses the same deceleration as that in the section from the temporary relay point $P_{k-1}$ to the temporary relay point $P_k$. Moreover, the action command generation unit 24 sets the action time in the integrated section to a sum of the action time in the section from the temporary relay point $P_{k-1}$ to the temporary relay point $P_k$ and the action time in the section from the temporary relay point $P_k$ to the temporary relay point $P_{k+1}$. The maximum velocity $v\text{-}_{k-1j}$ of the action command for the axis "j" in the integrated section is determined by solving the following expression (14) for "$v\text{-}_{k-1j}$". Here, "a" denotes the acceleration, and "b" denotes the deceleration.

[Expression 14]

$$|\theta_{k+1j} - \theta_{k-1j}| = \frac{\text{abs}(\bar{v}_{k-1j})}{2} * 2(t_{k-1j} + t_{kj}) - \text{abs}(\bar{v}_{k-1j}) * \left(\frac{1}{a} - \frac{1}{b}\right)) \quad (14)$$

$$\text{sgn}(\bar{v}_{k-1j}) = \text{sgn}(|\theta_{k+1j} - \theta_{k-1j}|)$$

In the following description, in the integrated section, a position where mj (<m) axes "j" have an angle $\theta_{kj}$ at a time when the angular velocity of the axis "j" is zero is referred to as an integrated temporary relay point.

Next, the action command generation unit 24 shifts the acceleration/deceleration timing of the action command so as to reduce the action time of another axis selected (step S530). Specifically, the action command generation unit 24 determines an amount of shift of the acceleration/deceleration timing so as to reduce the action time of the other axis selected, and generates the action command on the basis of the determined amount of shift of the acceleration/deceleration timing.

FIG. 21 is a set of graphs for explaining processing in which the robot controller according to the second embodiment shifts the acceleration/deceleration timing of the action command for the other axis so as to reduce the action time. In FIG. 21, a case where the axis "j" is selected as the other axis will be described.

In FIG. 21, the top graph is a graph of the angular velocity corresponding to the velocity command value on the joint interpolation trajectory R0 for the major axis. The middle graph is a graph of the angular velocity corresponding to the velocity command value before change for the other axis, and the bottom graph is a graph of the angular velocity corresponding to the velocity command value after change for the other axis. In each graph, the horizontal axis represents time, and the vertical axis represents the angular velocity of the axis.

In FIG. 21, "$t_{1j}$" indicates the action time in the section from the temporary relay point $P_{k-1}$ to the temporary relay point $P_k$, "$t_{2j}$" indicates the action time in the section from the temporary relay point $P_k$ to the temporary relay point $P_{k+1}$, and "$t_{3j}$" indicates the action time in the section from the temporary relay point $P_{k+1}$ to the temporary relay point $P_{k+2}$.

The action command generation unit 24 reduces the action time by changing the maximum velocity of the action command in order from the action command for the action start point $P_S$ to the integrated temporary relay point $P_1$. Specifically, the action command generation unit 24 changes the maximum velocity of the action command for the integrated temporary relay point $P_{k-1}$ to the integrated temporary relay point $P_k$ from the maximum velocity ovrd$_{kj}$*v_max$_j$ to the maximum velocity ovrd$_{kj}$_New*v_max$_j$ (0<ovrd$_{kj}$_New<1).

The action command generation unit 24 uses the acceleration used in step S521 as the acceleration at the integrated temporary relay point $P_{k-1}$. Likewise, the action command generation unit 24 uses the deceleration used in step S521 as the deceleration at the integrated temporary relay point $P_{k+1}$.

Note that the action command generation unit 24 may change the value of "ovrd$_{kj}$_New" every time the trajectory generation is repeated in the passing area. For example, the action command generation unit 24 sets ovrd$_{kj}$_New=1 at the beginning of repetition, and decreases "ovrd$_{kj}$_New" by a certain amount each time the number of repetitions increases.

The action command generation unit 24 calculates an action time $t_{kj}$_New, to which the action time $t_{kj}$ from the integrated temporary relay point $P_{k+1}$ to the integrated temporary relay point $P_k$ is changed, by using the following expression (15).

[Expression 15]

$$t_{kj}\_\text{New} = \frac{|\theta_{kj} - \theta_{k-1j}|}{\text{ovrd}_{kj}\_\text{New} * v\_\text{max}_j} + \frac{\text{ovrd}_{kj}\_\text{New} * v\_\text{max}_j}{2}\left(\frac{1}{a} - \frac{1}{b}\right) \quad (15)$$

The bottom graph of FIG. 21 illustrates the action time when k=1. That is, the bottom graph of FIG. 21 illustrates the action time $t_{1j\_New}$ that is the action time after change.

As illustrated in FIG. 21, the action command generation unit 24 can reduce the change in the angle by shifting the axis angle of the action command for the axis at the temporary relay point $P_k$ so as to reduce the action time. A difference between an area T3 of a trapezoid before the change in the axis angle and an area T4 of a trapezoid after the change in the axis angle corresponds to an amount of reduction of the change in the angle.

Next, the action command generation unit 24 determines, for each other axis for which the action command has been changed in step S530, whether or not the action time in the action command after change is shorter than or equal to the action time in the provisional action command. That is, the action command generation unit 24 determines, for all the other axes, whether or not the other axis satisfies "the action time in the action command after change=the action time in the provisional action command" (step S540).

If the other axis satisfies "the action time in the action command after change=the action time in the provisional action command" (Yes in step S540), the action command generation unit 24 stores the action command after change as a candidate for the output trajectory. That is, the action command generation unit 24 sets, for the other axis satisfying "the action time in the action command after change=the action time in the provisional action command", the action command after change as the provisional action command (step S550).

For the other axis satisfying "the action time in the action command after change>the action time in the provisional action command" (No in step S540), the action command generation unit 24 does not change the provisional action command and proceeds to processing of step S560.

The action command generation unit 24 selects, from among the other axes for which the action command has been changed in step S530, the other axis of which the action time in the provisional action command exceeds the action time on the joint interpolation trajectory R0 (step S560).

Next, the action command generation unit 24 shifts the axis angle of the action command at the temporary relay point $P_R$ so as to reduce the action time of the other axis integrated in step S521 (step S571). The action command generation unit 24 generates an action command in which the axis angle at the temporary relay point $P_R$ is shifted. The processings in step S580 and subsequent steps are similar to the processings described in the first embodiment.

Figure 22:
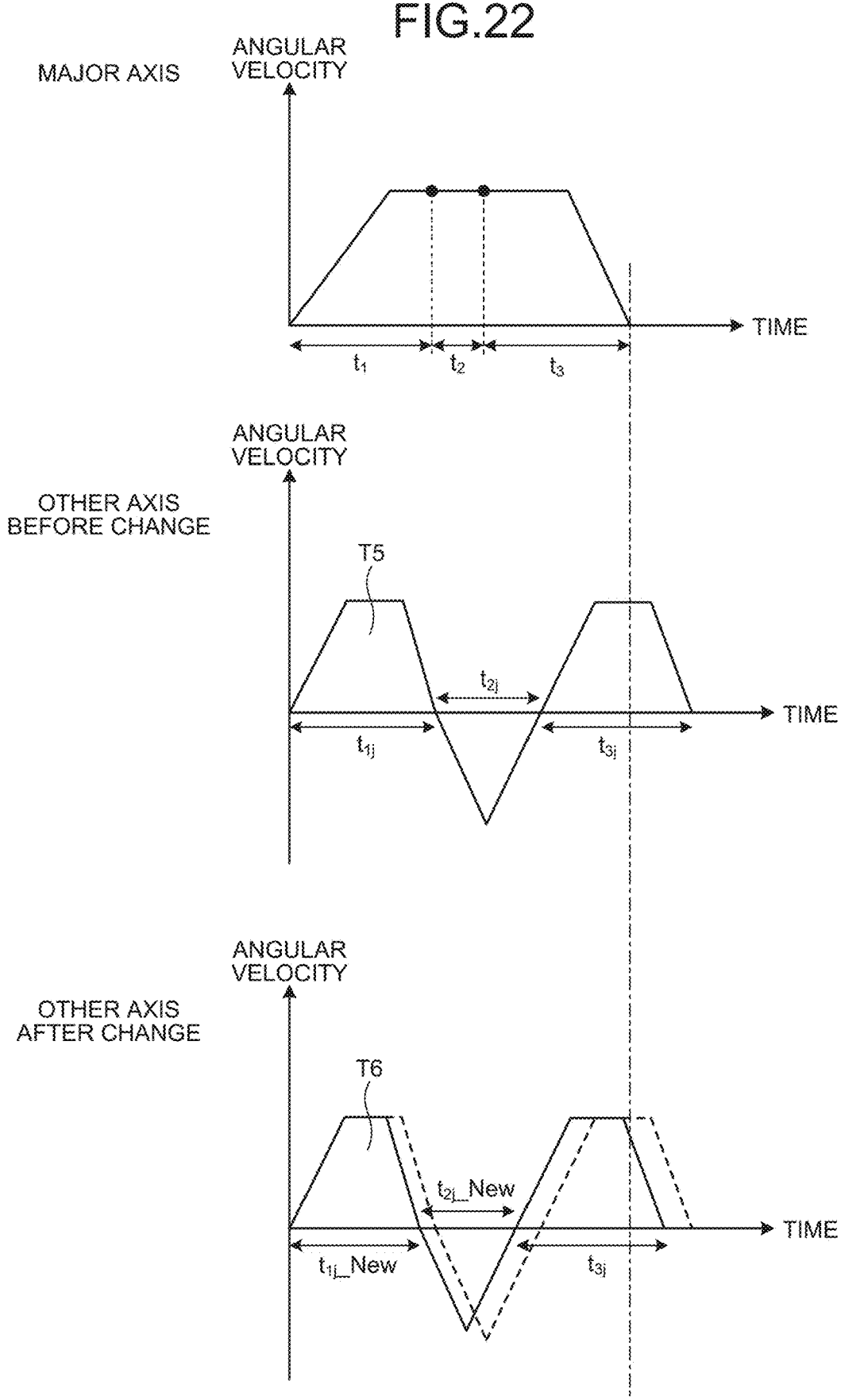
FIG. 22 is a set of graphs for explaining processing in which the robot controller according to the second embodiment shifts an axis angle of the action command for the other axis at a temporary relay point so as to reduce the action time.

FIG. 22 is a set of graphs for explaining processing in which the robot controller according to the second embodiment shifts the axis angle of the action command for the other axis at the temporary relay point so as to reduce the action time. In FIG. 22, a case where the axis "j" is selected will be described.

In FIG. 22, the top graph is a graph of the angular velocity corresponding to the velocity command value on the joint interpolation trajectory R0 for the major axis. The middle graph is a graph of the angular velocity corresponding to the velocity command value before change for the other axis, and the bottom graph is a graph of the angular velocity corresponding to the velocity command value after change for the other axis. In each graph, the horizontal axis represents time, and the vertical axis represents the angular velocity of the axis.

The action command generation unit 24 changes the angle of the axis "j" at the temporary relay point $P_R$ from "$\theta_{Rkj}$" to "$\theta_{Rkj\_New}$". Also, the action command generation unit 24 uses the acceleration used in step S521 as the acceleration at the action start point $P_S$. Moreover, the action command generation unit 24 uses the deceleration used in step S521 as the deceleration at the temporary relay point $P_R$.

The action command generation unit 24 designates "$\theta_{Rkj\_New}$" from a range satisfying the following expression (16).

[Expression 16]

$$|\theta_{Rkj} - \theta_{Rk-1j}| > |\theta_{Rkj\_New} - \theta_{Rk-1j}|$$

The action command generation unit 24 calculates a value of the action time $t_{kj\_New}$ after change from the integrated temporary relay point $P_{k-1}$ to the integrated temporary relay point $P_k$ for the axis "j" by using the following expression (17). FIG. 22 illustrates a case where $ovrd_{kj}\_New=1$. Here, "a" denotes the acceleration, and "b" denotes the deceleration.

[Expression 17]

$$t_{kj}\_New = \frac{|\theta_{Rkj}\_New - \theta_{Rk-1j}|}{ovrd_{kj}\_New * v\_max_j} + \frac{ovrd_{kj}\_New * v\_max_j}{2}\left(\frac{1}{a} - \frac{1}{b}\right) \quad (17)$$

The action command generation unit 24 calculates a value of the action time $t_{k+1j\_New}$ after change from the integrated temporary relay point $P_k$ to the integrated temporary relay point $P_{k+1}$ for the axis "j" by using the following expression (18). FIG. 22 illustrates a case where $ovrd_{k+1j}\_New=1$. Here, "c" denotes the acceleration, and "d" denotes the deceleration.

[Expression 18]

$$t_{k+1j}\_New = \frac{|\theta_{Rk+1j} - \theta_{Rkj}\_New|}{ovrd_{k+1j}\_New * v\_max_j} + \frac{ovrd_{k+1j}\_New * v\_max_j}{2}\left(\frac{1}{c} - \frac{1}{d}\right) \quad (18)$$

The bottom graph of FIG. 22 illustrates the action time when k=1. That is, the bottom graph of FIG. 22 illustrates the action time $t_{1j\_New}$ and the action time $t_{2j\_New}$ as the action time after change.

As illustrated in FIG. 22, the action command generation unit 24 can reduce the change in the angle by shifting the axis angle of the action command for the axis "j" at the temporary relay point $P_k$ so as to reduce the action time. A difference between an area 15 of a trapezoid before the change in the axis angle and an area T6 of a trapezoid after the change in the axis angle corresponds to an amount of reduction of the change in the angle.

Here, a description will be made of the processing in step S400 that is the processing in which the action command generation unit 24 adjusts the action command for the major axis. The action command generation unit 24 may adjust the action command for the major axis by, for example, shifting the start timing of the action command. Alternatively, the action command generation unit 24 may adjust the action command for the major axis by collectively changing the maximum velocity during the action, or may adjust the action command for the major axis by locally changing the maximum velocity during the action.

Figure 23:
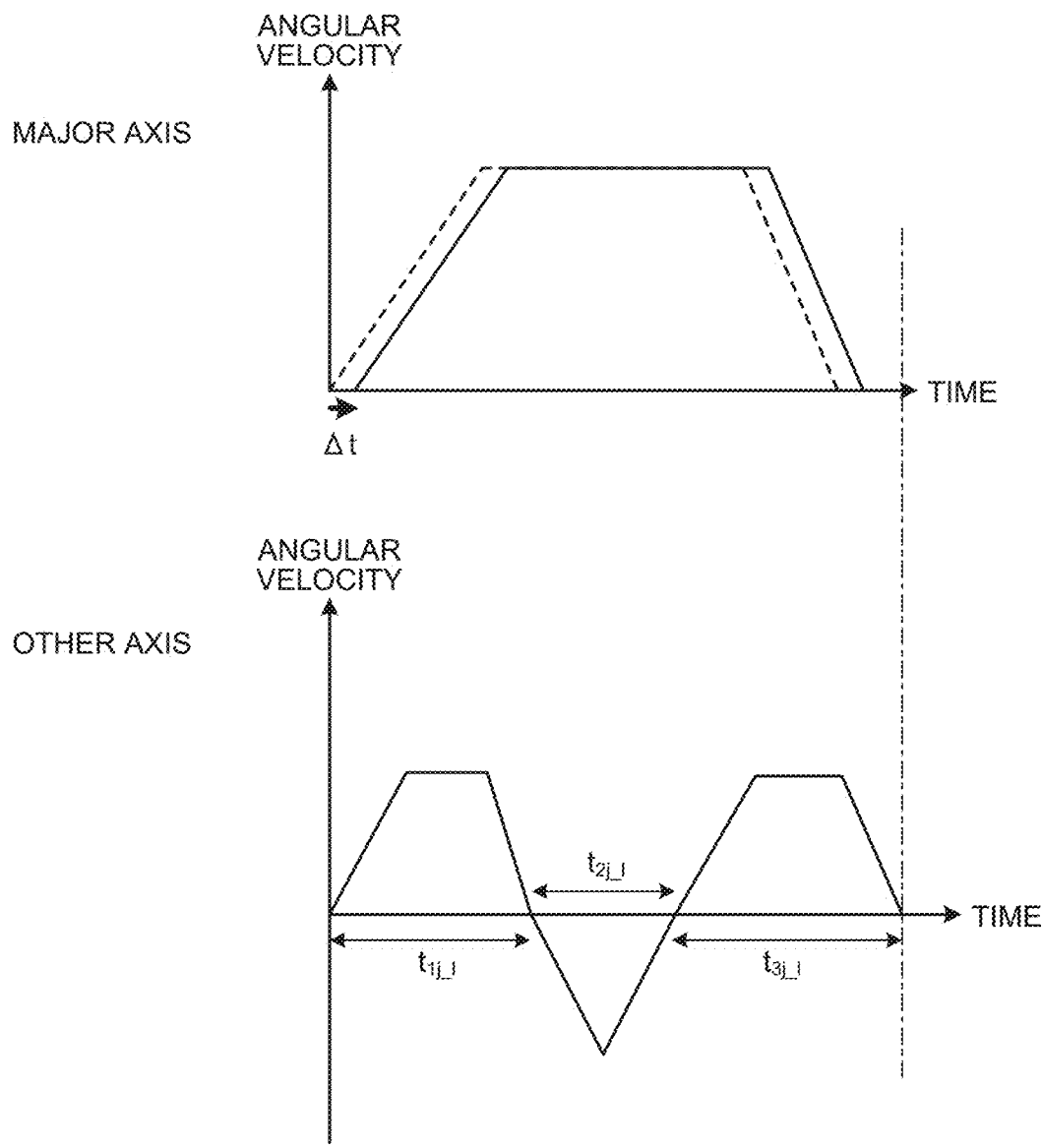
FIG. 23 is a set of graphs for explaining processing in which the robot controller according to the second embodiment adjusts an action command for a major axis by shifting a start timing of the action command for the major axis.
Figure 24:
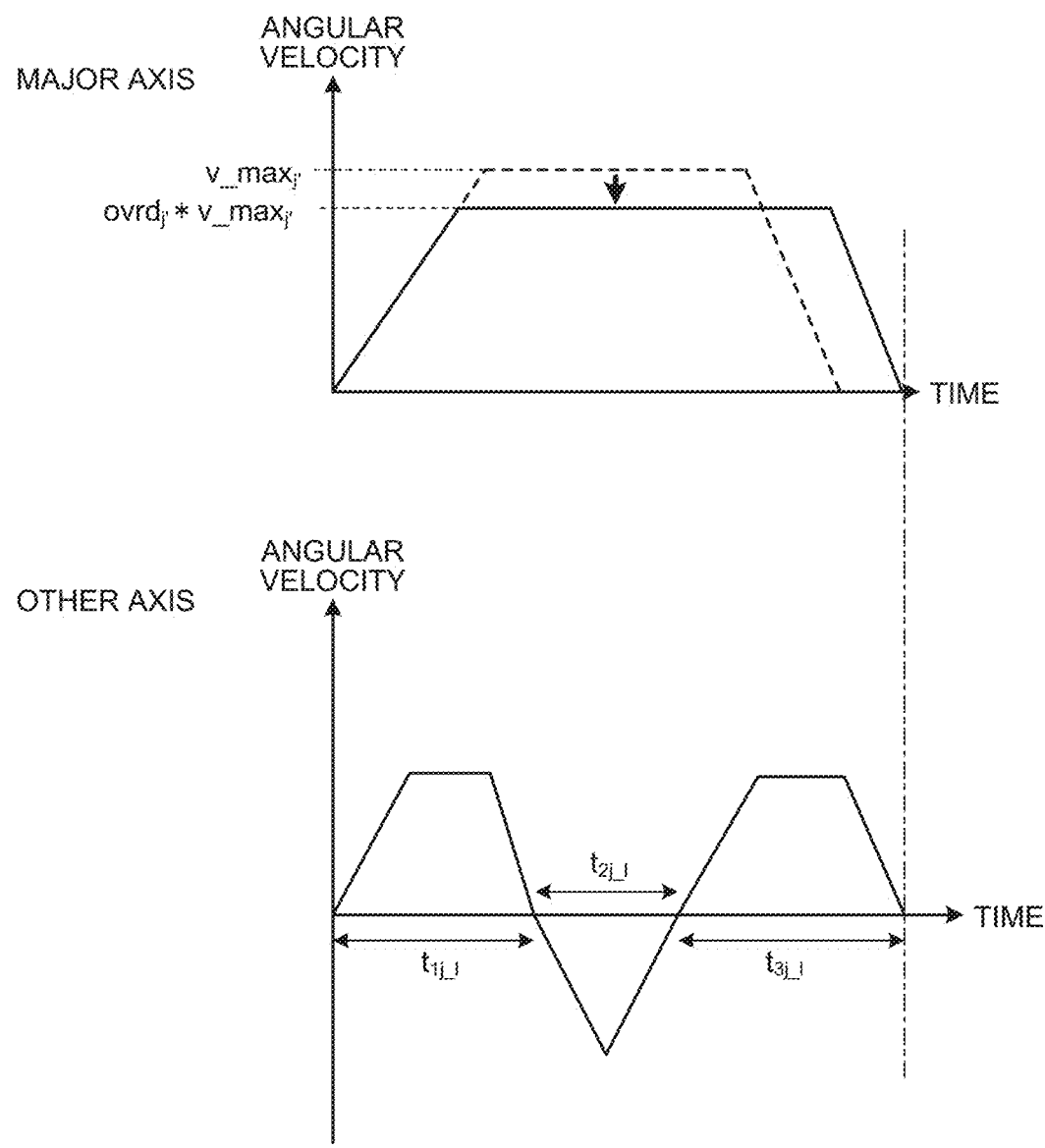
FIG. 24 is a set of graphs for explaining processing in which the robot controller according to the second embodiment adjusts the action command for the major axis by collectively changing the maximum velocity of the major axis in action.
Figure 25:
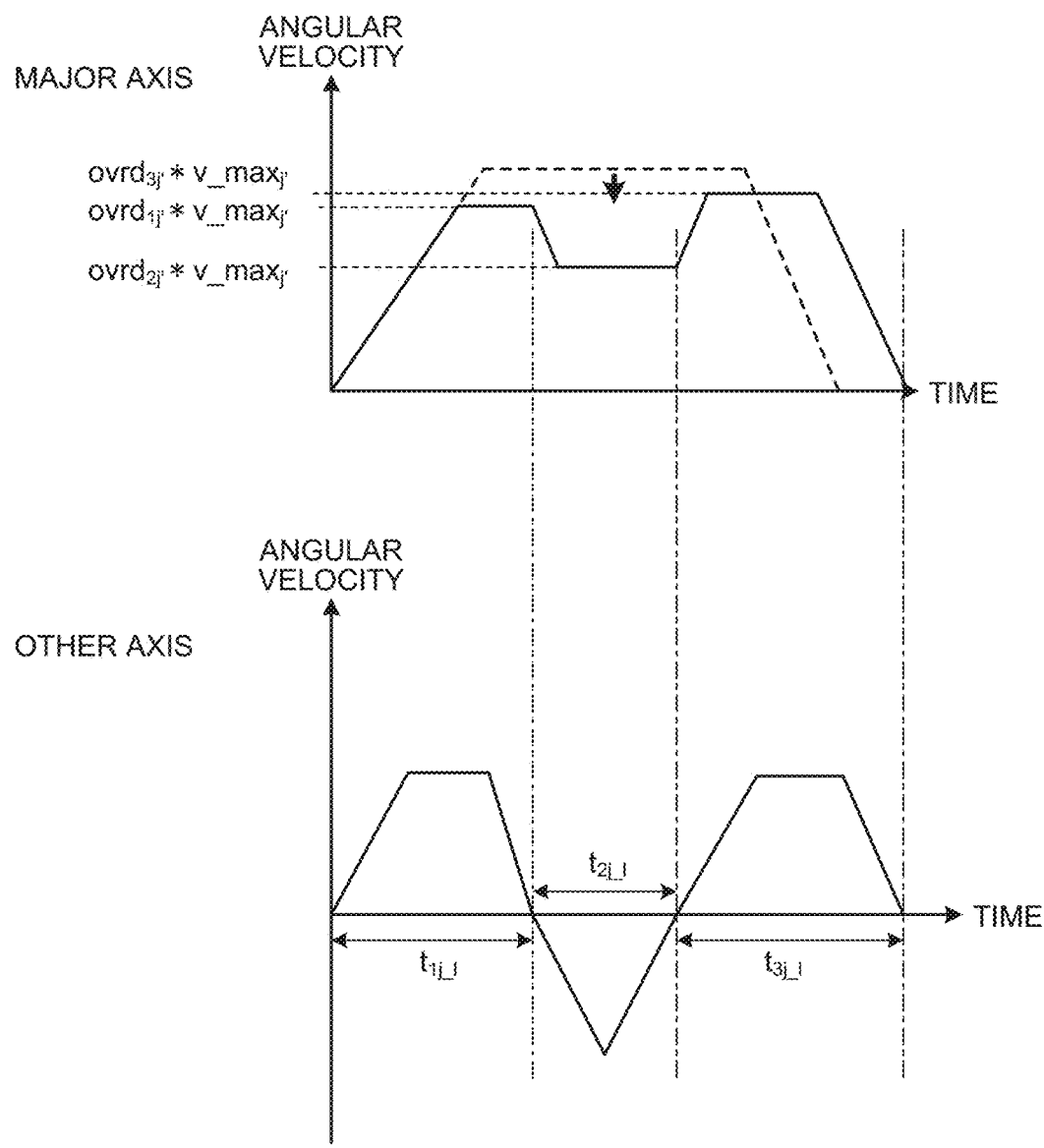
FIG. 25 is a set of graphs for explaining processing in which the robot controller according to the second embodiment adjusts the action command for the major axis by locally changing the maximum velocity of the major axis in action.

FIG. 23 is a set of graphs for explaining the processing in which the robot controller according to the second embodiment adjusts the action command for the major axis by shifting the start timing of the action command for the major axis. FIG. 24 is a set of graphs for explaining the processing in which the robot controller according to the second embodiment adjusts the action command for the major axis by collectively changing the maximum velocity of the major axis during the action. FIG. 25 is a set of graphs for explaining the processing in which the robot controller according to the second embodiment adjusts the action command for the major axis by locally changing the maximum velocity of the major axis during the action.

In each of FIGS. 23 to 25, the top graph is a graph of the angular velocity on the joint interpolation trajectory R0 for the major axis, and the bottom graph is a graph of the angular velocity on the joint interpolation trajectory R1 for the other axis.

The action command generation unit 24 adjusts the action command for the major axis so as to match an action time $\Sigma_1^{m'} t_{kj\_1}\_New$ of the axis j_1 having the longest action time among the action commands for the other axes adjusted in step S360.

As illustrated in FIG. 23, when adjusting the action command for the major axis by shifting the start timing of the action command, the action command generation unit 24 shifts the start timing of the action command by "$\Delta t$". In this case, the action command generation unit 24 selects "$\Delta t$" within a range such that an action time $\Delta t + \Sigma_1^{m'} t_k$ of the major axis after adjustment does not exceed the action time $\Sigma_1^{m'} t_{kj\_1}\_New$ of the axis j_1 having the longest action time.

As illustrated in FIG. 24, when adjusting the action command for the major axis by collectively changing the maximum, velocity during the action, the action command generation unit 24 changes the maximum velocity from "$v\_max_j$" to "$ovrd_j * v\_max_{j'}$". The action command generation unit 24 uses, as "$ovrd_j$" a value obtained by solving the following expression (19) for "$ovrd_j$". Moreover, the action command generation unit 24 uses, as the acceleration and the deceleration, the same acceleration and deceleration as those of the action command for the major axis before adjustment. In expression (19), "a_j'" and "b_j'" denote the acceleration and the deceleration in the action command for the major axis, respectively.

[Expression 19]

$$|\theta_{Gj'} - \theta_{Sj'}| = \frac{ovrd_j * v\_max_{j'}}{2} \quad (19)$$

$$* \left(2\left(\sum_1^{m'} t_{kj\_l\_New}\right) - ovrd_{j'} * v\_max_{j'} * \left(\frac{1}{a\_j'} - \frac{1}{b\_j'}\right)\right), 0$$

$$0 < ovrd_{j'} \leq 1$$

As illustrated in FIG. 25, when adjusting the action command for the major axis by locally changing the maximum velocity during the action, the action command generation unit 24 changes the action time in the action command section for the major axis to "$t_{kj\_1}$_New", the action command section corresponding to the action from the integrated temporary relay point $P_{k-1}$ to the integrated temporary relay point $P_k$ for the axis j_1. Here, in a case where the action from the integrated temporary relay point $P_{k-1}$ to the integrated temporary relay point $P_k$ for the axis j_1 is integration of Δk+1 action commands from a temporary relay point $P_{k'-1}$ before integration to a temporary relay point $P_{k'+\Delta k}$ before integration, the corresponding action command section for the major axis is a section from time tk' to time $tk'_{+\Delta k}$.

The maximum velocity of the major axis with respect to the action from the integrated temporary relay point $P_{k-1}$ to the integrated temporary relay point $P_k$ for the axis j_1 is defined as "$ovrd_{kj'} * vmax_{j'}$". Also, in the second embodiment, the time required for changing the velocity when switching the action command section is included in a subsequent action section in this case, the action command generation unit 24 calculates the maximum drive torque that can be used to drive the major axis at time $t_{kj\_1}$_New from the action command for the other axis adjusted in step S360 and the position and velocity information of the temporary relay point $P_R$ for the major axis. Next, the action command generation unit 24 obtains acceleration "ak" when the axis "j" is driven with the maximum drive torque. Here, the action command generation unit 24 determines "$ovrd_{kj}$" by solving the following expression (20).

[Expression 20]

$$|\theta_{k+1j} - \theta_{kj'}| = ovrd_{kj'} * v\_max_{j'} + \frac{v\_max_{j'}^2}{2*a_k}(ovrd_{kj'} - ovrd_{k-1j'})^2, \quad (20)$$

$$0 < ovrd_{kj'} \leq 1$$

FIG. 25 illustrates "$ovrd_{ij}*v\_max_j$", "$ovrd_{2j}*v\_max_j$", and "$ovrd_{3j}*v\_max_j$" as the maximum velocity of the major axis after change.

The action command generation unit 24 executes processing similar to that of the first embodiment from steps S160 to S230. Here, a description will be made of the processing in step S240 of the second embodiment, that is, the processing in which the action command generation unit 24 changes the passing area.

In a case where the generated trajectory interferes with any of the obstacles 31 and 32, the action command generation unit 24 designates one candidate from the candidates for the passing area set in step S150, and changes the current passing area to the designated passing area. Alternatively, the action command generation unit 24 may use an interference point as a reference to change the current passing area to a passing area in a space away from the interference point by a specific distance. The interference point is a position of intersection between the robot 101 and the obstacle with which the robot clashes at a time when the trajectory generated by the action command generation unit 24 collides with any one of the obstacles 31 and 32 for the first time.

Figure 26:
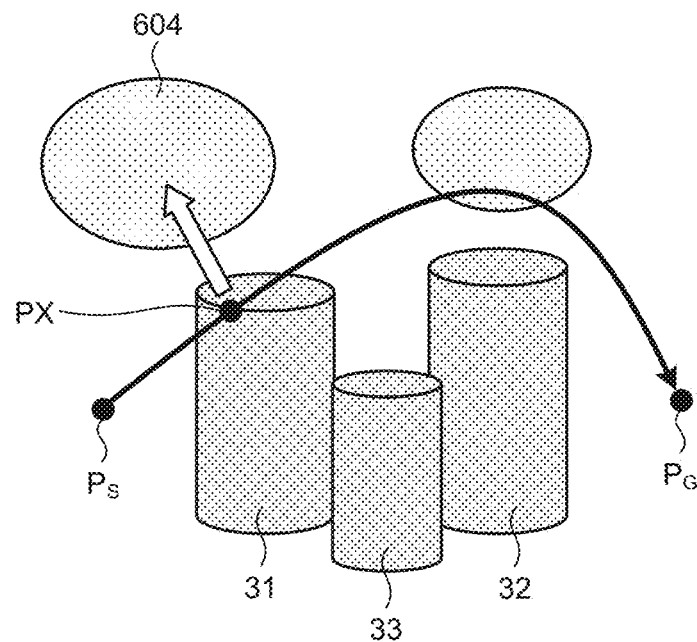
FIG. 26 is a diagram for explaining processing in which the robot controller according to the second embodiment changes a passing area to a space away from an interference point by a specific distance.

FIG. 26 is a diagram for explaining the processing in which the robot controller according to the second embodiment changes the passing area to the space away from the interference point by the specific distance. FIG. 26 illustrates a case where there are three obstacles 31 to 33. In the case illustrated here, the first obstacle with which the trajectory collides is the obstacle 31.

The action command generation unit 24 changes a passing area (not illustrated) passing through an interference point PX to a passing area 604 away from the interference point PX by a specific distance. The specific distance in this case is, for example, a distance whose value is about several times the dimension of a specific position of the end effector 102. Note that the specific distance may be a distance whose value is about several times the dimension of a specific position of the robot 101. A direction in which the action command generation unit 24 adds the passing area 604 is desirably a direction away from the object center of the obstacle 31 as viewed from the interference point PX.

The action command generation unit 24 changes the passing area by designating one candidate from among the candidates for the passing area set in step S150, and may add a passing area in a case where there is no trajectory to output even when the processing of adjusting the action command is executed for all the candidates.

In a case where the action time on the generated trajectory is longer than the action time on the joint interpolation trajectory R0, the action command generation unit 24 selects one candidate from among the candidates for the passing area designated in step S150, and changes the current passing area to the designated passing area. Moreover, as illustrated in FIG. 27, the action command generation unit 24 may move the position of the current passing area within a range not including the obstacles 31 to 33 therein.

Figure 27:
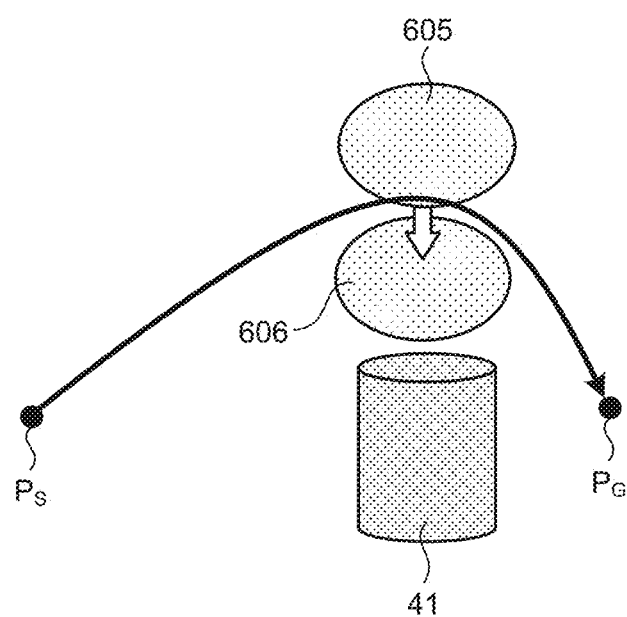
FIG. 27 is a diagram for explaining processing in which the robot controller according to the second embodiment changes a passing area to a position not including an obstacle therein.

FIG. 27 is a diagram for explaining the processing in which the robot controller according to the second embodiment changes the passing area to the position not including the obstacle therein. FIG. 27 illustrates a case where the obstacle includes one obstacle 41. Here, the passing area before change is indicated as a passing area 605, and the passing area after change is indicated as a passing area 606.

A direction of movement from the passing area 605 to the passing area 606 is desirably a direction in which the change in the angle of each axis of the robot 101 decreases.

In a case where the action time is not reduced even when the position of the passing area 605 is moved to the position of the passing area 606, the action command generation unit 24 may change the passing area by designating one candidate from among the candidates for the passing area set in step S150.

As with the first embodiment, the action command generation unit 24 of the second embodiment also preferentially outputs the trajectory with the action time shorter than or equal to the action time on the joint interpolation trajectory R0 when the action is performed according to the generated trajectory. Moreover, in a case where the action time on all the generated trajectories is longer than the action time on the joint interpolation trajectory R0, the action command generation unit 24 selects the trajectory having the shortest action time among the generated trajectories. Therefore, the action command generation unit 24 can select the trajectory having the shortest action time among the trajectories that avoid interference with the obstacle 31.

As described above, according to the second embodiment, even in the case where the plurality of obstacles is placed and the plurality of passing areas is set, the action command generation unit 24 can generate the trajectory passing through the passing area as in the first embodiment. That is, the action command generation unit 24 adjusts the action command for the other axis and then adjusts the action command for the major axis to generate the trajectory for the action command that has been adjusted. Then, the action command generation unit 24 stores the generated trajectory as a candidate for the output trajectory when there is no interference with the obstacle 31. Therefore, the action command generation unit 24 can generate only the trajectory that avoids a clash with each obstacle and can be implemented by the robot 101 as the candidate for the output trajectory.

Also, as with the first embodiment, the action command generation unit 24 can generate the trajectory having the action time shorter than or equal to that in the case of limiting the passing point and not changing the position of the passing point. Moreover, as with the first embodiment, the action command generation unit 24 can generate the trajectory having the shortest action time among the trajectories that avoid interference with the obstacle.

Third Embodiment

Next, a third embodiment will be described with reference to FIGS. 28 to 31. In the third embodiment, the robot controller 200 adjusts the action command for each axis by machine learning. As with the first embodiment, the third embodiment will also describe a method of generating a trajectory on which the end effector 102 operates without clashing with the obstacle 31 when a specific position of the end effector 102 moves from the action start point $P_S$ to the action goal point $P_G$.

In the third embodiment, no passing area for the end effector 102 is designated. Moreover, the configurations of the robot 101 and the robot controller 200 of the third embodiment are the same as the configurations of the robot 101 and the robot controller 200 of the first embodiment.

Figure 28:
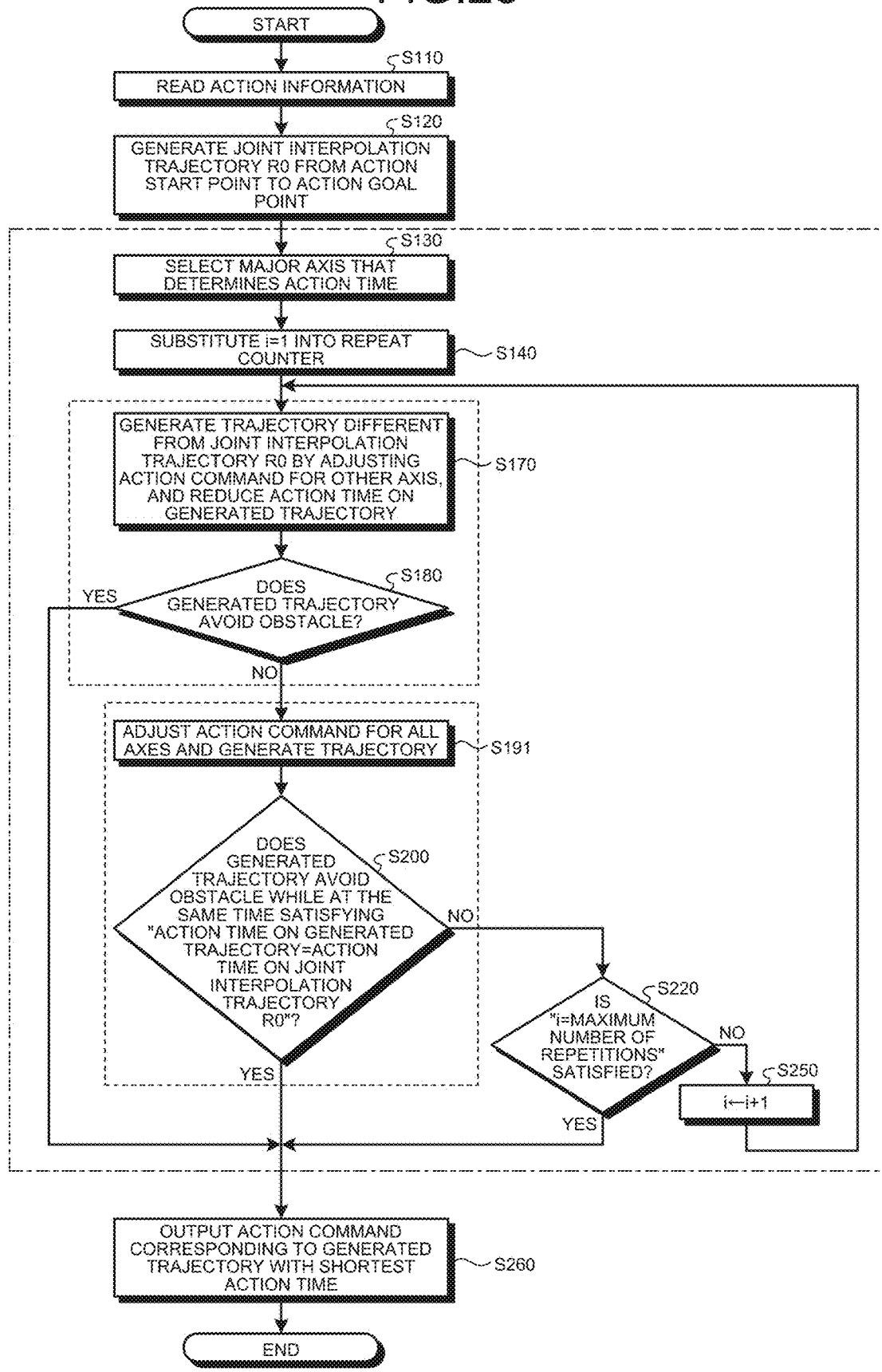
FIG. 28 is a flowchart illustrating a procedure of trajectory generation processing by a robot controller according to a third embodiment.

Hereinafter, processing in which the action command generation unit 24 of the third embodiment generates the trajectory of the end effector 102 will be described. FIG. 28 is a flowchart illustrating a procedure of the trajectory generation processing by the robot controller according to the third embodiment. In the robot controller 200 of the third embodiment, the action command generation unit 24 executes processing similar to the processing in steps S110 to S140 described with reference to FIG. 4 in the first embodiment.

Also, after the processing of step S140, the action command generation unit 24 uses machine learning to execute learning processing of generating the action command for each axis motor corresponding to a trajectory having the shortest action time among trajectories that avoid interference with the obstacle 31 under the constraints of the robot action. The learning processing includes processing of reducing the action time by adjusting the action command for the other axis and processing of generating the trajectory by adjusting the action command for the axis motors including at least that for the major axis.

Specifically, the action command generation unit 24 executes the processing of step S140 and then the processing of steps S170 to S200. In this case, the action command generation unit 24 executes the processing of step S191 instead of step S190. That is, if the generated trajectory cannot avoid the obstacle 31 (No in step S180), the action command generation unit 24 adjusts the action command for all the axes including the major axis and generates the trajectory (step S191). Details of the processing of adjusting the action command for all the axes as the processing of step S191 will be described later.

In the processing of step S200, if the trajectory does not satisfy the condition in step S200 (No in step S200), the action command generation unit 24 determines whether or not a count on the first repeat counter indicates a set maximum value. That is, the action command generation unit 24 determines whether or not "i=the maximum number of repetitions" is satisfied (step S220).

If "i=the maximum number of repetitions" is not satisfied (No in step S220), one is added to "i" (step S250), and the processing returns to step S170. On the other hand, if "i=the maximum number of repetitions" is satisfied (Yes in step S220), the action command generation unit 24 outputs the action command corresponding to the generated trajectory with the shortest action time to the axis motor control units (step S260).

Figure 29:
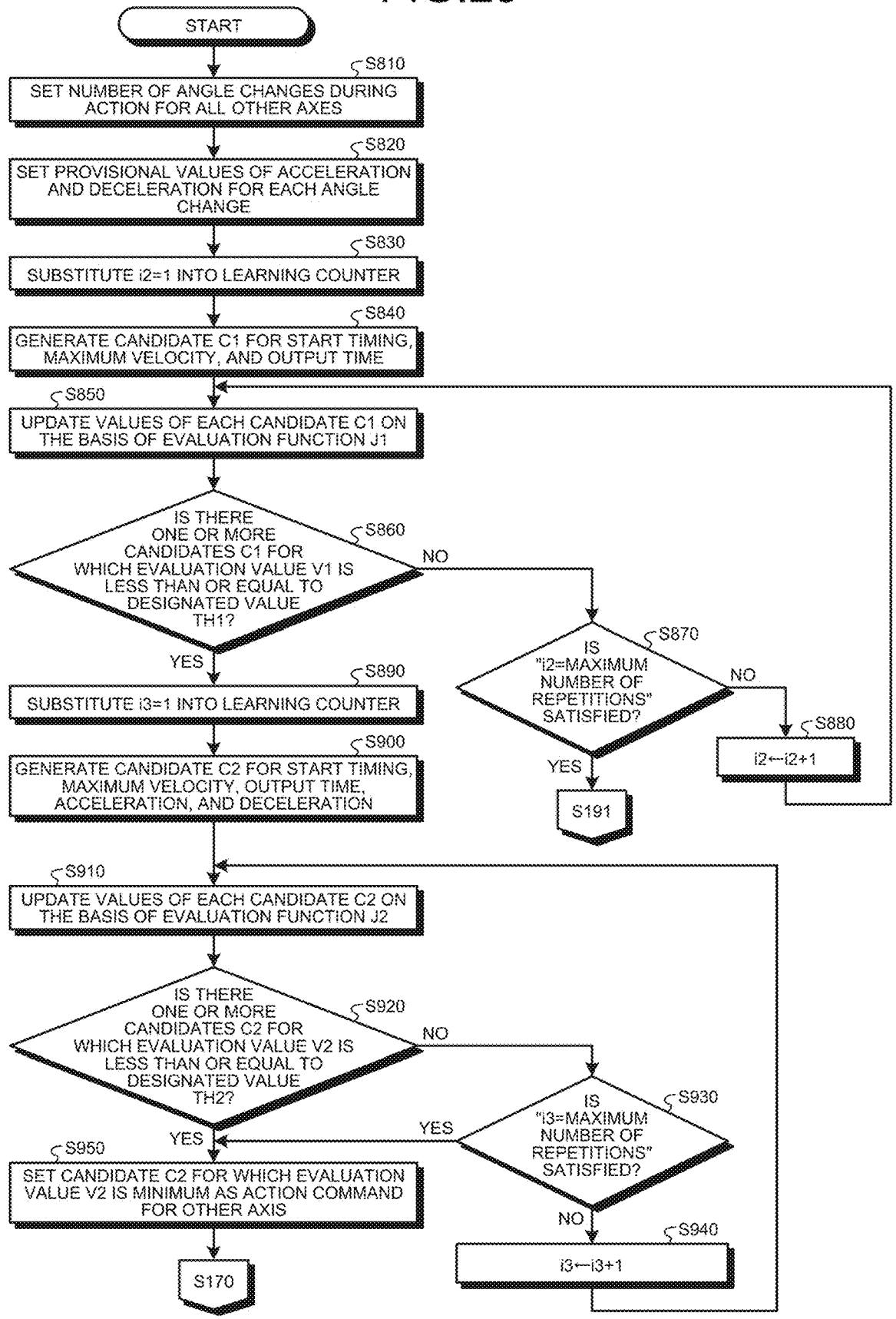
FIG. 29 is a flowchart illustrating a procedure of processing in which the robot controller according to the third embodiment adjusts an action command for another axis.
Figure 30:
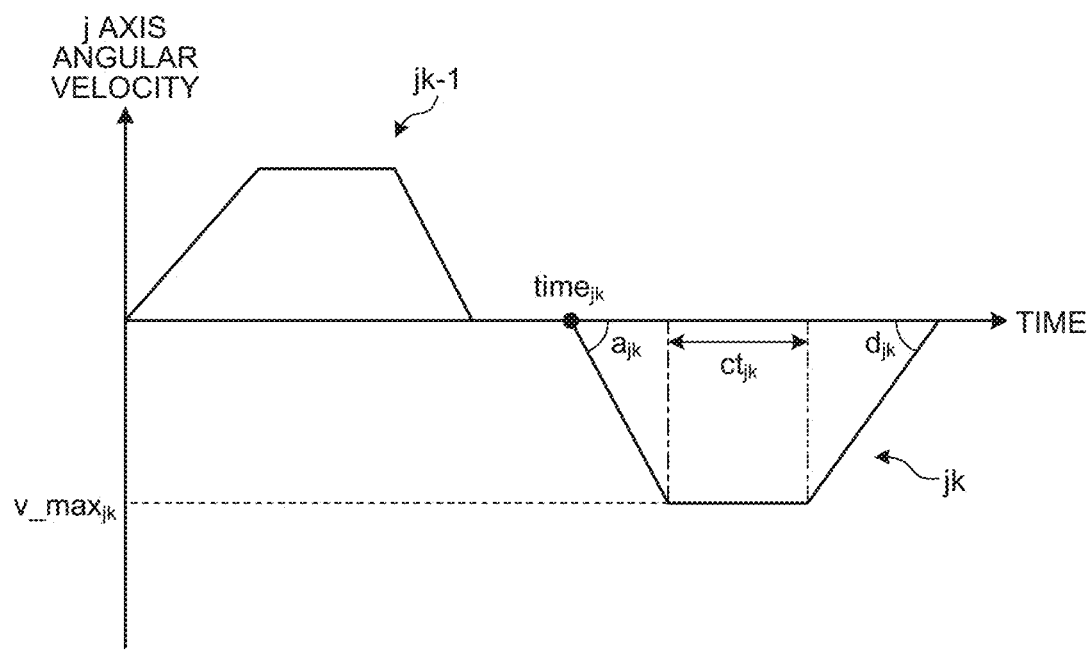
FIG. 30 is a graph for explaining an action command for each axis motor used by the robot controller according to the third embodiment.

Here, the processing of step S170 in the third embodiment, that is, the processing of adjusting the action command for the other axis will be described in detail with reference to FIG. 29. FIG. 29 is a flowchart illustrating a procedure of the processing in which the robot controller according to the third embodiment adjusts the action command for the other axis. FIG. 30 is a graph for explaining the action command for each axis motor used by the robot controller according to the third embodiment. FIG. 30 illustrates parameters representing values of the action command for each axis motor.

In the third embodiment, the action command generation unit 24 uses a motor velocity command as the action command for each axis motor. Also, in the third embodiment, the action command generation unit 24 uses the parameters illustrated in FIG. 30 as action command parameters in order to simplify the adjustment of the action command for each axis motor.

The first action command parameter is the number of angle changes during the action. The angle change during the action is an angle change in a series of motor actions in which each axis motor accelerates from a state of zero velocity, operates at a constant velocity upon reaching the maximum velocity designated, and decelerates after a lapse of a certain amount of time. In the third embodiment, "jk" represents the number of angle changes during an action of a j-axis motor that is the axis motor of the axis "j" of the robot 101.

The second action command parameter is a start timing of each angle change. There are "jk" start timings of the angle changes with respect to the action command for the j-axis motor of the robot 101. In the third embodiment, "$time_{jk}$" represents the start timing of a jk-th angle change.

The third action command parameter is the maximum angular velocity in each angle change. There are "jk" maximum velocities in the angle changes with respect to the action command for the j-axis motor of the robot 101. In the third embodiment, "$v\_max_{jk}$" represents the maximum velocity in the jk-th angle change.

The fourth action command parameter is a time length in which each axis motor outputs the maximum velocity. There are "jk" time lengths in which each axis motor outputs the maximum velocity with respect to the action command for the j-axis motor of the robot 101. In the third embodiment, "$ct_{jk}$" represents an output time that is the time length in which each axis motor outputs the maximum velocity in the jk-th angle change.

The fifth action command parameter is acceleration in each angle change. There are "jk" accelerations in the angle changes with respect to the action command for the j-axis motor of the robot 101. In the third embodiment, "$a_{jk}$" represents the acceleration in the jk-th angle change.

The sixth action command parameter is deceleration in each angle change. There are "jk" decelerations in the angle changes with respect to the action command for the j-axis motor of the robot 101. In the third embodiment, "$d_{jk}$" represents the deceleration in the jk-th angle change.

First, the action command generation unit 24 sets "jk", which is the number of angle changes during the action, for all the other axes (step S810). On the joint interpolation trajectory R0, jk=1 is set for all the axes.

The action command generation unit 24 learns and generates a trajectory that avoids interference with the obstacle 31. Since the trajectory that avoids the interference has a higher degree of freedom than the joint interpolation trajectory R0, the action command generation unit 24 desirably generates the trajectory such that there is a plurality of axes satisfying jk=2 or more.

Next, the action commas d generation unit 24 sets provisional values of the acceleration $a_{jk}$ and the deceleration $d_{jk}$ for each angle change (step S820). In this case, the action command generation unit 24 sets, as "$a_{jk}$" and "$d_{jk}$", values not exceeding the maximum acceleration that can be output by each axis motor alone.

Next, the action command generation unit 24 initializes a first learning counter that is a counter used for determining the number of repetitions in processing of repeating primary learning. That is, the action command generation unit 24 substitutes i2=1 into the first learning counter (step S830). The first learning counter is a counter used in processing of step S870 described later.

Next, the action command generation unit 24 generates a candidate C1 as candidates for the start timing $time_{jk}$, the maximum velocity $v\_max_{jk}$, and the output time $ct_{jk}$ among the action command parameters (step S840). Specifically, the action command generation unit 24 generates the candidate C1 for the action command that sets the start timing $time_{jk}$ of the angle change, the maximum velocity $v\_max_{jk}$ in each angle change, and an initial value of the output time $ct_{jk}$ in which each axis motor outputs the maximum velocity among the action command parameters. Here, the action command generation unit 24 sets, as "$v\_max_{jk}$", a value not exceeding the maximum velocity that can be output by each axis motor. Moreover, the action command generation unit 24 sets, as "$time_{jk}$", a value not exceeding the action time on the joint interpolation trajectory R0.

The action command generation unit 24 determines the number of sets of the candidate C1 to be generated on the basis of a parameter learning algorithm to be used in processing of the following step S850. The parameter learning algorithm used in the processing of step S850 is an algorithm for learning the action command parameters. That is, the parameter learning algorithm used in the processing of step S850 is an algorithm for learning an evaluation function (evaluation function J1 to be described later) of the parameters representing the action command.

For example, in a case where swarm reinforcement learning or genetic algorithm is used the processing of step S850, the action command generation unit 24 prepares a plurality of sets of the action command parameters to be the candidate C1. Alternatively, in a case where Bayesian optimization is used in the processing of step S850, the action command generation unit 24 prepares one set of the action command parameters to be the candidate C1.

Next, the action command generation unit 24 updates the values of each candidate C1 generated on the basis of the evaluation function J1 (step S850). That is, on the basis of the evaluation function J1, the action command generation unit 24 updates the values of the start timing $time_{jk}$ of the angle change, the maximum velocity $v\_max_{jk}$ in each angle change, and the output time $ct_{jk}$ in which each axis motor outputs the maximum velocity. The action command generation unit 24 updates the values of each candidate C1 of the action command parameters so as to minimize an evaluation value V1 of the evaluation function J1.

The action command generation unit 24 uses, for example, a function expressed by the following expression (21) as the evaluation function J1. In expression (21), "$c_1$" represents an arbitrary constant satisfying $c_1>0$, and "tact" is the action time in the action command corresponding to the candidate C1 of the action command parameters used.

[Expression 21]

$$1 = \text{clash} + c_1 * \text{tact} \quad (21)$$
$$\text{clash} = \begin{Bmatrix} 100000 & \text{in case of clash} \\ 0 & \text{in other cases} \end{Bmatrix}$$

A first term of the function expressed by expression (21) increases when a clash between the robot 101 and the obstacle 31 occurs daring an action. A second term of the function expressed by expression (21) is proportional to the action time when the action command is generated from the action command parameters to be the candidate C1. The candidate C1 for decreasing the evaluation value V1 that is the value of the function expressed in expression (21) is a candidate that avoids a clash between the robot 101 and the obstacle 31 and reduces the action time. That is, the action command generation unit 24 generates the candidate C1 of the parameters that reduces the third action time while avoiding a clash between the robot 101 and the obstacle 31 on the basis of the parameter learning algorithm for learning the evaluation function J1. The evaluation value V1 decreases as the action time is reduced.

As described above, the parameter learning algorithm in step S850 used by the action command generation unit 24 is, for example, an arbitrary black box optimization method such as swarm reinforcement learning, genetic algorithm, or Bayesian optimization.

Next, the action command generation unit 24 checks whether or not there is one or more of the candidates C1 for which the evaluation value V1 as the value of the evaluation function J1 is less than or equal to a designated value TH1 designated in advance among the candidates C1 of the action command parameters updated (step S860). The designated value TH1 designated in advance is, for example, a value about twice the value of the action time on the joint interpolation trajectory R0.

If there is no candidate C1 for which the evaluation value V1 is less than or equal to the designated value TH1 (No in step S860), the action command generation unit 24 determines whether or not the number of repetitions equals the maximum number of repetitions. That is, the action command generation unit 24 determines whether or not "i2=the maximum number of repetitions" is satisfied. (step S870).

If "i2=the maximum number of repetitions" is satisfied (Yes in step S870), the processing proceeds to step S191, that is, the processing of adjusting the action command for all the axes including the major axis. If "i2=the maximum number of repetitions" is not satisfied (No in step S870), the action command generation unit 24 adds one to "i2" (step S880) and returns to the processing of step S850.

If there is no candidate C1 for which the evaluation value V1 is less than or equal to the designated value TH1 (No in step S860), and "i2=the maximum number of repetitions" is not satisfied (No in step S870), the action command generation unit 24 repeats the processing from steps S850 to S880.

If there is at least one candidate C1 for which the evaluation value V1 is less than or equal to the designated value TH1 (Yes in step S860), the action command generation unit 24 initializes a second learning counter that is a counter used for determining the number of repetitions in the processing of repeating the primary learning. That is, the action command generation unit 24 substitutes i3=1 into the second learning counter (step S890). The second learning counter is a counter used in processing of step S930 described later.

Next, on the basis of the candidate C1 of the parameters whose evaluation value V1 is less than or equal to the designated value TH1, the action command generation unit 24 generates a candidate C2 as candidates for the start timing time$_{jk}$, the maximum velocity v_max$_{jk}$, the output time ct$_{jk}$, the acceleration a$_{jk}$, and the deceleration d$_{jk}$ among the action command parameters (step S900). Specifically, the action command generation unit 24 generates the candidate C2 as a candidate for the action command that sets the start timing time$_{jk}$ of the angle change, the maximum velocity v_max$_{jk}$ in each angle change, the output time ct$_{jk}$ in which each axis motor outputs the maxim velocity, an initial value of the acceleration a$_{jk}$, and an initial value of the deceleration d$_{jk}$ among the action command parameters. Here, the action command generation unit 24 uses "time$_{jk}$", "v_max$_{jk}$" and "ct$_{jk}$" of the candidate C1 for which the evaluation value V1 is less than or equal to the designated value TH1 in step S860.

The acct on command generation unit 24 determines the number of the candidates C2 to be generated on the basis of a parameter learning algorithm to be used in processing of the following step S910. The parameter learning algorithm used in the processing of step S910 is an algorithm for learning the action command parameters. That is, the parameter learning algorithm used in the processing of step S910 is an algorithm for learning an evaluation function (evaluation function J2 to be described later) of the parameters representing the action command.

For example, in a case where swarm reinforcement learning or genetic algorithm is used in the processing of step S910, the action command generation unit 24 prepares a plurality of sets of the action command parameters to be the candidate C2. Alternatively, in a case where Bayesian optimization is used in the processing of step S910, the action command generation unit 24 prepares one set of the action command parameters to be the candidate C2.

Next, the action command generation unit 24 updates the values of each candidate C2 generated on the basis of the evaluation function J2 (step S910). That is, on the basis of the evaluation function J2, the action command generation unit 24 updates the values of the start timing time$_{jk}$ of the angle change, the maximum velocity v_max$_{jk}$ in each angle change, the output time ct$_{jk}$ in which each axis motor outputs the maximum velocity, the acceleration a$_{jk}$, and the deceleration d$_{jk}$. The action command generation unit 24 updates the values of each candidate C2 of the action command parameters so as to minimize an evaluation value V2 of the evaluation function J2.

The action command generation unit 24 uses, for example, a function expressed by the following expression (22) as the evaluation function J2. In expression (22), "$c_1$" represents an arbitrary constant satisfying $c_1 > 0$, and "$c_2$" represents an arbitrary constant satisfying $c_2 > 0$. Moreover, "tact" is the action time in the action command corresponding to the candidate C2 of the action command parameters used. Also, "torque_o" is an absolute value of the maximum excess amount when there is an axis exceeding the torque constraints during an action, and is set to zero when no axis exceeds the torque constraints during the action.

[Expression 22]

$$j2 = \text{clash} + c_1 * \text{tact} + c_2 * \text{torque\_o} \quad (22)$$
$$\text{clash} = \begin{cases} 100000 & \text{in case of clash} \\ 0 & \text{in other cases} \end{cases}$$

A first term of the function expressed by expression (22) increases when a clash between the robot 101 and the obstacle 31 occurs daring an action. A second term of the function expressed by expression is proportional to the action time when the action command is generated from the action command parameters to be the candidate C2. A third term of the function expressed by expression is a term related to the torque constraints of the robot 101, and the value of the third term increases as the constraints are violated. Here, since the torque constraints of the robot 101 depend on the attitude of the robot 101 and the velocity of each axis, the value changes during the action. The candidate C2 for decreasing the evaluation value V2 that is the value of the function expressed in expression (22) is a candidate that avoids a clash between the robot 101 and the obstacle 31, satisfies the torque constraints of the robot 101 during the action, and reduces the action time. That is, the action command generation unit 24 generates the candidate C2 of the parameters that avoids a clash between the robot 101 and the obstacle 31, satisfies the torque constraints of the robot 101 during the action, and reduces the third action time on the basis of the parameter learning algorithm for learning the evaluation function J2. The evaluation value V2 decreases as the action time is reduced.

As described above, the parameter learning algorithm in step S910 used by the action command generation unit 24 is, for example, an arbitrary black box optimization method such as swarm reinforcement learning, genetic algorithm, or Bayesian optimization.

Next, the action command generation unit 24 checks whether or not there is one or more of the candidates C2 for which the evaluation value V2 as the value of the evaluation function J2 is less than or equal to a designated value TH2 designated in advance among the candidates C2 of the action command parameters updated (step S920). The designated value TH2 designated in advance is, for example, a value of the action time on the joint interpolation trajectory R0.

If there is at least one candidate C2 for which the evaluation value V2 is less than or equal to the designated value TH2 (Yes in step S920), the action command generation unit 24 sets the candidate C2 for which the evaluation value V2 is minimum as the action command for the other axis (step S950). That is, the action command generation unit 24 selects one candidate C2 having the shortest action time, and sets the selected candidate C2 as the parameter in adjusting the action command for the other axis.

On the other hand, if there is no candidate C2 for which the evaluation value V2 is less than or equal to the designated value TH2 (No in step S920), the action command generation unit 24 determines whether or not the number of repetitions equals the maximum number of repetitions. That is, the action command generation unit 24 determines whether or not "i3=the maximum number of repetitions" is satisfied (step S930).

If "i3=the maximum number of repetitions" is satisfied (Yes in step S930), the action command generation unit 24 sets the candidate C2 for which the evaluation value V2 is minimum as the action command for the other axis (step S950).

If "i3=the maximum number of repetitions" is not satisfied (No in step S930), the action command generation unit 24 adds one to "i3" (step S940) and returns to the processing of step S910.

If there is no candidate C2 for which the evaluation value V2 is less than or equal to the designated value TH2 (No in step S920), and "i3=the maximum number of repetitions" is not satisfied (No in step S930), the action command generation unit 24 repeats the processing from steps S910 to S940. If there is at least one candidate C2 for which the evaluation value V2 is less than or equal to the designated value TH2, or if "i3=the maximum number of repetitions" is satisfied, the action command generation unit 24 sets the candidate C for which the evaluation value V2 is minimum as the action command for the other axis (step S950). The action command generation unit 24 thereafter executes the processing of step S170.

Upon completing the processing of step S170 illustrated in FIG. 28, the action command generation unit 24 checks whether or not the action time when the robot 101 is operated using the action command set in step S950 is shorter than or equal to the action time on the joint interpolation trajectory R0. That is, the action command generation unit 24 determines whether or not the generated trajectory avoids the obstacle 31 (step S180).

If the generated trajectory avoids the obstacle 31 (Yes in step S180), the action command generation unit. 24 executes the processing of step S260. On the other hand, if the generated trajectory cannot avoid the obstacle 31 (No in step S180), the action command generation unit 24 adjusts the action command for all the axes including the major axis and generates the trajectory with the adjusted action command (step S191).

Figure 31:
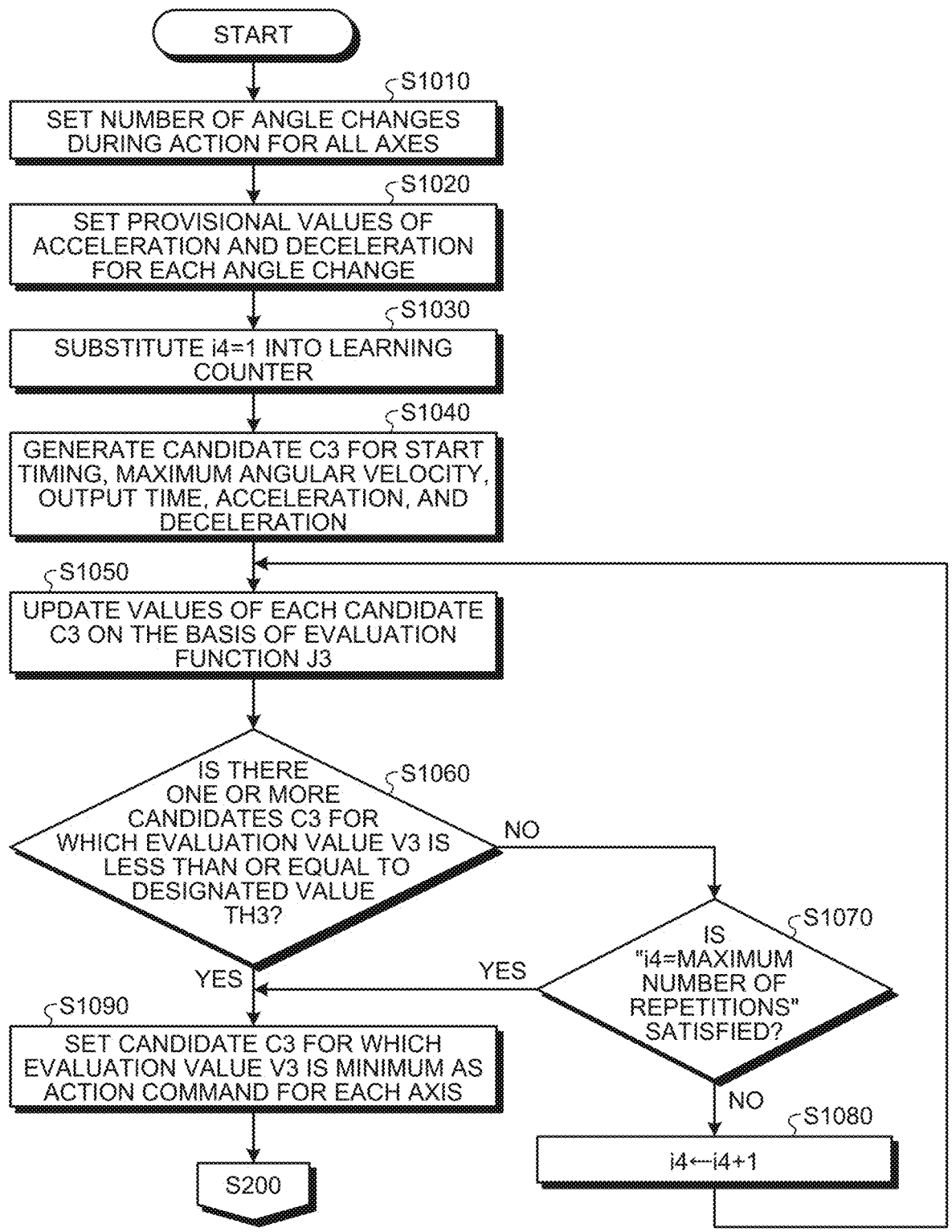
FIG. 31 is a flowchart illustrating a procedure of processing in which the robot controller according to the third embodiment adjusts the action command for all axes.

Here, the processing of step S191 in the third embodiment, that is, the processing of adjusting the action command for all the axes including the major axis will be described in detail with reference to FIG. 31. FIG. 31 is a flowchart illustrating a procedure of the processing in which the robot controller according to the third embodiment adjusts the action command for all the axes.

First, the action command generation unit 24 sets "jk", which is the number of angle changes during the action, for all the axes including the major axis (step S1010). The action command generation unit 24 desirably sets "jk" for the other axis to the value set in step S950.

Next, the action command generation unit 24 sets provisional values of the acceleration $a_{jk}$ and the deceleration $d_{jk}$ for each angle change (step S1020). The action command generation unit 24 desirably sets the acceleration $a_{jk}$ and the deceleration $d_{jk}$ for the other axis to the values set in step S950.

Next, the action command generation unit 24 initializes a third learning counter that is a counter used for determining the number of repetitions in the processing of repeating learning. That is, the action command generation unit 24 substitutes i4=1 into the third learning counter (step S1030). The third learning counter is a counter used in processing of step S1070 described later.

Next, the action command generation unit 24 generates a candidate C3 as candidates for the start timing $time_{jk}$, the maximum velocity $v\_max_{jk}$, the output time $ct_{jk}$, the acceleration $a_{jk}$, and the deceleration $d_{jk}$ among the action command parameters (step S1040). Specifically, the action command generation unit 24 generates the candidate C3 as a candidate for the action command that sets the start timing $time_{jk}$ of the angle change, the maximum velocity $v\_max_{jk}$ in each angle change, the output time $ct_{jk}$ in which each axis motor outputs the maximum velocity, the initial value of the acceleration $a_{jk}$, and the initial value of the deceleration $d_{jk}$ among the action command parameters.

The action command generation unit 24 determines the number of the candidates C3 to be generated on the basis of a parameter learning algorithm to be used in processing of the following step S1050. The parameter learning algorithm used in the processing of step S1050 is an algorithm for learning the action command parameters. That is, the parameter learning algorithm used in the processing of step S1050 is an algorithm for learning an evaluation function (evaluation function J3 to be described later) of the parameters representing the action command.

For example, in a case where swarm reinforcement learning or genetic algorithm is used in the processing of step S1050, the action command generation unit 24 prepares a plurality of sets of the action command parameters to be the candidate C3. Alternatively, in a case where Bayesian optimization is used in the processing of step S1050, the action command generation unit 24 prepares one set of the action command parameters to be the candidate C3.

Next, the action command generation unit 24 updates the values of each candidate C3 generated on the basis of the evaluation function J3 (step S1050). That is, on the basis of the evaluation function J3, the action command generation unit 24 updates the values of the start timing $time_{jk}$ of the angle change, the maximum velocity $v\_max_{jk}$ in each angle change, the output time $ct_{jk}$ in which each axis motor outputs the maximum velocity, the acceleration $a_{jk}$ and the deceleration $d_{jk}$. The action command generation unit 24 updates the values of each candidate C3 of the action command parameters so as to minimize an evaluation value V3 of the evaluation function J3.

The action command generation unit 24 for example uses, as the evaluation function J3, an expression obtained by replacing "J2" in the above expression (22) with "J3". The candidate C3 for decreasing the evaluation value V3 that is the value of the function expressed in expression (22) is a candidate that avoids a clash between the robot 101 and the obstacle 31, satisfies the torque constraints of the robot 101 during the action, and reduces the action time. That is, the action command generation unit. 24 generates the candidate 53 of the parameters that avoids a clash between the robot 101 and the obstacle 31, satisfies the torque constraints of the robot 101 during the action, and reduces the third action time on the basis of the parameter learning algorithm for learning the evaluation function J3. The evaluation value V3 decreases as the action time is reduced.

As described above, the parameter learning algorithm in step S1050 used by the action command generation unit 24 is, for example, an arbitrary black box optimization method such as swarm reinforcement learning, genetic algorithm, or Bayesian optimization.

Next, the action command generation unit 24 checks whether or not there is one or more of the candidates C3 for which the evaluation value V3 as the value of the evaluation function J3 is less than or equal to a designated value TH3 designated in advance among the candidates C3 of the action command parameters updated (step S1060). The designated value TH3 designated in advance is, for example, a value of the action time on the joint interpolation trajectory R0.

If there is at least one candidate C3 for which the evaluation value V3 is less than or equal to the designated value TH3 (Yes in step S1060), the action command generation unit 24 sets the candidate C3 for which the evaluation value V3 is minimum as the action command for each axis (step S1090). That is, the action command generation unit 24 selects one candidate C3 having the shortest action time, and sets the selected candidate C3 as the parameter in adjusting the action command for each axis.

On the other hand, if there is no candidate C3 for which the evaluation value V3 is less than or equal to the designated value TH3 (No in step S1060), the action command generation unit 24 determines whether or not the number of repetitions equals the maximum number of repetitions. That is, the action command generation unit 24 determines whether or not "i4=the maximum number of repetitions" is satisfied (step S1070).

If "i4=the maximum number of repetitions" is satisfied (Yes in step S1070), the action command generation unit 24 sets the candidate C3 for which the evaluation value V3 is minimum as the action command for each axis (step S1090).

If "i4=the maximum number of repetitions" is not satisfied (No in step S1070), the action command generation unit 24 adds one to "i4" (step S1080) and returns to the processing of step S1050.

If there is no candidate C3 for which the evaluation value V3 is less than or equal to the designated value TH3 (No in step S1060), and "i4=the maximum number of repetitions" is not satisfied (No in step S1070), the action command generation unit 24 repeats the processing from steps S1050 to S1080. If there is at least one candidate C3 for which the evaluation value V3 is less than or equal to the designated value TH3, or if "i4=the maximum number of repetitions" is satisfied, the action command generation unit 24 sets the candidate C3 for which the evaluation value V3 is minimum as the action command for each axis (step S1090). The action command generation unit 24 thereafter executes the processing of step S200 and subsequent steps described with reference to FIG. 28.

In the processing of step S220, if "i=the maximum number of repetitions" is not satisfied (No in step S220), the action command generation unit. 24 adds one to "i" (step S250) and returns to the processing of step S170. That is, if the value of the first repeat counter has not reached the maximum number of repetitions, the action command generation unit 24 returns to the processing of step S170 to adjust the action command for the other axis and generate the trajectory again. In this case, the action command generation unit 24 can generate the trajectory different from that generated in the previous trial by chancing "jk" that is the number of angle changes during the action set in the processing of step S170.

As with the first and second embodiments, the action command generation unit 24 of the third embodiment also preferentially outputs the trajectory with the action time shorter than or equal to the action time on the joint interpolation trajectory R0 when the action is performed according to the generated trajectory. Moreover, in a case where the action time on all the generated trajectories is longer than the action time on the joint interpolation trajectory R0, the action command generation unit 24 selects the trajectory having the shortest action time among the generated trajectories. Therefore, the action command generation unit 24 can select the trajectory having the shortest action time among the trajectories that avoid interference with the obstacle 31. Note that the learning processing described in the third embodiment may be applied to the trajectory generation processing in the second embodiment.

As described above, according to the third embodiment, the action command generation unit 24 generates the trajectory by expressing the action command for each axis motor with a finite number of the action command parameters and adjusting the action command parameters using the existing learning algorithm. Therefore, the action command generation unit 24 can generate the trajectory that avoids the obstacle 31 by a finite number of adjustment trials. Moreover, the action command generation unit 24 can calculate the action command that avoid a clash in a short time.

Figure 32:
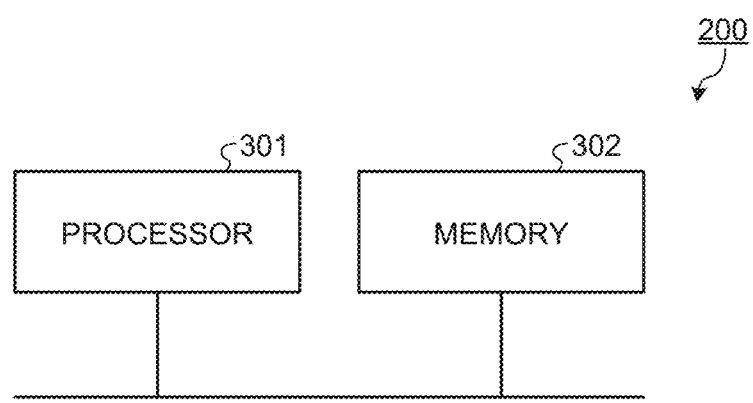
FIG. 32 is a diagram illustrating a hardware configuration of the robot controller according to the first to third embodiments.

Here, a hardware configuration of the robot controller 200 will be described. FIG. 32 is a diagram illustrating the hardware configuration of the robot controller according to the first to third embodiments.

The robot controller 200 can be implemented by a control circuit illustrated in FIG. 32, that is, a processor 301 and a memory 302. The processor 301 is, for example, a central processing unit (CPU) or a system large scale integration (ISI), the CPU being also referred to as a central processor, a processing unit, an arithmetic unit, a microprocessor, a microcomputer, a processor, or a digital signal processor (DSP). The memory 302 is, for example, a random access memory (RAM) or a read only memory (ROM).

The robot controller 200 is implemented by the processor 301 reading and executing a program that is stored in the memory 302 for executing the operation of the robot controller 200. It can also be said that the program causes a computer to execute the procedure or method related to the robot controller 200. The program executed by the robot controller 200 has a module configuration including the action command generation unit 24 and the axis motor control units, which are loaded onto a main storage device and generated on the main storage device.

The memory 302 stores the obstacle information, the robot information, and the end point information. The memory 302 is also used as a temporary memory when the processor 301 executes various processings.

The program executed by the processor 301 may be stored in a computer-readable storage medium in a file in an installable format or an executable format and provided as a computer program product. The program executed by the processor 301 may also be provided to the robot controller 200 via a network such as the Internet.

The robot controller 200 may be implemented by dedicated hardware. Moreover, the functions of the robot controller 200 may be implemented partly by dedicated hardware and partly by software or firmware.

The configurations illustrated in the above embodiments merely illustrate an example so that another known technique can be combined, the embodiments can be combined together, or the configurations can be partially omitted and/or modified without departing from the scope of the present disclosure.

REFERENCE SIGNS LIST 21 obstacle model storage unit; 22 robot model storage unit; 23 end point storage unit; 24 action command generation unit; 31 to 33, 41 obstacle; 100 robot system; 101 robot; 102 end effector; 103 workpiece; 200 robot controller; 301 processor; 302 memory; 601, 601a, 601b, 603 to 606 passing area; 602 trajectory; B1 first axis motor control unit; B2 second axis motor control unit; B3 third axis motor control unit; B4 fourth axis motor control unit; B5 fifth axis motor control unit; B6 sixth axis motor control unit; E1 first axis encoder; E2 second axis encoder; E3 third axis encoder; E4 fourth axis encoder; E5 fifth axis encoder; E6 sixth axis encoder; M1 first axis motor; M2 second axis motor; M3 third axis motor; M4 fourth axis motor; M5 fifth axis motor;

M6 sixth axis motor; L1 to L3, L5 to L7 command line; $P_G$ action goal point; P temporary relay point; $P_S$ action start point.

The invention claimed is:

1. A robot controller comprising:
axis motor control circuitry to control an axis motor that drives a corresponding one of a plurality of axes that moves joints of a robot;
storage circuitry to store robot information, end point information, and obstacle information, the robot information being information on the robot, the end point information including information on an action start point at which a specific position of the robot starts an action and information on an action goal point at which the specific position of the robot ends the action, the obstacle information being information on an obstacle with respect to the robot; and
action command generation circuitry to: generate, on the basis of the robot information and the end point information, a first action command as an action command for the axis motor, the first action command minimizing a first action time, the first action time being an action time of movement when the specific position of the robot is moved from the action start point to the action goal point without considering the obstacle; and to select, from among the axes, an axis having a longest action time when the action is performed in accordance with the first action command, the selected axis being a major axis, wherein
the first action command includes another axis command and a major axis command, the other axis command being an action command for an axis other than the major axis, the major axis command being an action command for the major axis, and
the action command generation circuitry
generates an action command different from the first action command and adjusts the other axis command so as to reduce a second action time, the second action time being an action time according to another axis command included in the generated action command, and
outputs, to the axis motor control circuitry, a second action command that includes the major axis command and the other axis command after adjustment and corresponds to a first trajectory when determining, on the basis of the obstacle information, that the first trajectory corresponding to the second action command is a trajectory that avoids a clash between the robot and the obstacle.

2. The robot controller according to claim 1, wherein
the action command generation circuitry adjusts the major axis command on the basis of the robot information and the end point information, and
when the action command generation circuitry determines, on the basis of the obstacle information, that second trajectories corresponding to third action commands avoid a clash between the robot and the obstacle and third action times according to the third action commands are not longer than the second action time, the third action commands each including the major axis command after adjustment and the other axis command after adjustment, the action command generation circuitry outputs, to the axis motor control circuitry, a third action command among the third action commands, the output third action command providing a shortest one of the third action times.

3. The robot controller according to claim 2, wherein the action command generation circuitry
adjusts the major axis command when a clash between the robot and the obstacle cannot be avoided despite the adjustment of the other axis command.

4. The robot controller according to claim 3, wherein the action command generation circuitry
adjusts at least one of the other axis command and the major axis command so as to allow the robot to pass through one or a plurality of passing areas placed between the action start point and the action goal point.

5. The robot controller according to claim 4, wherein the action command generation circuitry
changes the passing area and adjusts at least one of the other axis command and the major axis command when the third action time does not equal the first action time.

6. The robot controller according to claim 5, wherein the action command generation circuitry adjusts at least one of the other axis command and the major axis command by applying a parameter for each of the passing area, the parameter expressing the action command and varying depending upon the passing area.

7. The robot controller according to claim 2, wherein the action command generation circuitry
adjusts at least one of the other axis command and the major axis command so as to allow the robot to pass through one or a plurality of passing areas placed between the action start point and the action goal point.

8. The robot controller according to claim 7, wherein the action command generation circuitry
changes the passing area and adjusts at least one of the other axis command and the major axis command when the third action time does not equal the first action time.

9. The robot controller according to claim 8, wherein the action command generation circuitry adjusts at least one of the other axis command and the major axis command by applying a parameter for each of the passing area, the parameter expressing the action command and varying depending upon the passing area.

10. The robot controller according to claim 2, wherein the action command generation circuitry
generates, on the basis of a parameter learning algorithm that learns an evaluation function of a parameter expressing the action command, a candidate for the parameter that reduces the third action time while avoiding a clash between the robot and the obstacle, and sets a candidate that provides the shortest action time of the robot, as a parameter in adjusting the other axis command or the major axis command.

11. The robot controller according to claim 10, wherein the parameter includes at least one of: the number of angle changes of the axis motor; a start timing of each of the angle changes; maximum velocity in each of the angle changes; a length of an output time that is a time during which the axis motor outputs the maximum velocity; acceleration in each of the angle changes; and deceleration in each of the angle changes.

12. The robot controller according to claim 11, wherein the action command generation circuitry
generates the candidate for the parameter that satisfies a torque constraint of the robot.

13. The robot controller according to claim 10, wherein the action command generation circuitry
generates the candidate for the parameter that satisfies a torque constraint of the robot.

14. The robot controller according to claim 1, wherein the action command generation circuitry generates an action command different from the first action command so as to allow the robot to pass through one or a plurality of passing areas placed between the action start point and the action goal point.

15. A robot control method for controlling an axis motor that drives a corresponding one of a plurality of axes that moves joints of a robot, the robot control method comprising:

acquiring robot information and end point information, the robot information being information on the robot, the end point information including information on an action start point at which a specific position of the robot starts an action and information on an action goal point at which the specific position of the robot ends the action, and a storage step of storing obstacle information that is information on an obstacle with respect to the robot;

generating, on the basis of the robot information and the end point information, a first action command as an action command for the axis motor, the first action command minimizing a first action time, the first action time being an action time of movement when the specific position of the robot is moved from the action start point to the action goal point without considering the obstacle;

selecting, from among the axes, an axis having a longest action time when the action is performed in accordance with the first action command, the selected axis being a major axis; and generating a trajectory that avoids a clash between the robot and the obstacle, wherein the first action command includes another axis command and a major axis command, the other axis command being an action command for an axis other than the major axis, the major axis command being an action command for the major axis, and generating the trajectory includes:

generating an action command different from the first action command and adjusting the other axis command so as to reduce a second action time, the second action time being an action time according to another axis command included in the generated action command; and outputting, to an axis motor control circuitry to control the axis motor, a second action command that includes the major axis command and the other axis command after adjustment and corresponds to a first trajectory when determining, on the basis of the obstacle information, that the first trajectory corresponding to the second action command is a trajectory that avoids a clash between the robot and the obstacle.

16. A non-transitory storage medium to store a robot control program for controlling an axis motor that drives a corresponding one of a plurality of axes that moves joints of a robot, the robot control program causing a computer to execute:

acquiring robot information and end point information, the robot information being information on the robot, the end point information including information on an action start point at which a specific position of the robot starts an action and information on an action goal point at which the specific position of the robot ends the action, and a storage step of storing obstacle information that is information on an obstacle with respect to the robot;

generating, on the basis of the robot information and the end point information, a first action command as an action command for the axis motor, the first action command minimizing a first action time, the first action time being an action time of movement when the specific position of the robot is moved from the action start point to the action goal point without considering the obstacle;

selecting, from among the axes, an axis having a longest action time when the action is performed in accordance with the first action command, the selected axis being a major axis; and generating a trajectory that avoids a clash between the robot and the obstacle, wherein the first action command includes another axis command and a major axis command, the other axis command being an action command for an axis other than the major axis, the major axis command being an action command for the major axis, and generating the trajectory includes:

generating an action command different from the first action command and adjusting the other axis command so as to reduce a second action time, the second action time being an action time according to another axis command included in the generated action command; and outputting, to an axis motor control circuitry to control the axis motor, a second action command that includes the major axis command and the other axis command after adjustment and corresponds to a first trajectory when determining, on the basis of the obstacle information, that the first trajectory corresponding to the second action command is a trajectory that avoids a clash between the robot and the obstacle.

* * * * *